United States Patent
Dooley et al.

(10) Patent No.: US 12,049,359 B2
(45) Date of Patent: Jul. 30, 2024

(54) AUTONOMOUS DOMESTIC ROBOTIC SYSTEMS FOR ITEM RETRIEVAL AND TRANSPORT

(71) Applicant: Labrador Systems, Inc., Oak Park, CA (US)

(72) Inventors: Michael Dooley, Pasadena, CA (US); Nikolai Romanov, Oak Park, CA (US)

(73) Assignee: Labrador Systems, Inc., Oak Park, CA (US)

( * ) Notice: Subject to any disclaimer, the term of this patent is extended or adjusted under 35 U.S.C. 154(b) by 96 days.

(21) Appl. No.: 17/976,188

(22) Filed: Oct. 28, 2022

(65) Prior Publication Data

US 2023/0063018 A1    Mar. 2, 2023

Related U.S. Application Data

(63) Continuation of application No. 16/761,147, filed as application No. PCT/US2018/058706 on Nov. 1, 2018, now Pat. No. 11,485,575.

(Continued)

(51) Int. Cl.
*G06F 7/00* (2006.01)
*B65G 1/04* (2006.01)
(Continued)

(52) U.S. Cl.
CPC ......... *B65G 1/0492* (2013.01); *B65G 1/1373* (2013.01); *B65G 65/005* (2013.01); *B65G 65/02* (2013.01)

(58) Field of Classification Search
CPC .. B65G 1/0492; B65G 1/1373; B65G 65/005; B65G 65/02; B65G 1/0435; B65G 65/00; B66F 7/0666; B66F 9/063; B66F 7/0625
(Continued)

(56) References Cited

U.S. PATENT DOCUMENTS 5,836,736 A   11/1998  Thompson et al.
9,120,622 B1   9/2015  Elazary et al.
(Continued)

FOREIGN PATENT DOCUMENTS

CN    1377321 A    10/2002
CN  103950672 A     7/2014
(Continued)

OTHER PUBLICATIONS

First Office Action for Chinese Patent Application No. 2022104792911, mailed Oct. 23, 2023, 29 pages.
(Continued)

*Primary Examiner* — Yolanda R Cumbess
(74) *Attorney, Agent, or Firm* — Withrow + Terranova, PLLC; Vincent K. Gustafson

(57) ABSTRACT

A robotic item retrieval and transport apparatus includes at least one item retrieval mechanism that is minimally exposed while stored and/or engaged in loading or unloading of objects relative to a deck (e.g., upper surface) thereof. Actuators and at least major portions of one or more movable implements are arranged below the deck. Loading and/or unloading of objects may include lateral sliding, such as by pulling the object while it is supported by an extrinsic support surface. At least substantial portions of an item retrieval mechanism may remain outside a central target area of a deck, to provide a unobstructed or minimally obstructed deck surface for holding objects. The apparatus may be used with at least one movable pallet element. A pallet element and/or a retrievable item may include one or more features detectable by a sensor.

23 Claims, 36 Drawing Sheets

Related U.S. Application Data

(60) Provisional application No. 62/581,564, filed on Nov. 3, 2017.

(51) Int. Cl.
*B65G 1/137* (2006.01)
*B65G 65/00* (2006.01)
*B65G 65/02* (2006.01)

(58) Field of Classification Search
USPC .................................................. 700/213–214
See application file for complete search history.

(56) References Cited

U.S. PATENT DOCUMENTS

| | | | |
|---|---|---|---|
| 2012/0321423 A1* | 12/2012 | MacKnight | H01L 21/67276 414/664 |
| 2014/0133943 A1* | 5/2014 | Razumov | B65G 1/0492 414/281 |
| 2014/0288696 A1 | 9/2014 | Lert | |
| 2015/0071743 A1 | 3/2015 | Lert, Jr. | |
| 2015/0081089 A1 | 3/2015 | Kapust et al. | |
| 2015/0104278 A1 | 4/2015 | Von Liechtenstein et al. | |
| 2015/0360882 A1 | 12/2015 | Girtman | |
| 2015/0368078 A1* | 12/2015 | Hess | B66F 9/063 700/217 |
| 2016/0101940 A1 | 4/2016 | Grinnell et al. | |
| 2016/0304280 A1 | 10/2016 | Elazary et al. | |
| 2018/0072517 A1 | 3/2018 | Girtman et al. | |
| 2020/0339350 A1 | 10/2020 | Dooley et al. | |

FOREIGN PATENT DOCUMENTS

| | | |
|---|---|---|
| CN | 105705441 A | 6/2016 |
| CN | 108622588 A | 10/2018 |
| DE | 19537995 A1 | 4/1997 |
| EP | 3192616 A1 | 7/2017 |
| JP | S5153382 A | 5/1976 |
| JP | S63258303 A | 10/1988 |
| JP | H0364923 U | 6/1991 |
| JP | H05338708 A | 12/1993 |
| JP | H0710208 A | 1/1995 |
| JP | H07081712 A | 3/1995 |
| JP | 2009501685 A | 1/2009 |
| JP | 2010247933 A | 11/2010 |
| JP | 2013023327 A | 2/2013 |
| WO | 2016172793 A1 | 11/2016 |

OTHER PUBLICATIONS

Notification of Transmittal of International Search Report and Written Opinion (Form PCT/ISA/220), International Search Report (Form PCT/ISA/210), and Written Opinion (Form PCT/ISA/237) for International Application No. PCT/US2018/058706 mailed Mar. 15, 2019 (15 pages).

International Preliminary Report on Patentability (Form PCT/IB/373) for International Application No. PCT/US2018/058706 mailed May 14, 2020 (12 pages).

Extended European Search Report for European Patent Application No. 18872748.1 dated Nov. 11, 2020 (9 pages).

McColl, D., et al., "Meal-Time with a Socially Assistive Robot and Older Adults and a Long-Term Care Facility," Journal of Human-Robot Interaction, vol. 2, No. 1, 2013, pp. 152-171.

Owano, N., "Warehouse item-picking robot is a perception-controlled mover," Tech Xplore, Jun. 18, 2016. Retrieved from the Internet <URL: https://techxplore.com/news/2016-06-warehouse-item-picking-robot-perception-controlled-mover.html>, retrieved on Sep. 6, 2020.

Non-Final Office Action for U.S. Appl. No. 16/761,147, mailed Mar. 17, 2022, 9 pages.

Notice of Allowance for U.S. Appl. No. 16/761,147, mailed Jul. 6, 2022, 11 pages.

First Office Action for Chinese Patent Application No. 2018800853706, mailed Jul. 26, 2021, 22 pages.

Notification to Grant for Chinese Patent Application No. 2018800853706, mailed Feb. 18, 2022, 5 pages.

Examination Report for European Patent Application No. 18872748.1, mailed May 30, 2023, 5 pages.

Decision to Grant for Japanese Patent Application No. 2023017788, mailed Mar. 19, 2024, 4 pages.

\* cited by examiner

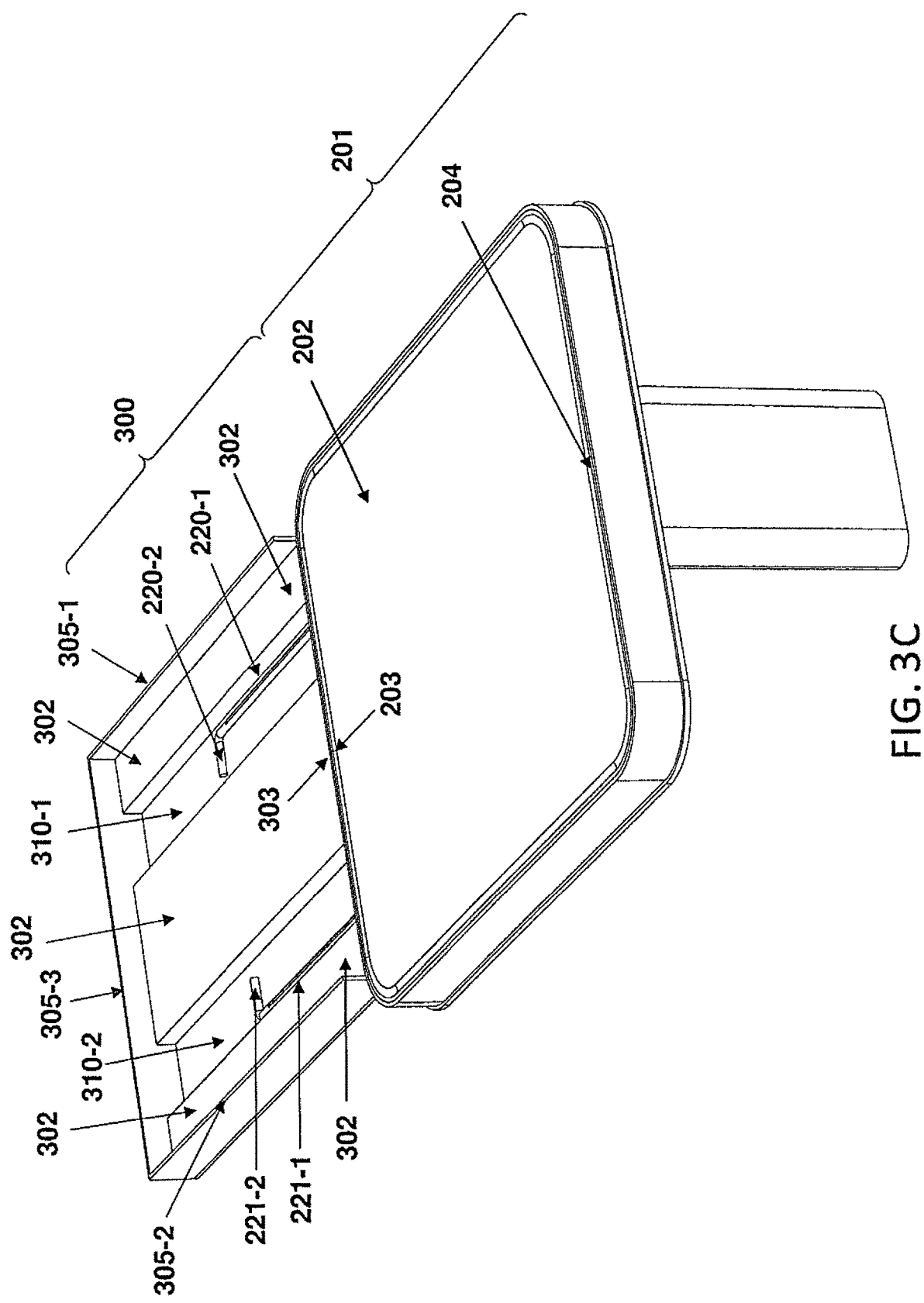

AUTONOMOUS DOMESTIC ROBOTIC SYSTEMS FOR ITEM RETRIEVAL AND TRANSPORT

CROSS-REFERENCE TO RELATED APPLICATION(S)

This application is a continuation of U.S. patent application Ser. No. 16/761,147 filed on May 1, 2020 and subsequently issuing as U.S. Pat. No. 11,485,575, which is the U.S. national phase under 35 U.S.C. § 371 of International Application No. PCT/US2018/058706, filed on Nov. 1, 2018, and claims priority to U.S. Provisional Patent Application No. 62/581,564 filed on Nov. 3, 2017, wherein the entire contents of the foregoing applications are hereby incorporated by reference herein.

TECHNICAL FIELD

The present invention relates generally to mobile delivery robots, and more particularly to robotic item retrieval and transport systems and apparatuses, as well as related accessory items useful in aiding operation of robotic item retrieval and transport apparatuses, suitable for manipulating objects within an unstructured environment (e.g., within a home), in the role of a personal assistive device.

BACKGROUND

A wide variety of Automated Guided Vehicles (AGVs) have been used to automatically transport items within manufacturing and warehouse settings for several decades. Over time, versions of these AGVs have been adapted for use in other settings such as hospitals, laboratories, and office environments to carry and deliver items.

Some AGVs serve solely as mobile platforms for moving objects, while relying on human (e.g., manual) intervention or extrinsic automation devices for loading and unloading of objects to be carried. Other AGVs travel to locations where external machines with actuators perform some or all of the requisite loading and/or unloading tasks. Still other AGVs are equipped with integrated mechanisms for automatic loading and unloading of objects without the need for external assistance.

Some AGVs with integrated loading/unloading mechanisms serve to vertically lift and carry large objects, by using an integrated forklift mechanism to lift a pallet of goods in a manner similar to a human-operated folk lift. More recently developed AGVs (such as embodied in Amazon robotics warehouse robots) are configured to travel under a storage unit, raise the storage unit up and off a floor, and transport the storage unit to a new location. Other AGVs include robotic arms that lift generally smaller loads (e.g., even single objects) to transfer them between the AGV and an external location.

Certain AGVs with automatic loading and unloading capabilities are configured to laterally transfer objects between a cargo surface of the AGV and an external surface. Examples of this type include AGVs with motorized conveyor belts or rollers on an AGVs cargo surface, as well as AGVs with non-moving cargo surfaces that use motorized push and pull mechanisms for sliding objects on and off an AGV cargo surface. In these examples, the lateral transfer mechanism on the AGV is exposed in the cargo area in order to provide optimal reach and access to the objects being transferred. Certain AGVs may also include a height adjustment mechanism to confer a second degree of motion, thereby enabling an AGV to align its cargo surface with one or more external surfaces, such as to retrieve objects stored on a shelf.

As the variety of AGV configurations has expanded over time, they have also evolved in terms of the complexity of environments within which they can operate.

The early AGVs were designed to function in highly structured environments and required installation of dedicated supporting infrastructure to operate. For example, magnetic tape or other markers were often laid down on a floor to provide predefined routes and location information useable by an AGV to navigate from one point to another.

Advances in industrial sensors, processors, and software have enabled more autonomous versions of AGVs, sometimes referred to as Self Guided Vehicles or SGVs. SGVs may perform tasks similar to AGVs, but generally can operate with less external structure, and are more adaptable in the routes and delivery roles they support.

Various technological advances for consumer electronics, including 3D cameras, mapping software, gyroscopes, proximity sensors, lithium batteries, wireless communication, low-power high-speed processors, recognition software and artificial intelligence may enable SGVs to be sufficiently cost effective to render them suitable for a broader range of unstructured settings, such as homes, as well as a broader range of uses, such as personal delivery robots. However, key elements of AGVs and SGVs, such as mechanisms for loading and unloading objects, as well as other appurtenant elements, are still primarily designed for industrial operations around trained personnel.

Despite advances in AGVs and SGVs, the art continues to seek item retrieval and transport robots suitable for use in unstructured human-occupied spaces, including robots that can support manual and/or automated loading and unloading functions, and that address challenges associated with conventional robots. Such challenges include ensuring operation in unstructured spaces while ensuring safety of bystanders (potentially including elderly adults, children, and pets), promoting reliable operation, and promoting robot practicality and versatility—preferably at a reasonable cost relative to conventional AGVs.

SUMMARY

Aspects of the present disclosure relate to a robotic item retrieval and transport apparatus suitable for carrying and delivering objects in a home setting and/or other environments in which one or more untrained individuals may be present and/or may closely interact with surfaces of the robot. Robotic item retrieval and transport apparatuses according to at least certain embodiments function to retrieve objects from a first location, carry those objects on a surface of the robot, and transport objects to and/or unload objects onto at least one second location.

To accomplish item retrieval and transport tasks in a user-friendly and user-safe manner, robotic item retrieval and transport apparatuses according to at least certain embodiments include one or more retrieval mechanisms that are integral to (e.g., carried as part of) a mobile robot and that are minimally exposed while the retrieval mechanism is stored and/or is engaged in loading objects to or unloading objects from a surface of the robot. In certain embodiments, minimum exposure of a retrieval mechanism includes providing one or more actuators and at least a majority of at least one movable implement below a surface of a deck of a robotic item retrieval and transport apparatus. Such a retrieval mechanism may be configured to cause at least one retrievable item to be loaded onto and unloaded from a deck by sliding. In certain embodiments, at least a portion of at least one movable implement is configured to travel below a deck of a robotic item retrieval and transport apparatus.

In one aspect of the disclosure, a robotic item retrieval and/or transport apparatus comprises: a mobile base, a deck configured to support at least one retrievable item, and an item retrieval mechanism. The item retrieval mechanism comprises at least one movable implement and is configured for lateral transport of the at least one retrievable item between the deck and an extrinsic support surface. The at least one retrievable item comprises at least one first receiving surface, a proximal end arranged proximate to the deck, and a distal end arranged distal from the deck. The at least one first receiving surface is arranged closer to the distal end than to the proximal end. The at least one movable implement is configured to travel under a surface of the at least one retrievable item to permit engagement of the at least one movable implement with the at least one first receiving surface. The item retrieval mechanism is configured to cause the at least one movable implement to engage the at least one first receiving surface to (i) slide the at least one retrievable item while the at least one retrievable item is supported by at least one of the extrinsic support surface or the deck and (ii) pull the at least one retrievable item toward the deck. The foregoing item retrieval and/or transport apparatus permits the at least one retrievable item to be laterally transported by sliding while a majority of the weight of the at least one retrievable item is supported by the deck or the extrinsic support surface. Such configuration dispenses with a need for complex and expensive item lifting mechanisms.

In another aspect of the disclosure, a robotic item retrieval and/or transport apparatus comprises: a mobile base, a deck configured to support at least one retrievable item, and an item retrieval mechanism. The deck comprises a perimeter bounded by at least one peripheral edge. The item retrieval mechanism comprises at least one movable implement and configured for lateral transport of the at least one retrievable item between the deck and an extrinsic support surface. The robotic item retrieval and/or transport apparatus further comprises at least one of the following features (i) to (iii): (i) the item retrieval mechanism remains outside a central target area during storage and operation of the item retrieval mechanism, the central target area is definable as an upward projection from a central portion of the deck, and the central portion of the deck comprises a continuous area of at least 50% of an area within the perimeter; (ii) the deck comprises a maximum width of less than 1 meter, a peripheral target area is definable as an upward projection of a peripheral portion extending inward from peripheral edges of the deck, and any intrusion by the at least one movable implement into the peripheral target area during storage and/or operation of the item retrieval mechanism is limited to an intrusion distance in a range of 0 to 25% of a maximum length or maximum width of the deck, measured from the at least one peripheral edge of the deck; or (iii) the robotic item retrieval and/or transport apparatus comprises a maximum width of less than 1 meter, the deck occupies a top plan view area of at least about 75% of a maximum top plan view footprint of the robotic item retrieval and/or transport apparatus with the item retrieval mechanism in a retracted position, and if any portion of the item retrieval mechanism is exposed along the top plan view area of the deck, then the item retrieval mechanism is exposed along less than 20% of the deck during storage and operation of the item retrieval mechanism. Features (i) to (iii) represent alternative formulations for providing a desired (e.g., central) portion of the deck that remains unobstructed by (i.e., is devoid of interference from) the item retrieval mechanism. Elimination of obstruction of a desired portion of a deck permits the desired portion to be used for other purposes and/or permit the desired portion to be sealed and thereby rendered impervious to contaminants (e.g., liquids, foreign objects, etc.) that might otherwise preclude reliable operation and/or maintenance of clean or sanitary conditions.

In another aspect of the disclosure, a robotic item retrieval and/or transport apparatus comprises: a mobile base, a deck configured to support at least one retrievable item, and an item retrieval mechanism. The deck comprises a perimeter bounded by at least one peripheral edge of the deck. The item retrieval mechanism comprises at least one movable implement and configured for lateral transport of the at least one retrievable item between the deck and an extrinsic support surface. The at least one actuator is arranged below the upper surface of the deck. The upper surface is devoid of any upper surface opening configured to accommodate passage of any portion of the item retrieval mechanism that is subject to move relative to the deck. The at least one movable implement is configured to pass through at least one front, side, or rear surface opening arranged generally below the at least one peripheral edge of the deck during transport of the at least one retrievable item between the deck and the extrinsic support surface. In certain embodiments, at least a portion of the at least one movable implement is configured to travel below the deck. The item retrieval mechanism is configured to cause the at least one movable implement to (i) slide the at least one retrievable item while the at least one retrievable item is supported by at least one of the extrinsic support surface or the deck and (ii) pull the at least one retrievable item toward the deck. Additionally, the item retrieval mechanism is configured to cause the at least one movable implement to (i) slide the at least one retrievable item while the at least one retrievable item is supported by at least one of the extrinsic support surface or the deck and (ii) push the at least one retrievable item toward the extrinsic support surface. The foregoing combination of features enables minimal exposure of a retrieval mechanism while such mechanism is stored and/or is engaged in loading objects to or unloading objects from a surface of the robot.

In another aspect, a robotic item retrieval and/or transport apparatus comprises: a mobile base; a deck configured to support at least one retrievable item, wherein the deck comprises an upper surface within a perimeter bounded by at least one peripheral edge of the deck; and an item retrieval mechanism configured for lateral transport of the at least one retrievable item between the deck and an extrinsic support surface. The item retrieval mechanism comprises at least one movable implement and at least one first actuator configured to translate the at least one movable implement laterally outward from (a) a position in which a majority of the at least one movable implement is arranged below the deck to (b) a position in which at least a portion of the at least one movable implement is arranged below at least a portion of the at least one retrievable item. The at least one first actuator is positioned below the deck during storage and operation of the item retrieval mechanism. The item retrieval mechanism is configured to cause the at least one movable implement to (i) slide the at least one retrievable item while the at least one retrievable item is supported by at least one of the extrinsic support surface or the deck and (ii) pull the at least one retrievable item toward the deck. Additionally, the item retrieval mechanism is configured to cause the at least one movable implement to (i) slide the at least one retrievable item while the at least one retrievable item is supported by at least one of the extrinsic support surface or the deck and (ii) push the at least one retrievable item toward the extrinsic support surface.

Another aspect of the disclosure relates to a robotic item retrieval and/or transport system that comprises a robotic item retrieval and/or transport apparatus and a pallet element. The pallet element comprises: a base configured to be supported from below by at least one underlying support surface that is bounded in part by a support surface lateral edge; an item support surface arranged generally above the base; and a downwardly extending wall arranged along a proximal edge of the pallet element, wherein the base of the pallet element is positionable on the at least one underlying support surface with the downwardly extending wall arranged proximate to the support surface lateral edge. The robotic item retrieval and/or transport apparatus comprises: a mobile base; a deck configured to support at least one retrievable item; and an item retrieval mechanism comprising at least one actuator and at least one movable implement configured for lateral transport of the at least one retrievable item between the deck and the item support surface. The downwardly extending wall is configured to be restrained between (i) the support surface lateral edge; and (ii) the robotic item retrieval and/or transport apparatus, to inhibit movement of the pallet element during lateral transport of the least one retrievable item between the deck and the item support surface. Use of a pallet element may confer limited structure to an otherwise substantially unstructured environment, Providing a downwardly extending wall of a pallet permits the downwardly extending wall to be restrained (e.g., pinched) between the robotic item retrieval and support apparatus and an underlying support surface lateral edge, such that the pallet element may be rendered immobile during item loading and/or unloading operations without necessarily requiring attachment of the pallet element to an underlying surface. In this manner, a pallet may be easily relocated within an unstructured environment as desired by a user.

Another aspect of the disclosure relates to a pallet element configured for use with a robotic item retrieval and/or transport apparatus (e.g., a robotic item retrieval and/or transport apparatus as disclosed herein). The pallet element comprises: a base configured to be supported from below by an underlying support surface that is predominantly horizontal and is bounded in part by a support surface lateral edge; an item support surface arranged generally above the base and configured to support at least one retrievable item; an item support surface arranged generally above the base and configured to support at least one retrievable item; and a downwardly extending wall arranged along a proximal edge of the pallet element. The base of the pallet element is positionable on the underlying support surface and the downwardly extending wall is configured to be positioned against the support surface lateral edge and proximate to a deck of the robotic item retrieval and/or transport apparatus to inhibit movement of the pallet element during lateral transport by the robotic item retrieval and/or transport apparatus of the at least one retrievable item between the item support surface and the deck.

In certain embodiments, a robotic retrieval and/or transport apparatus may include a robotic delivery cart with at least one surface suitable for carrying objects, where a user can manually load objects onto and/or unload objects from at least one surface. In at least certain embodiments, a robotic delivery cart with the at least one carrying surface can serve as a side table for a user, with at least one carrying surfaces serving as top surface of the side table when desired. In at least certain embodiments, a robotic delivery cart may include additional storage surfaces and locations for holding items that a user desires keep within reach or access when needed. In at least certain embodiments, a robotic delivery cart may be configured to navigate from one point to another within a home and/or other setting, based on an end-user request, a schedule, and/or a triggering event. In at least certain embodiments, a robotic delivery cart may be configured to serve one or more functions identified herein, while also including an object retrieval mechanism that can load one or more objects onto and/or unload one or more objects from at least one carrying surface of the robotic delivery cart.

In certain embodiments, robotic retrieval and/or transport apparatuses disclosed herein differ from conventional AGVs and SGVs adapted for industrial settings, in that the robotic retrieval and/or transport apparatuses may eliminate or at least significantly reduce potential contact between a user (or even a pet) and moving elements of an item retrieval mechanism that may otherwise be hazardous.

In certain embodiments, robotic retrieval and/or transport apparatuses provide unobstructed or minimally obstructed deck surfaces for holding objects, thereby providing a user with increased access to any objects that are subject to retrieval, transport and/or delivery.

Retrieval and/or transport in at least certain embodiments, one or more surfaces (e.g., of a deck) that is used by an item retrieval mechanism for carrying objects is sealed or predominantly sealed off from elements of the item retrieval mechanism and/or other internal elements of the robotic retrieval and/or transport mechanism. This separation and sealing may beneficially allow the one or more surfaces used for carrying objects to be easily cleaned or washed. In this manner, a surface (e.g., deck surface) can be used as a food or drink carrying surface and/or can be used as an eating surface, while minimizing the risk of material and/or fluids positioned thereon from impinging on elements of an item retrieval mechanism and/or other internal elements of a robotic item retrieval and/or transport apparatus.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF DRAWINGS

FIG. 3C is an upper perspective view of an upper deck assembly of a mobile robot according to one embodiment abutting an edge of a pallet, with retrieval arms of the upper deck assembly travelling within recessed channels of the pallet.

FIG. 3I shows the items of FIG. 3G with the item retrieval mechanism in a partially deployed (partially extended) state.

DETAILED DESCRIPTION

Figure 1A:
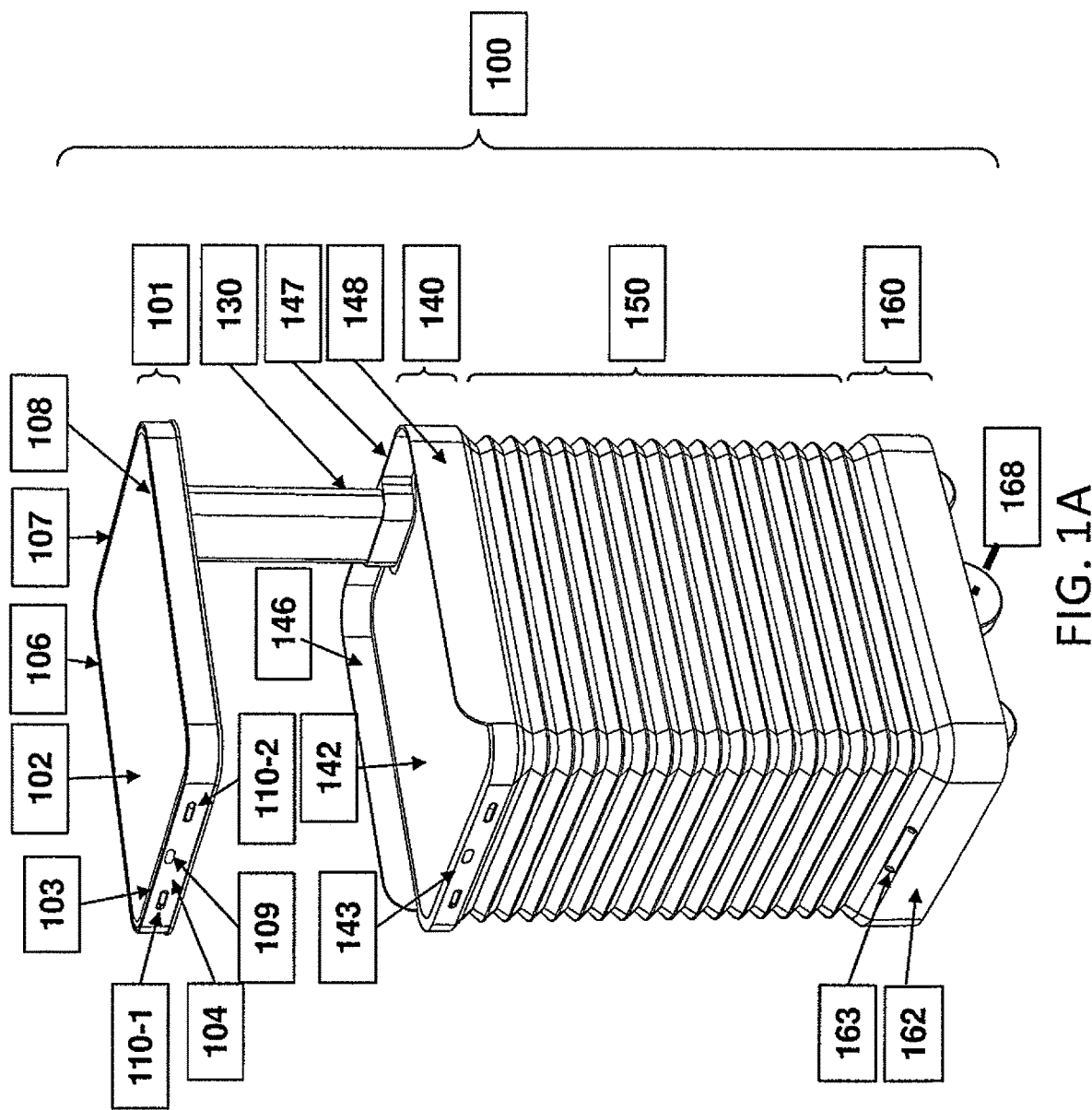
FIG. 1A is an upper perspective view of a mobile robot according to one embodiment of the present disclosure, the mobile robot including an upper deck and a middle deck each embodying a support surface for carrying items, with a scissor lift mechanism in an extended state to elevate a height of the upper and middle decks.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly defined herein.

Various embodiments described herein are directed to robotic item retrieval and/or item transport apparatuses. For sake of brevity, such apparatuses may be variously referred to in the detailed description as 'mobile robots' or simply 'robots.' In certain embodiments, a mobile robot may include one or more support surfaces for transporting items and/or one or more item retrieval mechanisms for transitioning items between the support surfaces located on the mobile robot and extrinsic support surfaces.

In certain embodiments, a mobile robot may be designed as a personal assistive device to help store, organize, carry, and/or retrieve one or more items for individuals with limited personal mobility, strength, stability and/or cognitive abilities that make storing, organizing, carrying and/or retrieving items by themselves challenging, uncomfortable and/or unsafe. In certain embodiments, a mobile robot may be designed to help with similar tasks for individuals that do not necessarily have these personal limitations, but in cases where performing such tasks may help individuals be more productive and/or reduce their level of effort and/or time required to perform these types of tasks.

Technical Problems Addressed by the Present Disclosure

In certain embodiments, a mobile robot designed as a personal assistive device to help store, carry, organize and/or retrieve one or more items may share elements similar to existing AGVs used in industrial, commercial and/or institutional settings, but may also differ to include other elements, unique features, and/or modifications to address the specific challenges of supporting the needs of target end users and/or the requirements of operating a mobile robot in more unstructured and/or more complex environments. These environments may include, but are not limited to, residential homes, other personal living environments, and/or other social environments where individuals gather.

These specific challenges may include, but are not limited to, challenges posed by the need to safely and/or effectively operate a mobile robot with item transport and/or item retrieval functions in close proximity to and/or in direct physical contact with untrained adults, children, and/or pets.

These specific challenges may include, but are not limited to, challenges posed by the need to expose item support surfaces and/or other elements of a mobile robot for direct and/or immediate access to individuals that may have physical and/or other impairments, in order to reduce the effort needed by those individuals to see, reach, and/or access item support surfaces and/or other elements of the mobile robot. These specific challenges may include detecting and/or managing objects that individuals may place on the open item support surface of the mobile robot, where one or more items may move while the mobile robot is in motion, one or more items may extend past an envelope of the mobile robot, and/or one or more items may be at risk of making contact with external obstacles while the mobile robot is in motion. These specific challenges may also include challenges posed by the need to operate moving parts of item retrieval mechanisms that transition items between extrinsic support surfaces and the item support surfaces of the mobile robot, while providing direct and/or immediate access to the extrinsic support surfaces and/or support surfaces of the mobile robot to individuals that may have physical and/or other impairments.

These specific challenges may include, but are not limited to, challenges posed by safely and/or effectively operating a mobile robot where individuals engage in activities with and/or around a mobile robot that may interfere with, contaminate, and/or damage one or more of the elements of the mobile robot. These activities may include, but are not limited to, using one or more item support surfaces and/or other elements of the mobile robot to store, carry, retrieve and/or facilitate consumption of food, liquids and/or medicines; using one or more item support surfaces and/or other elements of the mobile robot to store, carry, retrieve, and/or facilitate use of personal care items, household cleaning supplies, antibacterial agents, waste disposal products and/or waste containers; using one or more item support surfaces and/or other elements of the mobile robot to store, carry, retrieve and/or facilitate use of common household and/or personal items, books and/or other reading materials, electronics devices, remote controls, personal smart devices, health and/or home monitoring devices, eye glasses, items of clothing, bedding, canes and/or other assistive devices.

These specific challenges may include, but are not limited to, enabling a mobile robot to safely and/or effectively maneuver in, on, around, past, or through the following: narrow pathways, cluttered environments, overhanging obstacles of varying heights, obstacles of various sizes that may or may not stay in a certain location, changing and/or uneven floor surfaces and floor transitions, small obstacles present on a floor, and unfamiliar environments (e.g., in which a robot may have minimal or no prior knowledge of a floor plan of the environment and/or external reference points added to the environment). Additional challenges may include enabling a mobile robot to be set up, operated, and/or retrained by individuals with limited to no prior experience with the mobile robot.

These specific challenges may include, but are not limited to, enabling a mobile robot to: safely and/or effectively operate in confined spaces around individuals that may have limited mobility and/or stability to avoid interfering with an individual's path and/or space required for freedom of movement; provide a stable structure if an individual needs to grasp a mobile robot at a certain location to maintain their own stability; and/or avoid making contact with an individual in a way that may cause them to become less stable.

These specific challenges may include, but are not limited to, situations involving combinations of two, three, or more of the aforementioned challenges. As one illustrative situation, a mobile robot may include a support surface for transporting and/or transitioning retrievable items where a family pet such as a cat may jump onto the surface at any point in the mobile robot's retrieval and/or transport operation. In certain embodiments, a mobile robot may include elements such as an open table-like item support surface that may enable an individual to consume food and/or liquids from on and/or near the surface of the mobile robot. With such an embodiment, illustrative situations that may be encountered include: the item support surface of the mobile robot may need to handle potential spills of food and/or liquids; the support surface may need to be cleaned at times with liquid cleaning agents; and the support surface may need to be in close proximity to item retrieval mechanisms of the mobile robot to operate in a confined residential setting and/or where elements of the item retrieval function may be impaired if exposed to food and/or liquids.

Introductory Elements of Mobile Robots of the Disclosure

The following embodiments describe elements of the invention that address one or more of the challenges of operating a mobile robot for transport and/or retrieval functions in a residential and/or otherwise unstructured environment and/or wherein the mobile robot may be used to help store, organize, carry and/or retrieve one or more items for individuals with personal mobility, strength, stability and/or cognitive limitations.

Item Support Surfaces of a Mobile Robot

In certain embodiments, a mobile robot includes one or more support surfaces for carrying items. These items to be carried may include items that are manually placed on and/or removed from the support surface or surfaces of the mobile robot. These items may include retrievable items that can be automatically transitioned between a support surface of the mobile robot and an extrinsic support surface separate from the mobile robot. In certain embodiments, some retrievable items may also be manually placed on and/or removed from the support surfaces of the mobile robot and/or extrinsic support surfaces.

In certain embodiments, a support surface of a mobile robot may include one or more lateral edges that enable the mobile robot to align the edge of the support surface of the mobile robot with a corresponding lateral edge of an extrinsic support surface, where support surface of the mobile robot and the extrinsic support surface are predominantly level with one another, to enable items to be slid from one surface to another without necessarily needing to be lifted in the process. In certain embodiments, one or more support surfaces of a mobile robot may include one or more open sides and/or open spaces above one or more of the support surfaces to allow access for manual and/or automatic placement and/or removal of items.

In the embodiment shown in FIG. 1A, a mobile robot 100 includes an upper platform referred to as the upper deck 101 that includes an upper surface 102 to support items that can be manually placed and/or removed. An area of the upper surface of the upper deck may also be used as a support surface for retrievable items that can be automatically transitioned between the upper deck and an extrinsic support surface using an item retrieval mechanism that is integrated as part of the mobile robot.

In the embodiment shown in FIG. 1A, the upper deck 101 of the mobile robot 100 may include an open front edge 103 on the front side of the mobile robot that may be approximately parallel to the axis 168 of the two powered wheels comprising a differential drive at the base of the mobile robot. In this embodiment, the mobile robot 100 can use the rotation of the powered wheels in the mobile drive base 160 to approach the extrinsic support surface, align the front edge 103 of the upper deck 101 with an open lateral edge of the extrinsic support surface, and drive forward until the upper surface 102 of the upper deck is proximate to the extrinsic support surface. In particular, the upper surface 102 of the upper deck should be close enough to the extrinsic support surface so that one or more items can be slid between the two surfaces by crossing over the front edge of the upper deck of the mobile robot. In certain embodiments, items may be manually transitioned across the front edge and/or through the use of an item retrieval mechanism that is integrated as part of the mobile robot. Once the item or items are transitioned, the powered wheels in the mobile drive base 160 may drive in reverse to back away from the extrinsic surface, change the direction of the mobile robot and then navigate to a new position.

In certain embodiments, items may be manually and/or automatically transitioned across other edges of the upper deck, either instead of or in addition to the front edge, wherein the edges may be at various angles relative to the body of the mobile robot, the primary direction of travel, and/or the orientation of the drive base.

In certain embodiments, a mobile robot may include a multitude of support surfaces for carrying items and/or transitioning retrievable items across one or more of the edges of the support surfaces. These surfaces may expand the variety, number, and/or volume of items the mobile robot can hold, carry and/or retrieve for individuals.

In the embodiment shown in FIG. 1A, the robot includes an upper deck 101 arranged above a second middle deck 140, where each deck 101, 140 includes support surfaces that can carry items and/or transition items. The middle deck 140 includes a similar front edge 143 that can serve the same function as the front edge 103 of the upper deck 101 in enabling the transition of objects with an extrinsic support surface, where the extrinsic support surface may be at a different height given the lower height of the middle deck. In the embodiment in FIG. 1A, the front edge 403 of the middle deck is aligned vertically with the front edge 103 of the upper deck and the front edge of the mobile drive base 162, so that both decks can be positioned with a minimal gap relative to one or more extrinsic support surface.

In certain embodiments, the front edge of the upper deck, another deck, and/or support surface may be recessed relative to the front edge of the mobile drive base and/or other element of a mobile robot. In certain embodiments, the front edge of the upper deck, another deck and/or support surface may be extended relative to the front edge of the mobile drive base and/or other element of the mobile robot.

In certain embodiments, one or more edges of the drive base may extend past one or more edges of the structures of the mobile robot above the drive base. These embodiments may include, but are not limited to, placement of a bumper that surrounds all or part of the drive base to detect obstacles before other parts of the structure of the mobile robot make contact with those obstacles. These embodiments may include, but are not limited to, placement of one or more sensors near one or more edges of the drive base that may be oriented at an upward angle to detect external obstacles that may interfere with the mobile robot while it is moving, to assist in the item transition process, and/or to detect if any items residing on support surface of the mobile robot may be extending past a defined envelop of the mobile robot. These embodiments may include, but are not limited to, placement of one or more wheels and/or other support structures within the drive base further out relative to the perimeter of the upper body of the mobile robot to provide greater stability for the mobile robot.

In certain embodiments, the upper deck and/or other support surface of a mobile robot may include a bumper around part or all of the outer edge of the deck and/or other support surface to detect contact with objects and/or other obstacles. In certain embodiments, other elements of the body of the mobile robot may include a bumper.

In certain embodiments, a bumper around part or all of the drive base, upper deck, other support surface, and/or other element of the body of a mobile robot may be segmented into different sections and/or detection points, where the bumper is able to differentiate the location of contact from one point versus another point. Such segmentation may include vertical and/or lateral segmentation.

In certain embodiments, the upper deck and/or other support surface of a mobile robot can be moveable by a powered mechanism (of the mobile robot) in at least one direction relative to the drive base and/or other elements of the mobile robot. In such an embodiment, the mobile robot can cause the front edge of the upper deck and/or other support surface to move forward to close all or part of a gap between (i) the front edge of the upper deck and/or other support surface of the mobile robot and (ii) an edge of an extrinsic support surface. In certain embodiments, the mobile robot may retract the upper deck and/or other support surface of the mobile robot to a recessed position relative to the drive base and/or other elements of the mobile robot, where the recessed position is more optimal for the function of other elements of the mobile robot. In certain embodiments, the mobile robot may rotate the upper deck and/or other support surfaces of the mobile robot relative to the drive base, other elements of the mobile robot, an extrinsic support surface, and/or other external objects.

In certain embodiments, the upper deck, other support surface, and/or other part of a mobile robot may include contact and/or displacement sensors located around a movable joint where the upper deck, other support surface, and/or other part of the mobile robot connect to a structure of the mobile robot. In these embodiments, the mobile robot can detect contact with obstacles through the shift in position of the upper deck, other support surface, and/or other part of the mobile robot relative to the support structure.

In the embodiment shown in FIG. 1A, a support column 130 connects the upper deck 101 and the middle deck 140 at a fixed distance. In addition to providing structural support, the support column 130 may also house wiring to provide power and communication between the upper deck and other parts of the robot.

In certain embodiments, one or more columns, walls and/or other support structures can be used to arrange one or more decks, item support surfaces, and/or item retrieval mechanisms in different horizontal and/or vertical configurations.

In certain embodiments, a support surface of a mobile robot can be subdivided into more surfaces, levels, and/or compartments, depending on the application and the need for storage and/or retrieval of items. In certain embodiments, the support surfaces may include multiple surfaces or surface portions dedicated to different purposes. For example, one or more areas may be designated for supporting items that are automatically transitioned between the support surface of the mobile robot and one or more extrinsic support surface, while other areas are designated for holding items that can be manually placed, stored and/or removed from the mobile robot by one or more users. In certain embodiments, the same support surface of the mobile robot can be used for manual placement and/or removal of items as well as for automatic transition of retrievable items with one or more extrinsic support surfaces.

In certain embodiments, one or more of the edges of a support surface of a mobile robot may be predominantly open (or completely open) on the sides to provide greater access to the support surface, such as shown along the edges 103, 106, 107, 108 of the upper surface 102 of the upper deck 101 in FIG. 1A. In certain embodiments, one or more of the edges of support surface may be enclosed on one or more sides by a guard rail and/or side wall to help contain items that are located on the support surface, such as shown along the edges 146, 147, 148 of the upper surface 142 of the middle deck 140 in FIG. 1A. In certain embodiments, a guard rail and/or side wall such as shown along the edges 146, 147, 148 of the upper surface 142 of the middle deck 140 in FIG. 1A may be moveable to provide different modes of containment and access, wherein the mobile robot can raise and/or lower the guard rail and/or side wall.

Figure 7A:
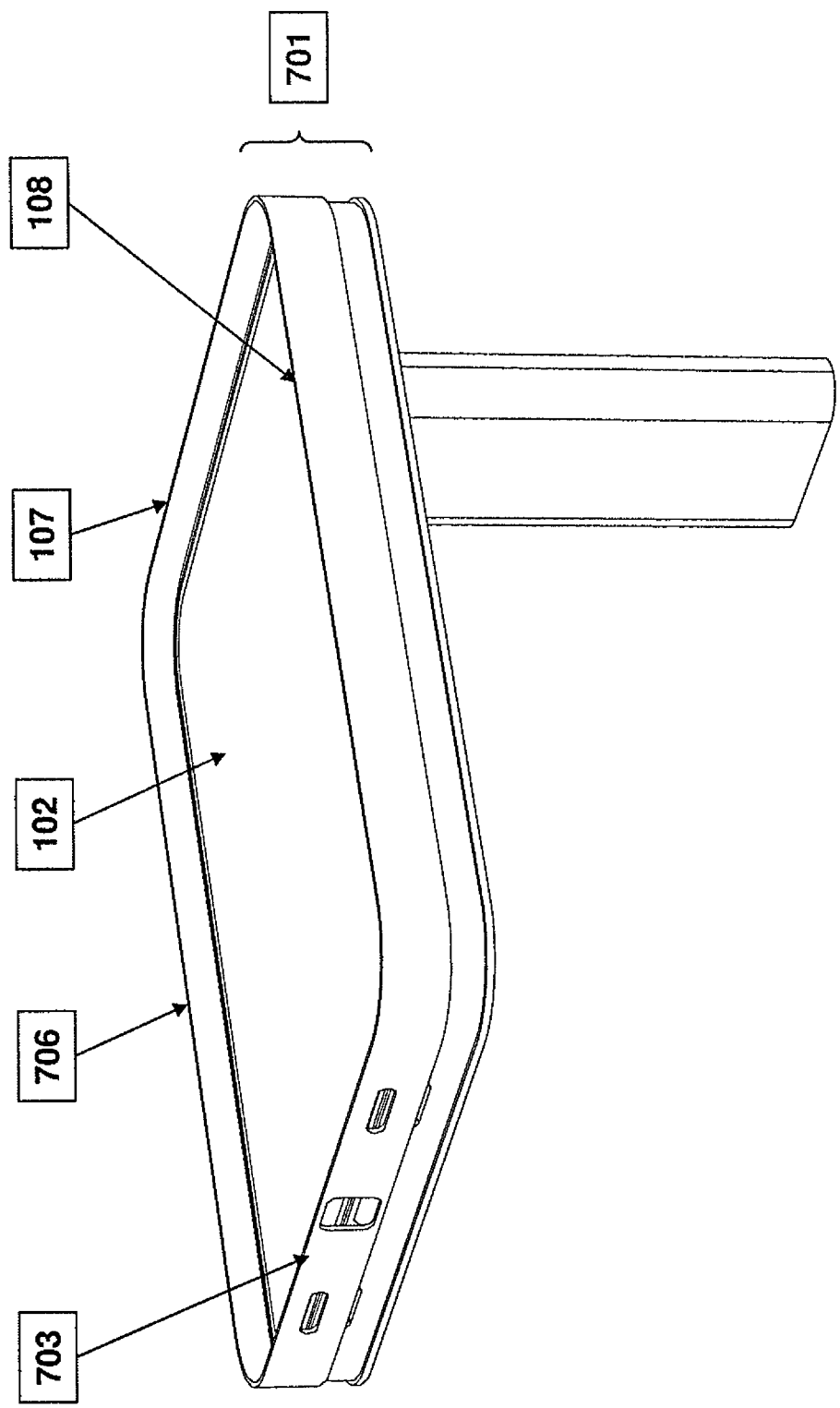
FIG. 7A is an upper perspective view of an upper deck assembly of a mobile robot according to one embodiment, with moveable guard rails and/or side walls in a deployed (raised) position.
Figure 7B:
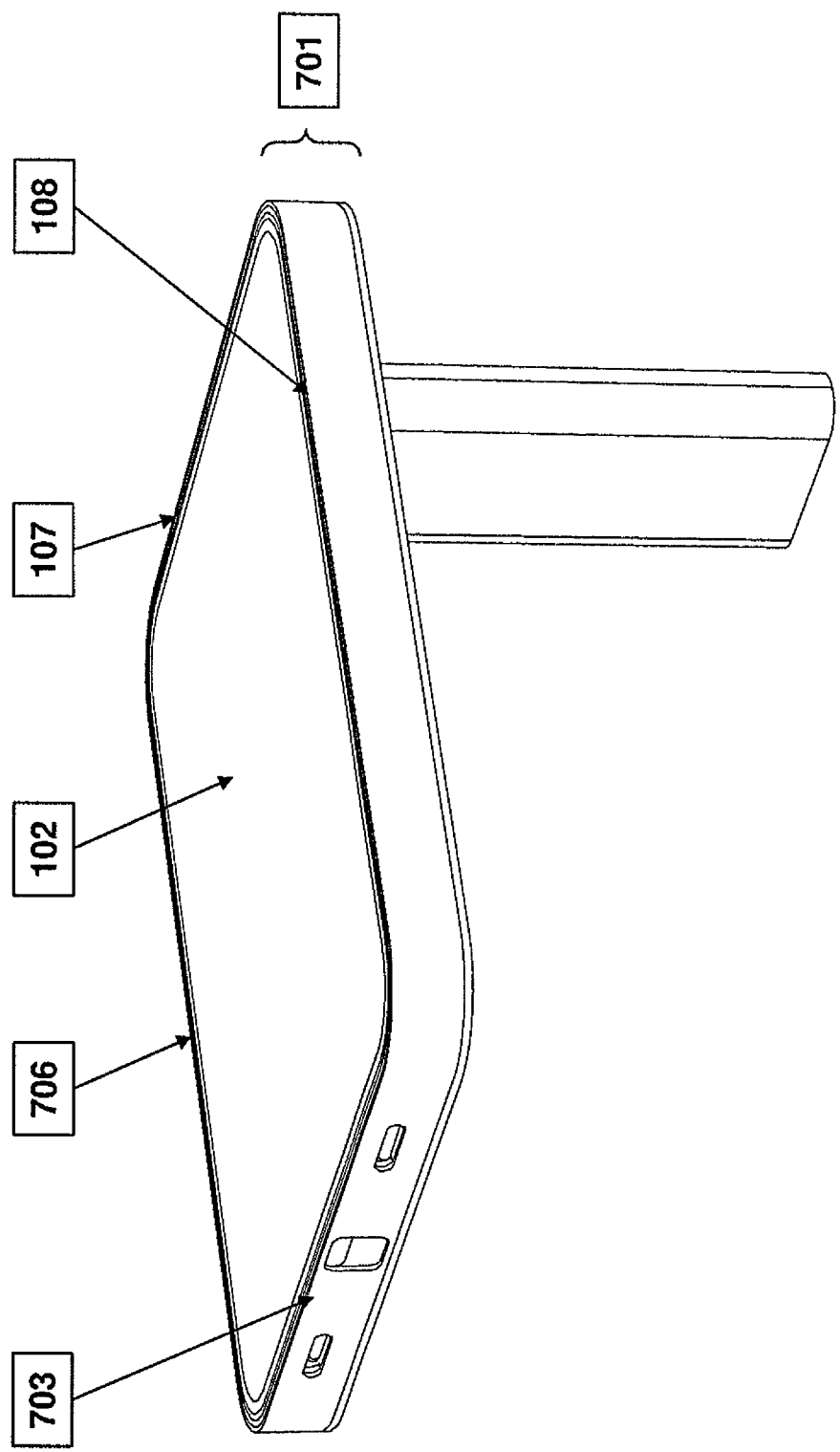
FIG. 7B shows the upper deck assembly of FIG. 7A with the moveable guard rails and/or side walls in a retracted (lowered) position.

In certain embodiments, the guard rail and/or side wall in a raised mode may appear as shown along the edges 703, 706, 707, 708 surrounding the upper surface 702 of the upper deck 701 in FIG. 7A to help contain items when the mobile robot is in motion. In certain embodiments, the guard rail and/or side wall when in a lowered mode may appear as shown along the edges 703, 706, 707, 708 around the upper surface 702 of the upper deck 701 in FIG. 7B to provide greater access to items when the mobile robot is in stationary.

In certain embodiments, support surfaces of a mobile robot may include drain channels configured to capture spilled fluid and direct it to a contained area on the surface of the support surface and/or to a capture container below the support surface. In certain embodiments, the mobile robot may include one or more sensors that detect if fluid is on the surface of a support surface, within a drain channel, and/or within a capture container.

In certain embodiments, one or more of the sides of a mobile robot can be enclosed by a wall and/or by a moveable door and/or hatch that can be opened and/or closed. In certain embodiments, one or more of the sides of a support surface and/or an area within a support surface of the mobile robot can be enclosed by a wall and/or by a moveable door and/or hatch that can be open and/or closed.

In certain embodiments, a mobile robot can include one or more containers, holders, baskets, bags, stretchable cords, hooks, attachment points and/or other connections for holding items in one or more manners other than being supported from below on a predominantly flat surface. In certain embodiments, a container and/or holding device can be attached to one or more of the sides of the mobile robot in a way that the container and/or holding device and its contents stay within the turning radius of the mobile robot as defined by the rotation of the outer corners of the mobile robot. In certain embodiments, a container and/or holding device can be attached to one or more of the sides of the mobile robot that includes a lifting mechanism in a way that the container and/or holding device and its contents can be raised and/or lowered with the decks and/or other support surfaces of a mobile robot, but doesn't make contact with the floor and/or other elements of the mobile robot when the robot is in raised and/or lowered states. In certain embodiments, the holding device can hold a tall item with a small horizontal footprint such as a cane, grabbing stick and/or assistive device that can hang from a side a deck, support surface and/or other element of the mobile robot. In certain embodiments, the holding device can hold cups, bottles and/or containers with beverages and/or fluids.

In certain embodiments, a mobile robot can include a vertical container, basket, flexible pocket, bag, wire frame holder and/or other type of container located on the back side of the mobile robot in the area of the rear support column shown in FIG. 1 to provide additional storage space for holding relatively thin but tall and/or large footprint items such as books, folders, newspapers, other reading materials, bottles, tablets, laptops and/or other similar items.

In certain embodiments, a mobile robot can include one or more drawers, cup holders, rotating turntables, self-dispensing item holders, recessed compartments with lids, insulated compartments with and/or without space for warming and/or cooling packs, carousels and/or conveyor belts to provide different means of storage and access of items carried on the mobile robot.

In certain embodiments, a mobile robot can include one or more flexible and/or adjustable arms that can be mounted to part of the mobile robot on one end and have a holding implement on the other end for holding mobile phones, tablets, other smart devices and/or other objects in an easily reachable and/or viewable position, where the holding implement can include, but is not limited to: an adjustable bracket, a magnetic connecting surface and/or a suction cup.

Variable Height/Lifting Functions

In certain embodiments, a mobile robot may include a vertical lifting mechanism that can raise and/or lower the height of one or more item support surfaces on the mobile robot in order to align the support surface or surfaces to the level of one or more extrinsic support surfaces of various heights. In certain embodiments, the vertical lifting mechanism may provide a greater number of places in residential and/or other settings to store retrievable items on different extrinsic support surfaces and/or may provide greater and/or easier access for individuals to reach the support surfaces on the mobile robot.

Figure 1B:
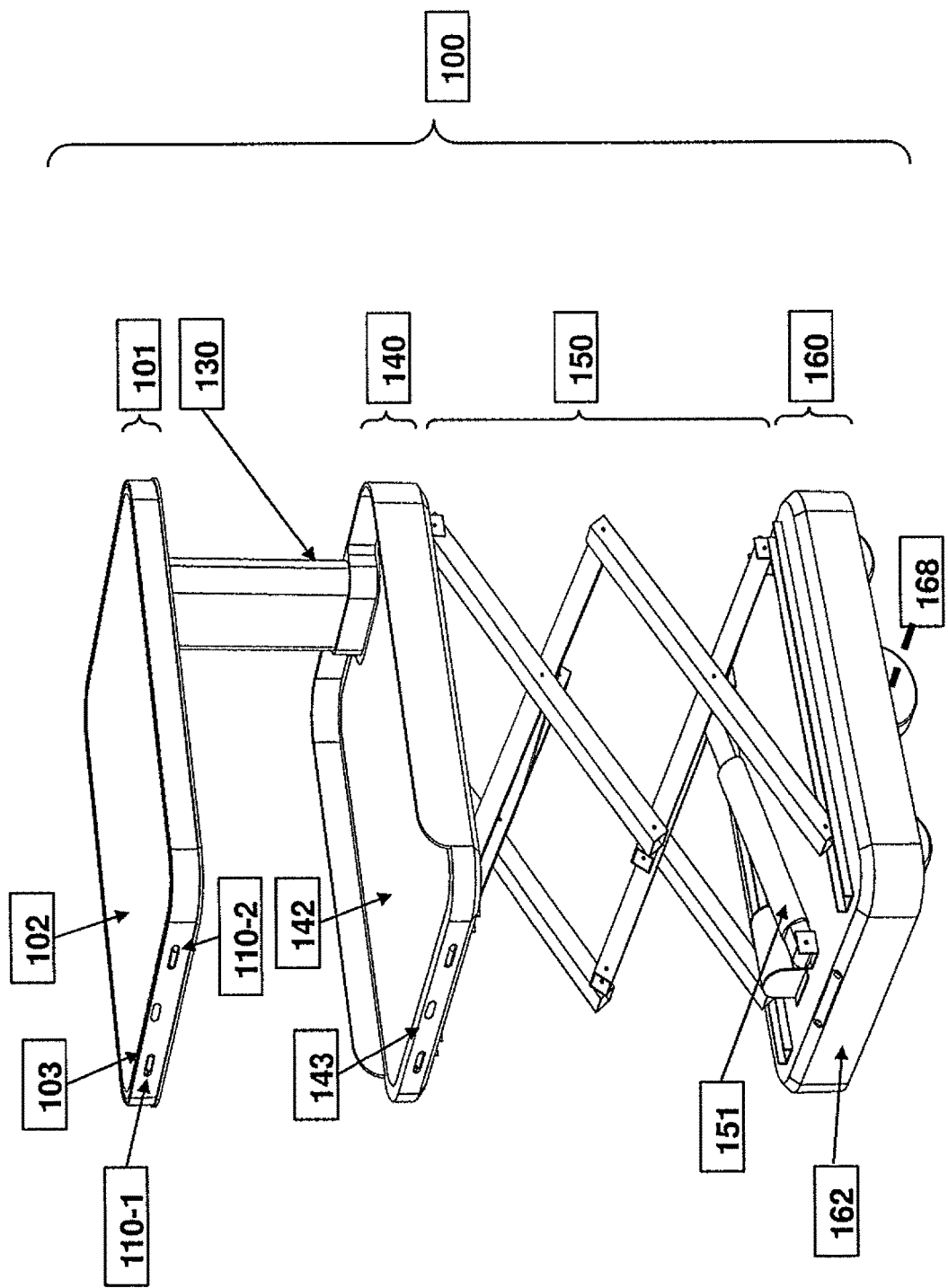
FIG. 1B is an upper perspective view of the mobile robot of FIG. 1A, with the scissor lift mechanism exposed and in an extended state.
Figure 1C:
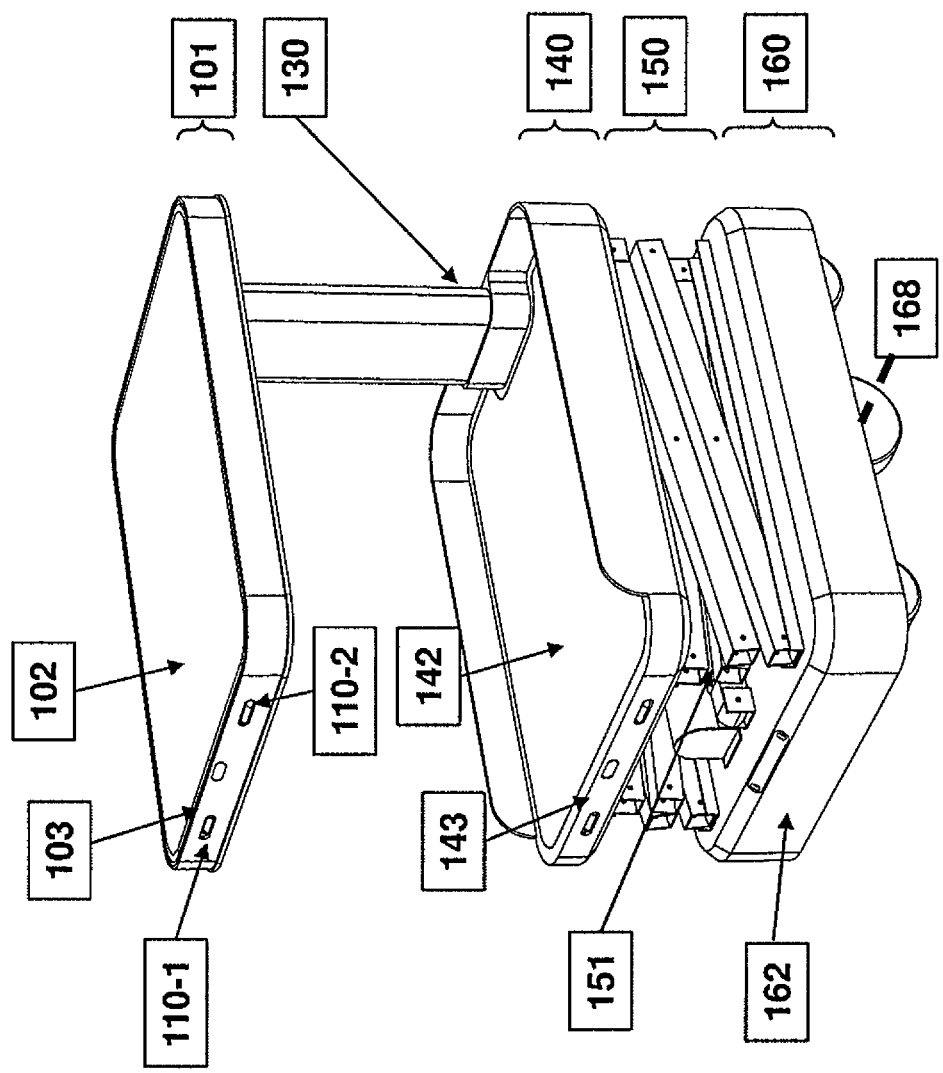
FIG. 1C is an upper perspective view of the mobile robot of FIG. 1B, with the scissor lift mechanism exposed and in a retracted state.

In the embodiment shown in FIG. 1B, a two-stage scissor lift mechanism 150 resides in between the mobile drive base 160 and the middle deck 140 of the mobile robot, so that the upper deck 101 and middle deck 140 can be raised or lowered together relative to the mobile drive base 160 of the mobile robot and/or the floor surface. This allows the upper surfaces 142, 102 of the middle deck 140 and the upper deck 101 to be adjusted to align with extrinsic support surfaces at different heights to enable items to be slid from one support surface to the other without necessary needing to be lifted. The scissor lift mechanism is powered by a linear actuator 151 and includes at least one sensor and/or encoder to detect the amount of the vertical extension of the scissor lift. The scissor lift mechanism 150 in FIG. 1B is configured so that the vertical distance between minimum operating height of the lift mechanism and the maximum operating height of the lift mechanism is greater than the vertical distance between the upper surface 142 of the middle deck 140 and the upper surface 102 of the upper deck 101, so that the range of the adjustable vertical heights of the two upper surfaces 142, 102 can overlap.

Figure 6A:
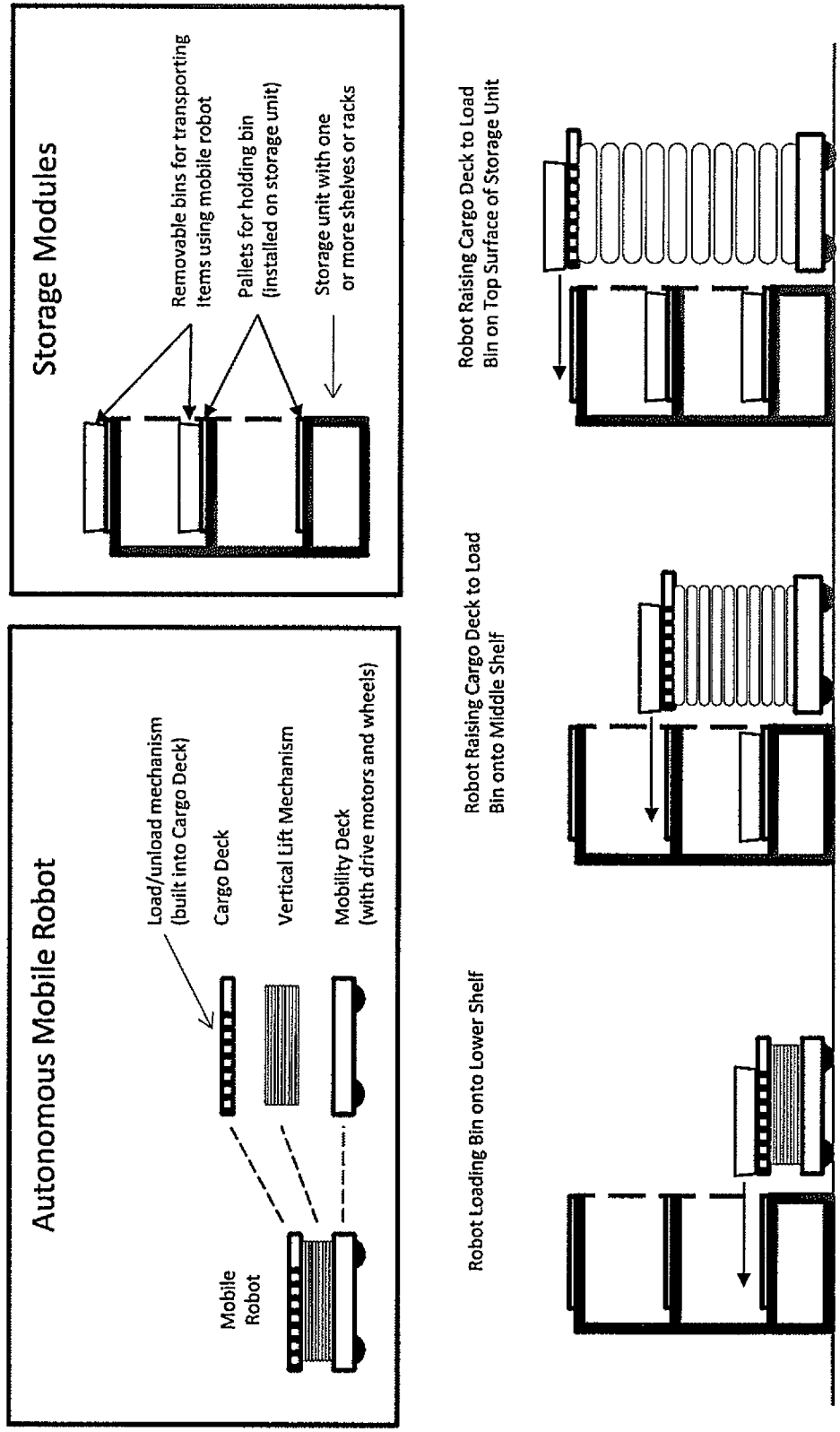
FIG. 6A is a schematic diagram showing system components of a mobile robot having a single cargo deck according to one embodiment, and showing steps employed in loading bins onto shelves of different heights.
Figure 6B:
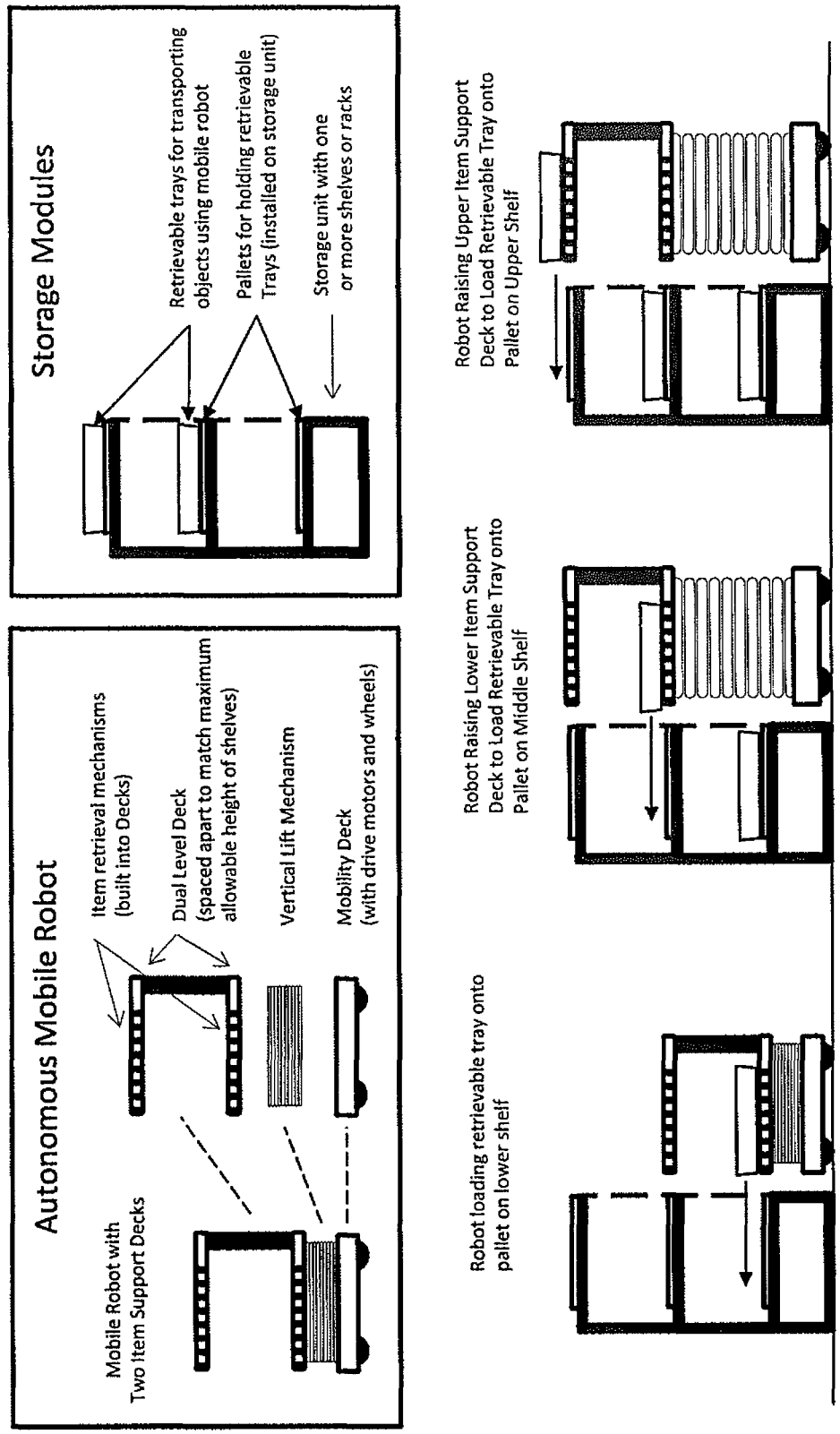
FIG. 6B is a schematic diagram showing system components of a mobile robot having multiple cargo decks according to one embodiment, and showing steps employed in loading bins onto shelves of different heights.
Figure 6C:
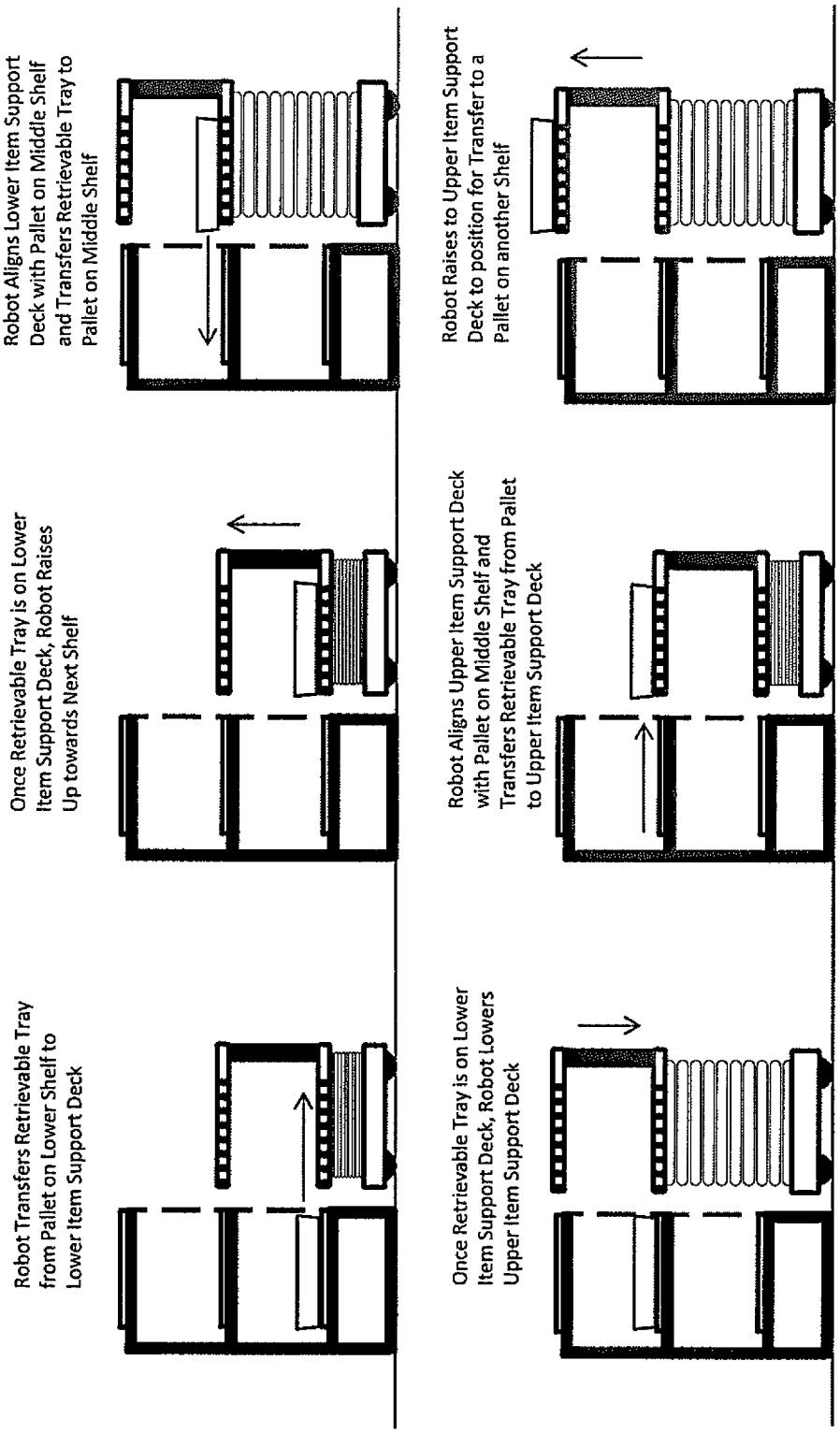
FIG. 6C is a schematic diagram showing steps employed in transferring bins between different cargo decks of a mobile robot according to one embodiment.

In certain embodiments, this overlapping range of vertical travel of two support surfaces can be used to transition items between a common extrinsic support surface that resides at a height within the overlapping range of travel of the two support surfaces. FIG. 10 shows an embodiment of a mobile robot where the lifting mechanism has compressed to lower the height of both the upper deck 101 and middle deck 140 to the point where upper deck 101 shown in FIG. 10 is at the same height as the middle deck 140 shown in FIG. 1A. In certain embodiments, where both decks 101, 140 include item retrieval mechanisms, the middle deck 140 can retrieve an item from an extrinsic support surface at the height of the middle deck 140 as shown in FIG. 10, the middle deck 140 can then raise up and transfer the item to a second extrinsic support surface at the height of the middle deck 140 in FIG. 1A, the upper deck 101 than can lower to the position shown in FIG. 10 and retrieve the item from the second extrinsic support surface. An embodiment of this transition process between different extrinsic supports and different decks at different heights is shown in FIGS. 6A, 6B and 6C.

In certain embodiments, the scissor lift may include one or more segments depending on the range of heights required. In certain embodiments, alternative mechanisms can be used to adjust the height and/or position of one or more elements of the mobile robot, including but not limited to one or more linear actuators, one or more powered rails driven with one or more lifting points travelling along the rail, a pivoting arm with one or more rotating joints, and/or a telescoping lifting column with one or more telescoping segments. In certain embodiments, a combination of lifting mechanisms may be used as part of a single mobile robot.

In an example of an embodiment of the mobile robot, a vertical lifting mechanism may exist as part of the support column 130 in FIG. 1A. In certain embodiments, a segment of the support column can move vertically relative to another segment to raise and/lower the upper deck and/or other decks relative to another part of the mobile robot. In certain embodiments, the upper deck and/or other decks can travel along a linear track connected to the support column to raise and/lower the upper deck and/or other decks relative to each other and/or another part of the mobile robot.

In certain embodiments, the lifting mechanism of a mobile robot can adjust its height in response to an end user's request, the end user's relative position to the robot, the height of a nearby item of furniture and/or extrinsic surface, a recorded height associated with a location on a map, one or more markers used to indicate a position, and/or a task being performed. In certain embodiments, the mobile robot can include one or more sensors to vertically align the upper surface of the upper deck and/or other support surface of the mobile robot with an extrinsic surface and/or other object automatically based on the height of the extrinsic surface and/or other object, one or more markers and/or height associated with a location on a map.

Level and Stabilization Mechanisms

In certain embodiments, one or more mechanisms that enable the horizontal movement, rotation and/or tilt of one or more support surfaces and/or other elements of a mobile robot can be used in isolation and/or in combination with one or more lifting mechanisms to adjust the position of the support surfaces and/or other elements on the mobile robot within a three-dimensional space. In certain embodiments, a mobile robot can include one or more sensors to read the relative position of one or more of its support surfaces and/or other elements, wherein the sensors may include, but are not limited to, gyroscopes, accelerometers, proximity and/or other sensors that measure changes in orientation and/or position relative to other objects and/or to a prior position. In certain embodiments, one or more of these mechanisms and/or sensors can be used to help level and/or stabilize one or more support surfaces and/or other elements of the mobile robot when the mobile robot travels over uneven floor surfaces and/or surface obstacles.

Item Retrieval Mechanisms

In certain embodiments, a mobile robot can include one or more item retrieval mechanisms that provide the means to laterally transition retrievable items between an item support surface of the mobile robot and one or more extrinsic support surfaces. These mechanisms can enable the mobile robot to retrieve retrievable items from one or more extrinsic surfaces in certain locations and carry the retrievable items to other locations. These mechanisms may also enable the mobile robot to carry and place retrievable items onto one or more extrinsic surfaces. These mechanisms may include one or more moveable implements that are integrated on, under, or within one or more support surfaces of the mobile robot, where the moveable implements can engage one or more receiving surfaces on a retrievable item to push and/or pull the retrievable item as the movable implement moves laterally. In certain embodiments, movable implements associated with a support surface of a mobile robot are arranged below the support surface during storage and during all or substantially all item retrieval and/or transport steps. In certain embodiments, at least one movable implement is configured to travel below the deck of a robotic item retrieval and/or transport apparatus.

In the embodiment shown in FIG. 1A, the upper deck 101 of the mobile robot 100 includes movable implements in the form of two item retrieval arms that are stored beneath the upper surface 102 of the upper deck and extend through two openings 110-1, 110-2 proximate to the front side of the upper deck along the front edge 103.

Figure 2A:
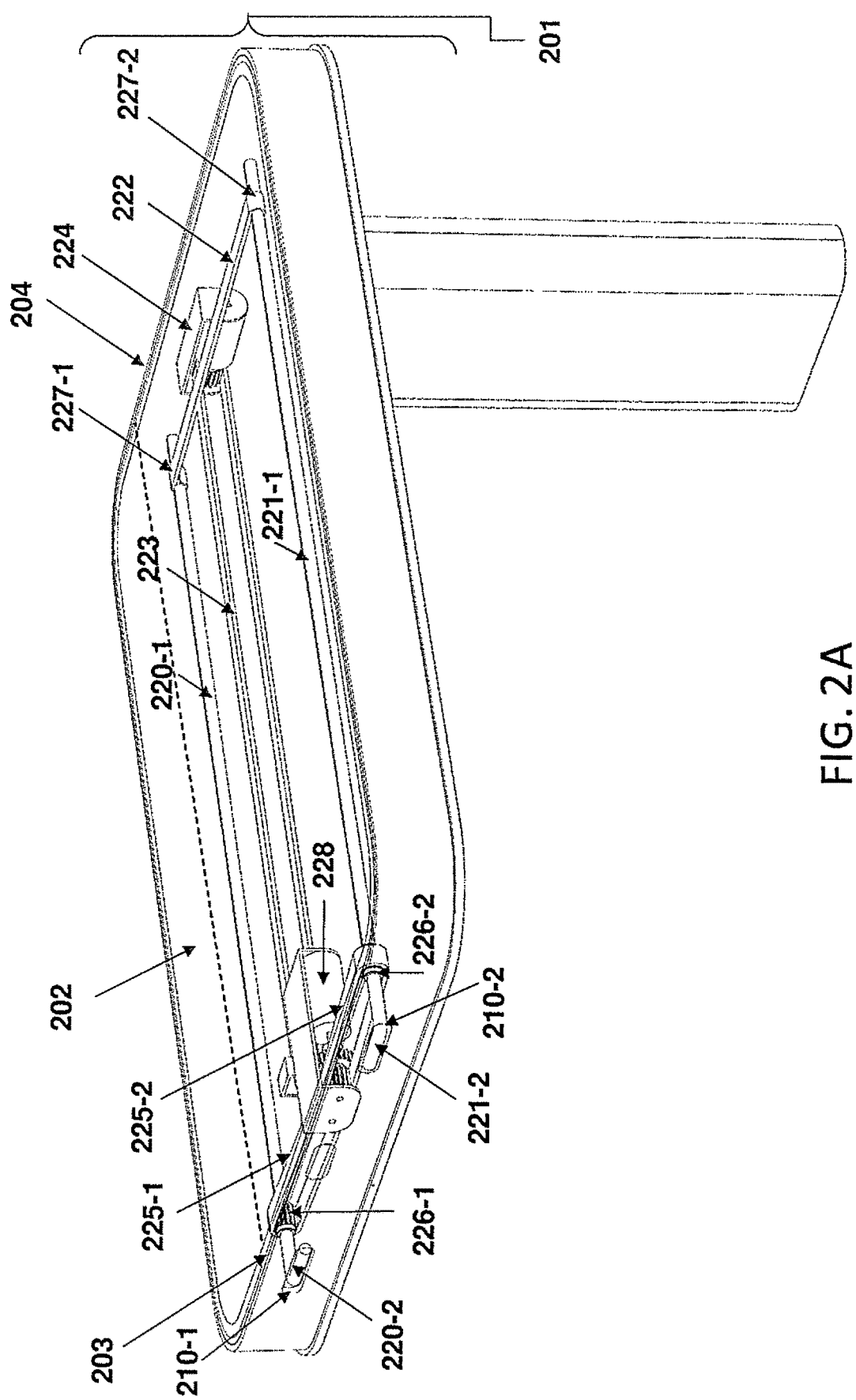
FIG. 2A is a partially transparent, upper perspective view of the upper deck assembly of the mobile robot of FIGS. 1A-1D, showing components of an item retrieval mechanism in a retracted state.

FIG. 2A provides an internal view of an embodiment of the item retrieval mechanism within the upper deck assembly 201 of a mobile robot. In FIG. 2A, two item retrieval arms 220-1, 220-2 are arranged below the upper surface 202 of the upper deck and generally perpendicular to the forward lateral edge 203 of the upper deck 201 of the mobile robot. The two item retrieval arms 220-1, 221-1 are configured to extend forward from the forward lateral edge 203 of the upper deck through openings 210-1, 210-2, and to travel in reverse to retract back under the upper surface 202 of the upper deck 201. The two retrieval arms 220-1, 221-1 are connected to a support bracket 222 that connects to lateral drive belt 223 that is driven by a motor 224 with an encoder, where the support bracket, lateral drive belt, motor and encoder all reside under the upper surface 202 of the upper deck 201. In this embodiment, the lateral drive belt 223 is arranged parallel to a translation direction of the retrieval arms 220-1, 221-1. In operation, the motor 224 can rotate in one direction to drive the lateral drive belt and support bracket 222 forward relative to the front edge 203 of the upper deck of the mobile robot, and the motor can rotate in the opposite direction to drive the lateral drive belt and support bracket backward relative to the front edge upper deck of the mobile robot. The support bracket 222 connects toward the rearward ends of the retrieval arms 220-1, 221-1 relative to the front edge 203 of the upper support surface 202 of the upper deck. The support bracket 222 is configured to drive the retrieval arms 220-1, 221-1 forward as the lateral drive belt 223 drives the support bracket 222 forward toward the front edge of the robot. The support bracket 222 pulls the retrieval arms 220-1, 221-1 back as the lateral drive belt 223 drives the support bracket 222 backward relative to the front edge of the robot.

In the embodiment shown in FIG. 2A, the length of the upper deck 201 as measured from the front edge 203 backward to the rear edge 204 of the upper deck exceeds the length of the retrieval arms 220-1, 221-1, so that the entire length of the retrieval arms can be pulled under the upper surface 202 of the upper deck when the support bracket 222 is retracted toward the rear edge 204 of the upper deck.

In certain embodiments, the item retrieval mechanism can include one or more retrieval arms with retrieval tips at their forward ends, opposite to the end near where the retrieval arms connect the support bracket, where the retrieval tips are perpendicular to the direction of the main body of the retrieval arm and/or the lateral direction of travel of the retrieval arms. In certain embodiments, the retrieval tips can be positioned in one mode to engage one or more receiving surfaces located on a retrievable item in order to move the retrievable item laterally with the motion of the retrieval arms, enabling the retrieval mechanism to push and/or pull a retrievable item between a support surface of the robot and/or an extrinsic support surface. In certain embodiments, the retrieval tips can be positioned in a different mode to not engage the receiving surfaces of a retrievable item, enabling the retrieval tips and/or retrieval arms to travel under and/or around part of the surface of the retrievable item without causing the retrievable item to move. In certain embodiments, these two modes can be utilized at different stages to enable the retrieval tips and retrieval arms to: travel to a desired position under the retrievable item, reposition the retrieval tips to engage one or more receiving surfaces of the retrievable item, move the retrievable item with the motion of the retrieval arms, and then reposition the retrieval tips to disengage the receiving surfaces of the retrievable item once the retrievable item has been moved to a new desired location.

Figure 2B:
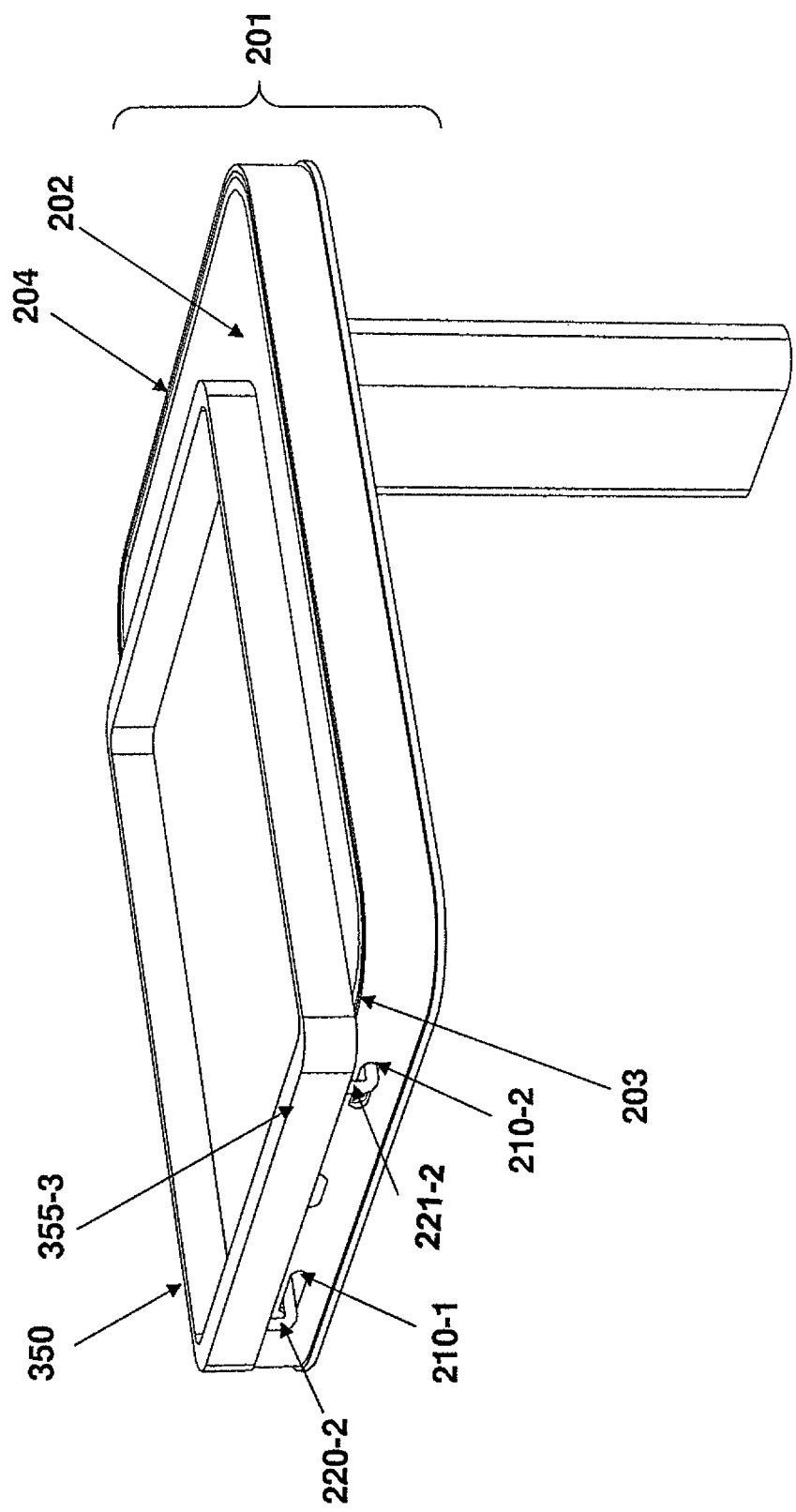
FIG. 2B is an upper perspective view of the upper deck assembly of FIG. 2A, with a retrievable tray positioned atop an upper surface thereof.

In the embodiment shown in FIG. 2A, the retrieval arms 220-1, 221-1 have retrieval tips 220-2, 221-2 that appear as small extensions that are perpendicular to a longitudinal axis extending through the main body of the retrieval arms on the end of the retrieval arm opposite of the support bracket 222. In the embodiment shown in FIG. 2A, each retrieval tip 220-2, 221-2 is rigidly connected to its respective retrieval arm 220-1, 221-1. When the retrieval arms 220-1, 221-1 are fully retracted within upper deck 201, the retrieval tips 220-2, 221-2 are positioned horizontally, below and parallel to the upper surface 202 of the upper deck. When the retrieval tips 220-2, 221-2 are extended outward past the front edge 203 of the upper deck 201, each retrieval arm 220-1, 221-1 can be rotated approximately 90 degrees to a vertical position, so that the ends of the retrieval tips are above the rest of the retrieval arm. In the embodiment shown in FIG. 2B, the retrieval tips 220-2, 221-2 extend above the level of the upper surface 202 of the upper deck 201 when they are rotated to a vertical position once past the front edge 203 of the upper deck 201. This raised position of the retrieval tips 220-2, 221-2 can be used to engage surfaces of retrievable items that are resting upon the upper surface 202 of the upper deck 201 and/or upon extrinsic support surfaces that are close to the same height as the upper surface of the upper deck. In the embodiment shown in FIG. 2B, the retrieval tips are extended to the vertical position with the uppermost section of the retrieval tips 220-2, 221-2 nested within an undercut pocket near the edge 355-3 of the retrievable tray 350 that is resting on the support surface 202 of the upper deck 201.

A second motor 228 with an encoder shown in FIG. 2A near the front edge 203 of the upper deck 201 enables the rotation of the retrieval tips 220-2, 221-2. A set of gears connect the second motor 228 to two drive belts 225-1, 225-2, where each drive belt then connects to pass-through rotation gears 226-1, 226-2 that are positioned around each retrieval arms 220-1, 221-1. In combination with the second motor 228, encoder, set of gears and drive belts 225-1, 225-2, each pass-through rotation gear 226-1, 226-2 controls the rotational angle of the retrieval arm 220-1, 221-1 with which it connects, while allowing each retrieval arm to travel forward and backward through the center of its respective pass-through rotation gear. Each retrieval arm 220-1, 221-1 is connected to a sleeve 227-1, 227-2 on the support bracket 222 on the opposite end that allows the retrieval arm to rotate, but not travel laterally relative to the support bracket.

In the embodiment shown in FIG. 1, the upper surface 102 of the upper deck 101 of the mobile robot is solid and/or sealed off from the item retrieval mechanism that is contained below the upper surface of the upper deck. The openings 110-1, 110-2 for the retrieval arms are arranged below the upper surface 102 of the upper deck 101 along the front side wall 104 of the upper deck below the front edge 103.

In certain embodiments, the openings 110-1, 110-2 may be recessed relative to the front edge 103 and/or sloped at an inward angle relative to the upper surface 102 of the upper deck 101 so that fluid, debris, and/or other matter that falls or flows downward from the upper deck is unlikely to enter the openings used by the retrieval arms and enter into the space within the upper deck that the other moving parts of the item retrieval mechanism occupy.

In certain embodiments, the upper surface 102 of the upper deck 101 can be washable with water and/or a cleaning solution using a cleaning implement, such as a sponge, sprayer, towel, and/or wipe. In certain embodiments, the upper surface 102 of the upper deck 101 may be configured as a tray or other portion that is removable from a remainder of the upper deck assembly to be cleaned, and then to be reattached to the remainder of the upper deck assembly once the upper surface 102 is cleaned.

In certain embodiments, the openings for the retrieval arms can include flaps and/or doors that close when the retrieval arms and/or retrieval tips are retracted into the upper deck and/or other support surface of a mobile robot, in order to provide additional protection against fluid and/or debris entering the internal area of the item retrieval mechanism. In certain embodiments, the flaps and/or doors can be opened and closed by the motion of the retrieval arm when it extends out and retracts back into the upper deck and/or other support surface.

In certain embodiments, an area along the front edge of the upper deck and/or another support surface of a mobile robot may be recessed a set distance from an exterior-most point of the front edge of the upper deck and/or other support surface. This recessed edge can be arranged around one or more areas where the one or more retrieval arms travel outward from below the upper surface of the upper deck and/or other support surface of the mobile robot. The recessed edge may enable the retrieval tips of the retrieval arms to retract past the exterior-most point of the front edge of the upper deck and/or other support surface, and pull the rear edge of the retrievable item within the exterior-most point of the front edge of the upper deck and/or other support surfaces of the mobile robot. This arrangement may enable the full footprint of the retrievable item to be positioned within the footprint of the mobile robot and/or with outermost points formed by the sides of the upper deck and/or other support surface of the mobile robot.

Figure 2C:
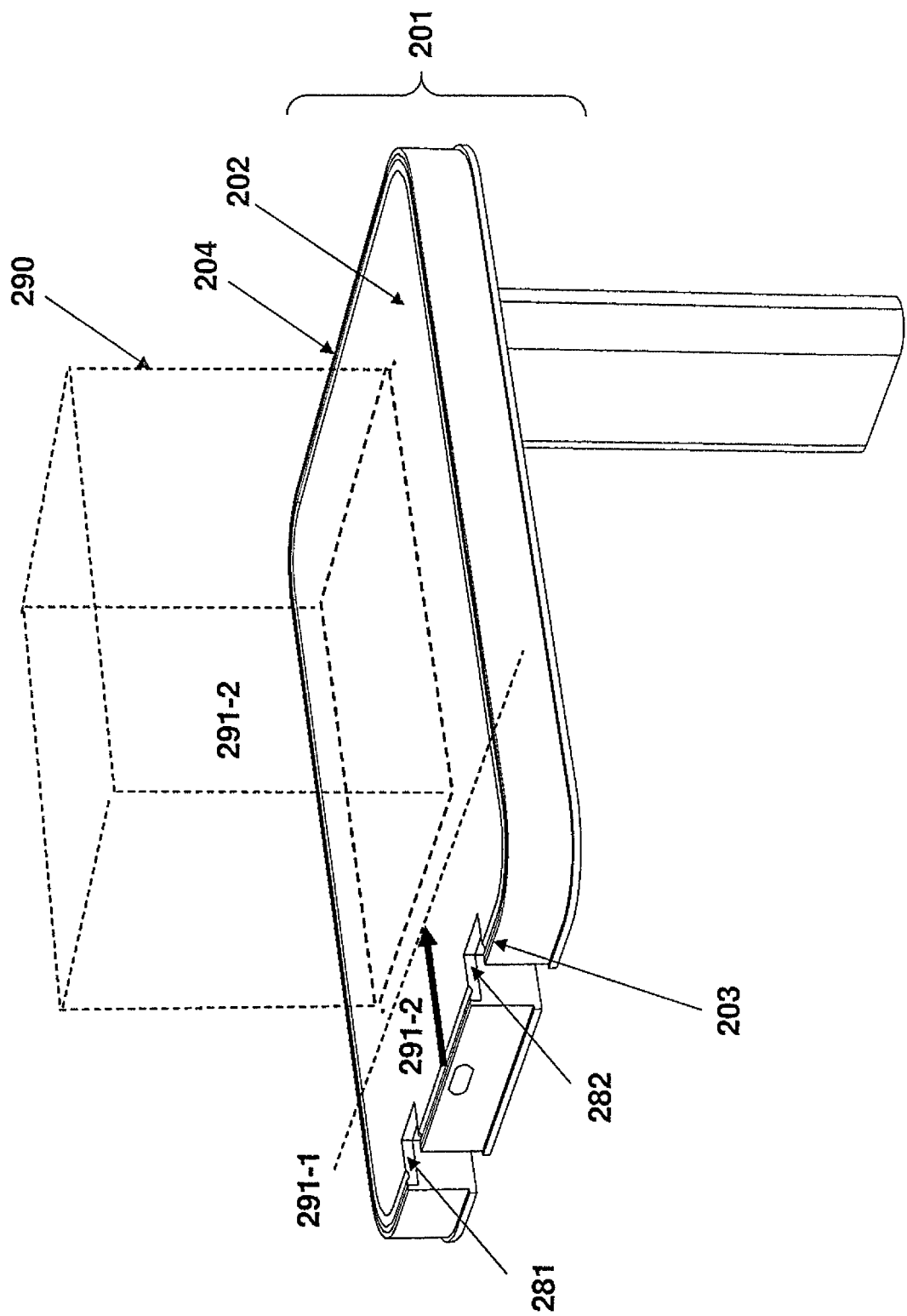
FIG. 2C is an upper perspective view of an upper deck assembly having recessed areas around openings for retrieval arms according to one embodiment, showing a virtual box positioned on the upper surface of the upper deck, the virtual box indicating an arbitrary volume of space designed to be free of intrusion from and/or free of risk of contact with any element of the item retrieval system of the mobile robot.
Figure 2D:
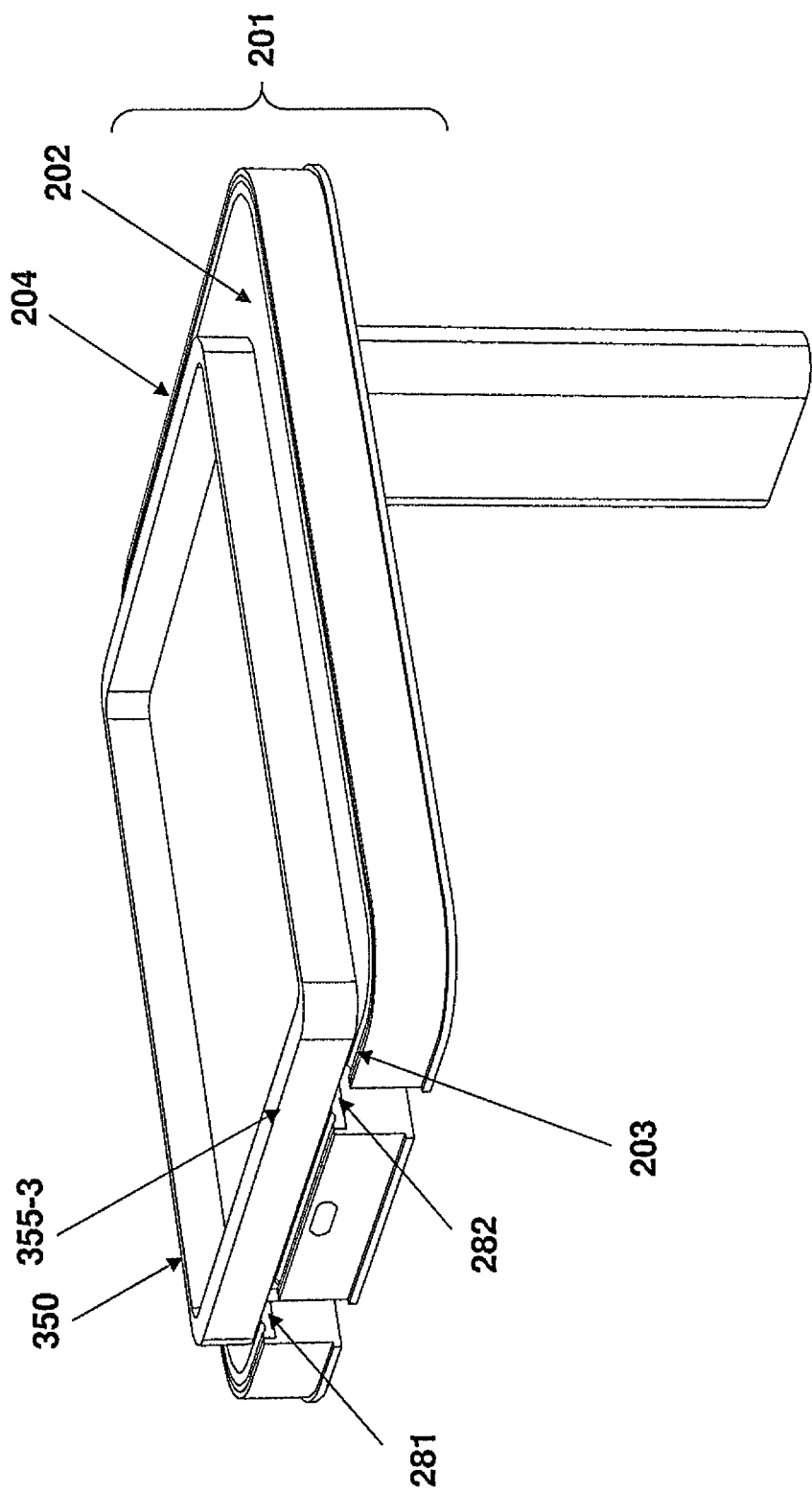
FIG. 2D is an upper perspective view of the upper deck assembly of FIG. 2C with a retrievable tray positioned atop an upper surface thereof.

FIG. 2C shows an embodiment of the upper deck of the mobile robot in which areas 281, 282 around the openings for the retrieval arms are recessed relative to the other areas of the front side of the upper deck. FIG. 2D shows a retrievable tray retracted into position based on the available range of travel of the retrieval arms and retrieval tips within the recessed areas 281, 282 of the upper deck, where the retrievable tray 350 sits on the upper surface 202 of the upper deck 201 and the front side 355-3 of the retrievable tray is recessed inward relative to the front side 203 of the upper deck. In FIG. 2C a virtual box 290 is positioned on the upper surface 202 of the upper deck 201, where the virtual box 290 indicates an arbitrary volume of space designed to be free of intrusion from and/or free of risk of contact with any element of the item retrieval system of the mobile robot, denoted as a protected space or volume. In certain embodiments, a portion of the upper surface and/or the area above the upper deck and/or other support surface of the mobile robot can be defined as a protected space to separate and/or protect adults, children and pets from the item retrieval mechanism and/or other moving elements of the mobile robot. In certain embodiments, this protected space or volume may overlap or include all the area of the upper surface of the upper deck and/or other support surface of the mobile robot. In an embodiment shown in FIGS. 2A and 2B, the item retrieval mechanism either remains below the upper surface 202 of the upper deck 201 in the stored position or extends out in front of the front edge 203 of the upper deck when engaged in retrieving and/or holding retrievable item.

In certain embodiments, a portion of upper surface and/or area above the upper deck and/or other support surfaces of the mobile robot may be designed to allow access to one or more elements of the item retrieval mechanism and/or other element of the mobile robot, while still maintaining minimal exposure to adults, children, and/or pets. In certain embodiments, this protected area can be defined by a central volume of space emanating from a central target area of the upper deck and/or other support surface of the mobile robot, such as depicted by the virtual box 290 in FIG. 2C. In certain embodiments, this protected space or volume can be defined by an area free of inward intrusions of a certain distance from outside one or more of the peripheral edges of the upper deck and/or other support surface of the mobile robot, where the distance of the intrusion is limited relative to the maximum length and/or maximum width of the upper deck and/or other support surface of the mobile robot. FIG. 2C shows a virtual line 291-1 that marks an arbitrary limit of distance 291-2 of intrusion from the front edge 203 of the upper deck 201 of the mobile robot by an element of the item retrieval mechanism and/or other element of the mobile robot. In certain embodiments, the protected area can be defined as a minimum percentage of the footprint of the upper deck and/or other support surface of the mobile robot.

Extrinsic Support Surfaces

In certain embodiments, a system of retrievable items and extrinsic support surfaces can be designed to work with the item retrieval mechanism and support surfaces of the mobile robot.

In certain embodiments, the extrinsic support surface can be (or include) a pallet that holds retrievable items in a manner such that one or more retrievable items can be transferred between the pallet and a support surface of the mobile robot. In certain embodiments, a pallet can include one or more support surfaces upon which a retrievable item rests. In certain embodiments, a pallet can include one or more recessed channels that provide space for the retrieval arms of the mobile robot to travel under the retrievable item.

In certain embodiments, the retrievable item can be or include a retrievable tray, bin, box or basket configured to carry one or more objects, and configured to be transferred between one or more pallets and one or more of the support surfaces on the mobile robot.

In certain embodiments, the retrievable item can be stored on the surface of a pallet, another extrinsic support surface, and/or a support surface of a mobile robot. In certain embodiments, the retrieval item may include receiving surfaces at one or more ends of the retrievable item that can be engaged by one or more retrieval tips of one or more retrieval arms of a mobile robot when the retrievable item is resting on a pallet and/or on support surface of a mobile robot that is compatible with the item retrieval mechanism of the mobile robot.

Figure 3A:
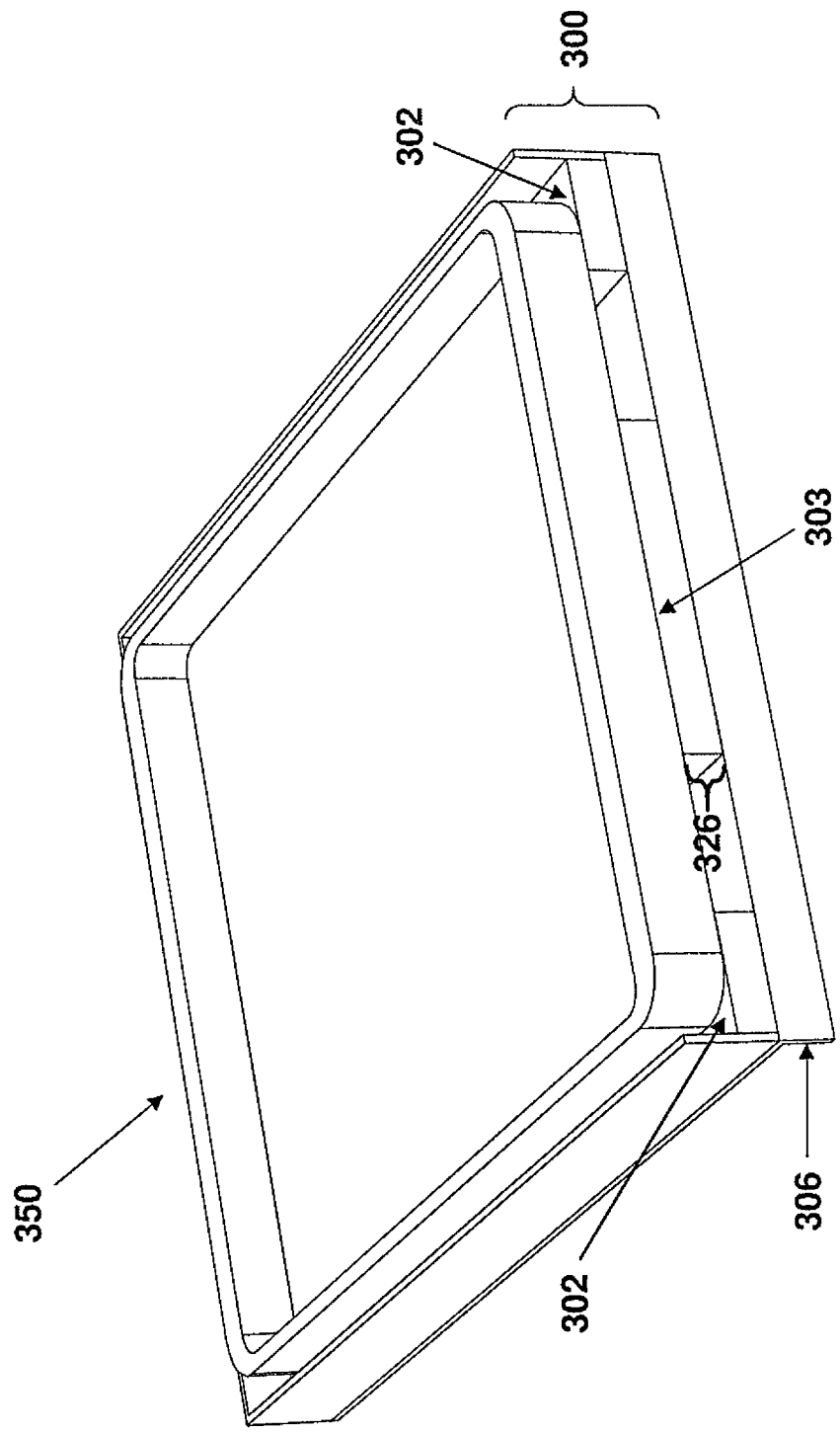
FIG. 3A is an upper perspective view of a pallet supporting a retrievable tray according to one embodiment, the pallet providing an extrinsic support surface for the retrievable tray to permit retrieval of the tray by a mobile robot as described herein.

FIG. 3A shows an embodiment of a pallet 300 that provides an extrinsic support surface for a retrievable tray 350 that can be retrieved by mobile robot with an item retrieval mechanism.

Figure 3B:
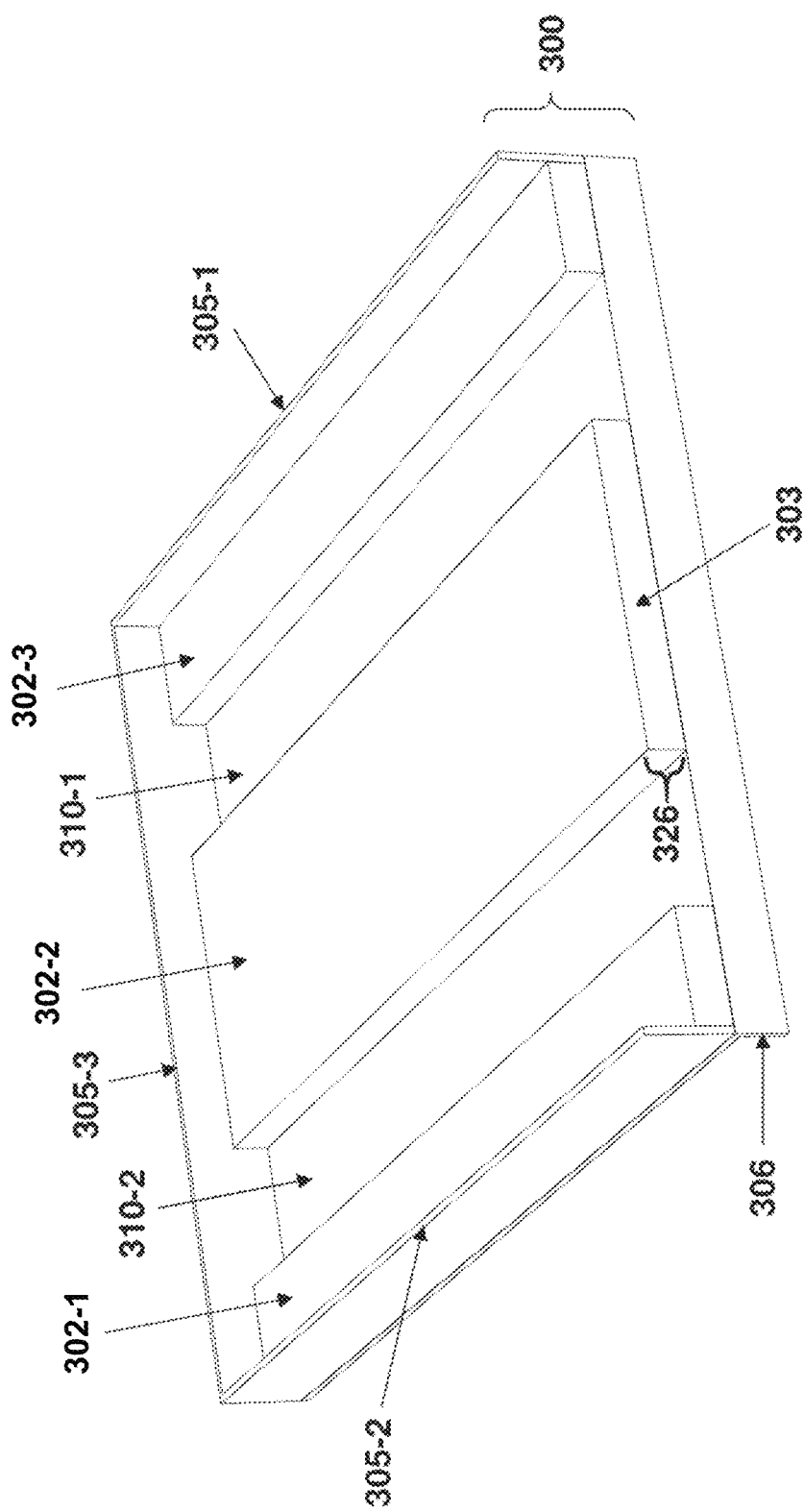
FIG. 3B is an upper perspective view of the pallet of FIG. 3A without a retrievable tray arranged thereon.

FIG. 3B shows an embodiment of a pallet 300 without the presence of a retrievable tray or any retrievable item. In the embodiment shown in FIG. 3A, the pallet 300 includes upper horizontal surface including three separate sections 302-1, 302-2, 302-3 that share a common plane and sit above the recessed channels 310-1, 310-2. The upper horizontal surface of the three sections 302-1, 302-2, 302-3 provides the extrinsic support surface for the retrievable tray to rest upon. The two recessed channels 310-1, 310-2 are oriented perpendicular to the front edge 303 of the pallet 300 and align with the lateral spacing of the two retrieval arms that extend from the front edge of the mobile robot. The height 326 of the recessed channels within the pallet 300 in FIG. 3A is greater than the minimal height of the retrieval tips and the retrieval arms to allow the retrieval tips and the retrieval arms to travel within the vertical space bounded by the vertical walls of the recessed channels. The two sides of the pallet are bounded by two vertical walls 305-1, 305-2 that rise above the upper horizontal surface 302-1, 302-2, 302-3 in order contain the retrievable tray within the sides of the pallet. The rear side of the pallet opposite the front edge 303 of the pallet is bounded by a vertical wall 305-3 that also rises above the upper horizontal surface 302-1, 302-2, 302-3 in order to contain the retrievable tray within rear side of the pallet.

In the embodiment shown in FIG. 3B, an area along the front edge 303 of the pallet 300 is open in the areas above the recessed channels 310-1, 310-2 to enable lateral entry and exit of the retrieval arms of the mobile robot that travel within the recessed channels during transfer of a retrievable item. An area along the front edge 303 of the pallet 300 is open in the areas above the upper horizontal surface 302-1, 302-2, 302-3 to enable lateral entry and exit of a retrievable item that travels on the upper horizontal surface of the pallet during transfer of a retrievable item.

In the embodiment shown in FIG. 3C, the pallet 300 is shown with the retrieval arms 220-1, 221-1 travelling within the recessed channels 310-1, 310-2 of the pallet. The retrieval arms 220-1, 221-1 are rotated so that the retrieval tips 220-2, 221-2 are in a horizontal position to maintain a minimal height as the retrieval tips and retrieval arms travel within the recessed channels 310-1, 310-2 of the pallet 300.

In certain embodiments, the horizontal support surfaces and the recessed channels of the pallet can be configured in different ways, so long as they provide an adequate support surface for holding the retrievable tray along with space for one or more retrievable arms to travel under the retrievable tray. In certain embodiments, the center horizontal support surface 302-2 of the pallet 300 shown in FIG. 3B can be removed and the two recessed channels 310-1, 310-2 can be replaced with one single recessed channel.

In the embodiment shown in FIG. 3B, the front side of the pallet 300 also includes a forward lip 306 that extends downward below the surface of the pallet under the recessed channels 310-1, 310-2. The forward lip 306 provides a surface for aligning the pallet with an underlying support surface on which the pallet rests, and provides a physical barrier to help prevent the pallet from being pushed past the corresponding forward edge of the underlying support surface.

In certain embodiments, a front surface of the upper deck and/or other support surface of a mobile robot can press against the front lip and/or other front surface of the pallet during the retrievable item transition process. Such arrangement may prevent the pallet from being pulled in the direction of the mobile robot when the retrieval arms retract and pull the retrievable item from the surface of the pallet and onto the upper surface of the upper deck and/or other support surface.

Figure 8A:
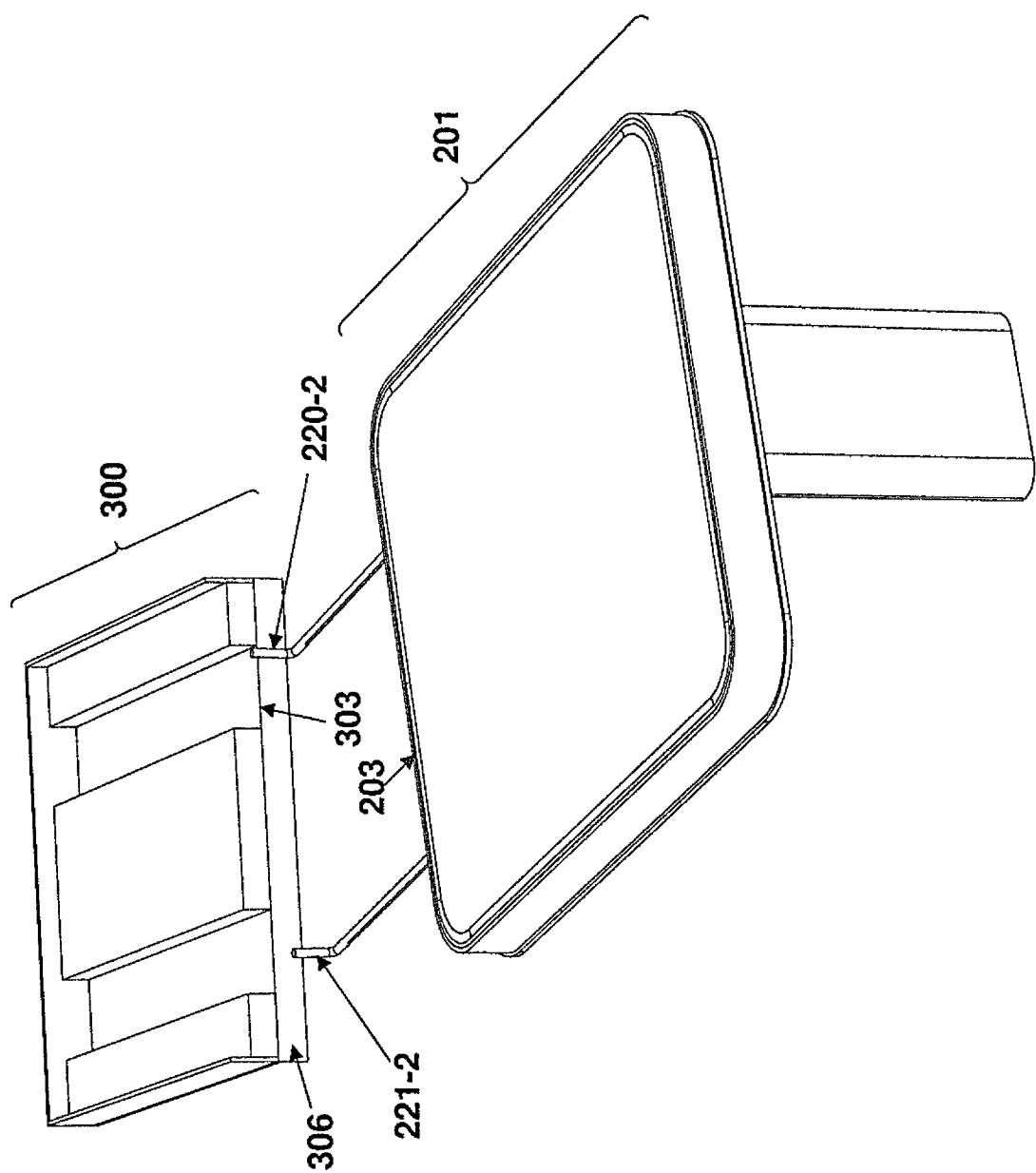
FIG. 8A is an upper perspective view of an upper deck assembly of a mobile robot according to one embodiment, with retrieval tips extended from the upper deck assembly to make contact with a front portion of a pallet assembly to push the pallet assembly into alignment.

In certain embodiments, a front surface of the upper deck and/or other support surface of a mobile robot can press against the front lip and/or other front surface of the pallet when the mobile robot is aligning with the pallet, in order to push the pallet into the correct position onto the surface it is resting upon in cases where the pallet has become misaligned and/or is extended off the forward edge of the surface it is resting upon. In certain embodiments, the front surface of the upper deck and/or other support surface of the mobile robot can include one or more protruding elements that can make contact with the front lip and/or other front surface of the pallet to push the pallet into alignment. In certain embodiments, these protruding elements can be mechanically operated to extend into position when needed. In certain embodiments, the retrieval tips of the retrieval arms can be extended from the upper deck and/or other support surface of the mobile robot to make contact with the front lip and/or other front surface of the pallet to push the pallet into alignment. In the embodiment shown in FIG. 8A, the retrieval tips 220-2, 221-2 are extended out in front of the front side 203 of the mobile robot at the same distance, and rotated in a vertical position so that as the robot travels forward, the retrieval tip 220-2 will make first contact at a point along the right half of the front side 303 of the pallet 300, and cause the right side of the pallet to push back and come into better alignment with the front side 203 of the upper deck 201 of the mobile robot.

Retrievable Items

Figure 3D:
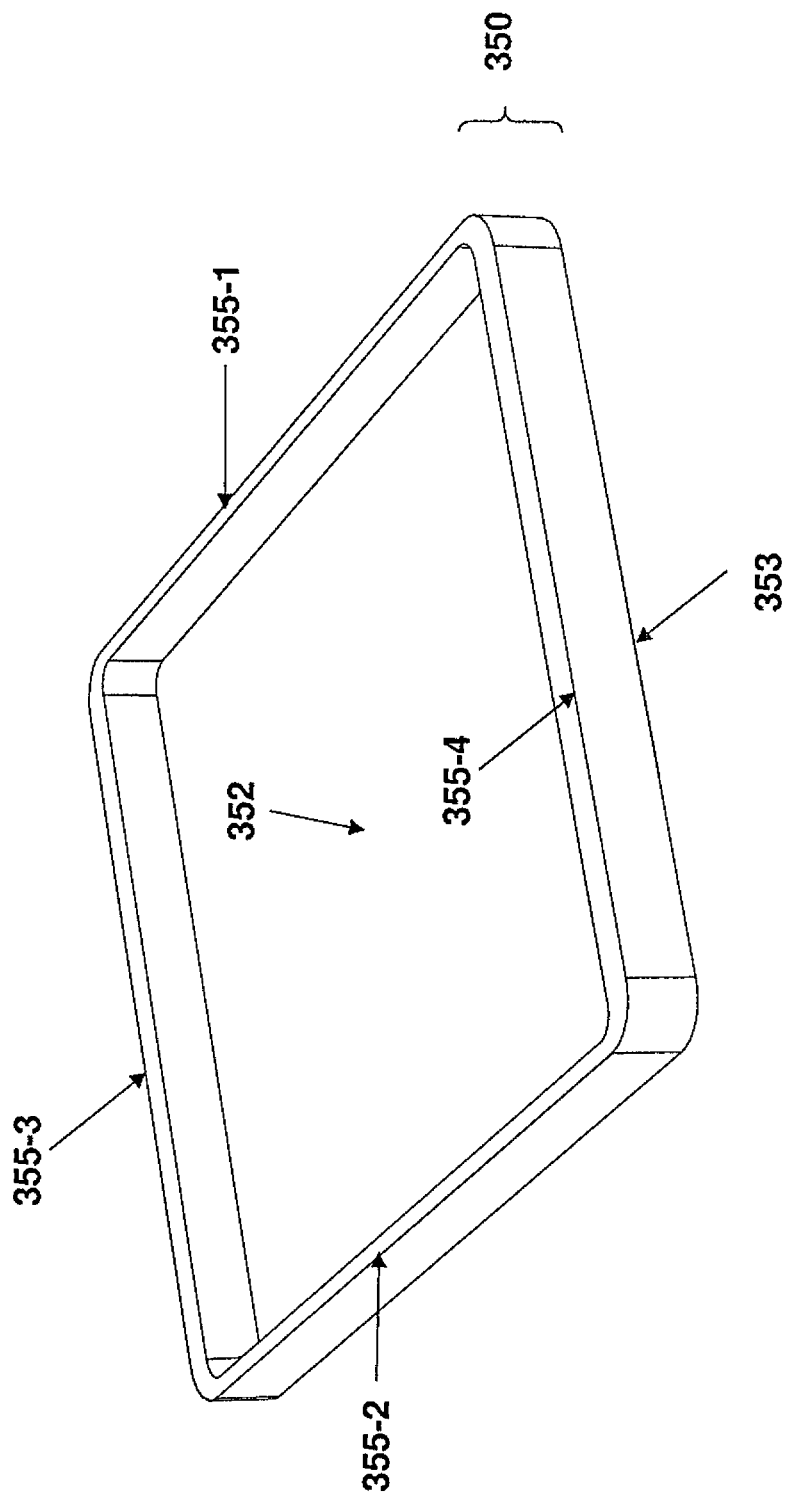
FIG. 3D is an upper perspective view of a retrievable tray according to one embodiment, the retrievable tray being suitable for use with a pallet and with a mobile robot as described herein.

FIG. 3D shows an embodiment of a retrievable tray 350 without the presence of a pallet or any extrinsic support surface. In the embodiment shown in FIG. 3D, the retrievable tray 350 includes a central horizontal section that includes an upper surface 352 suitable can hold one or more objects, and includes an underside surface 353 that can rest upon the upper horizontal surface of the pallet, another extrinsic support surface, and/or a support surface of the mobile robot. The retrievable tray 350 also includes four side walls 355-1, 355-2, 355-3, 355-4 that can help contain objects that are placed within the retrievable tray.

FIG. 3A shows an embodiment of a pallet 300 that serves as an extrinsic support surface for a retrievable tray 350, where the side wall 355-4 of the retrievable tray sits closest to the front edge 303 of the pallet and the side of the retrievable tray labelled 355-3 sits closest to the rear vertical wall 305-3 of the pallet. If the retrievable tray 350 is pushed fully into the pallet 300 as shown in FIG. 3A, the exterior of the side wall 355-3 of the retrievable tray would make contact with the interior of the rear vertical wall 305-3 of the pallet, where the rear vertical wall of the pallet would prevent the retrievable tray from moving any further into the pallet and/or help align the retrievable item relative to the rear vertical wall of the pallet. In the position shown in FIG. 3A, the side walls 355-2, 355-1 of the retrievable tray 350 sits inside of the side vertical walls 305-1, 305-2 of the pallet 300, where the side vertical walls 305-1, 305-2 of the pallet can help contain and/or align the retrievable tray during manual placement by a person and/or automatic retrieval or placement by the mobile robot.

Figure 3E:
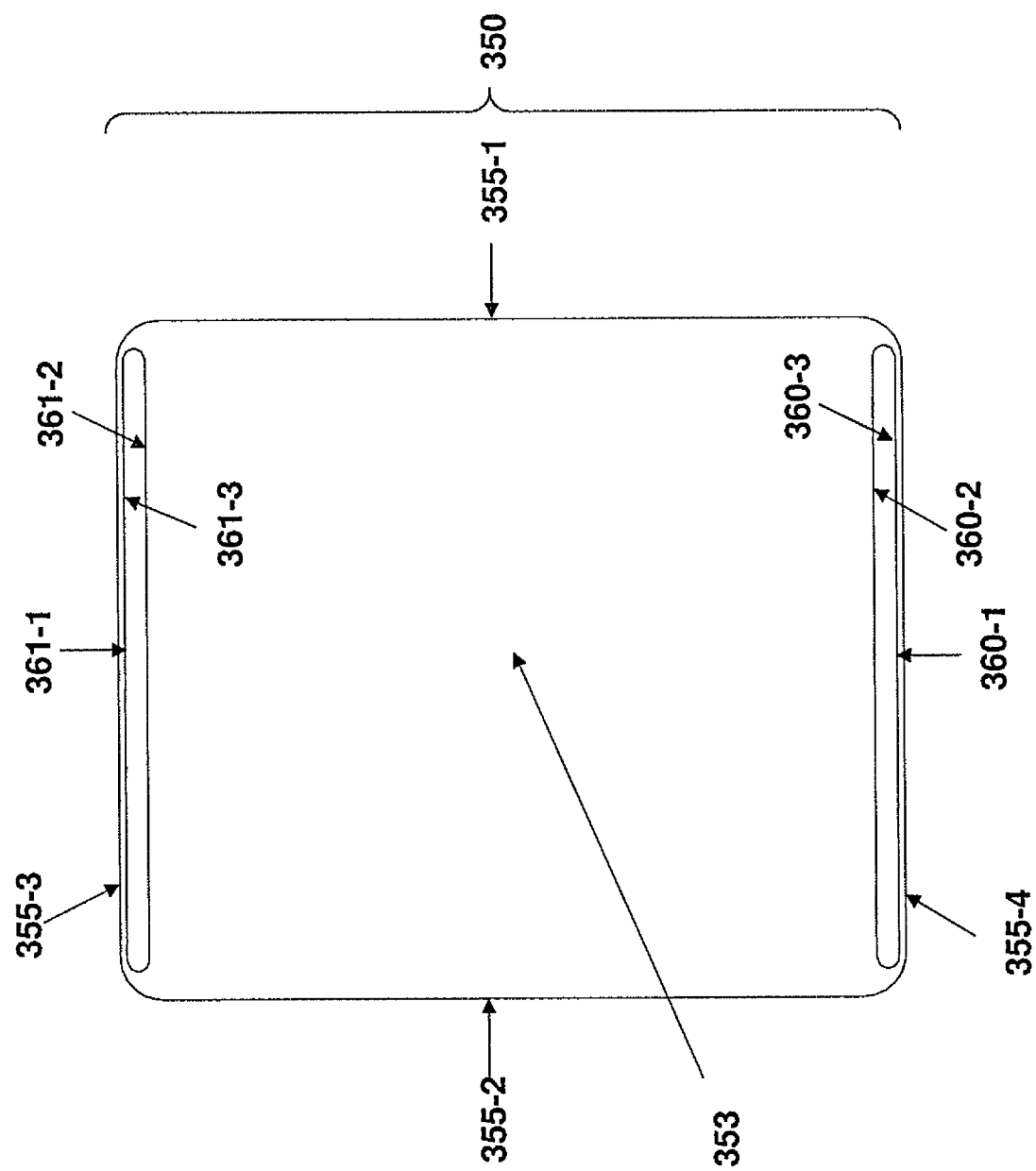
FIG. 3E is a bottom plan view of a retrievable tray according to one embodiment of the present disclosure.

FIG. 3E shows an embodiment of a retrievable tray 350 from an underside view, where the surface 353 represents that underside surface of the retrievable tray that rests upon the upper horizontal surface of the pallet, another extrinsic support surface and/or a support surface of the mobile robot. The edges along the four side walls 355-1, 355-2, 355-3, 355-4 are arranged so that the side walls 355-4, 355-3 form the ends of the retrievable tray 350, and where the ends are perpendicular to the lateral direction of movement when the retrievable tray transitions between the pallet 300 and a support surface of the mobile robot.

In the embodiment shown in FIG. 3E, the side walls 355-4, 355-3 include receiving pockets 360-1, 361-1 that are formed by an undercut channel near the ends of the retrievable tray 350. The receiving pockets run parallel to the end side walls 355-4, 355-3 of the retrievable tray 350, and extend perpendicular to the lateral direction of movement when the retrievable tray is transitioned between the pallet 300 and a support surface of the mobile robot. The receiving pockets 360-1, 361-1 provide space into which the retrieval tips of the retrieval arms can rotate in, and from which the retrieval tips can rotate out. The receiving pockets 360-1, 361-1 also provide receiving surfaces 360-2, 360-3, 361-2, 361-3 permitting engagement of surfaces of the retrieval tips of the retrieval arm in order to push and/or pull the retrievable tray during the transition between the pallet and a support surface of the mobile robot.

Figure 3F:
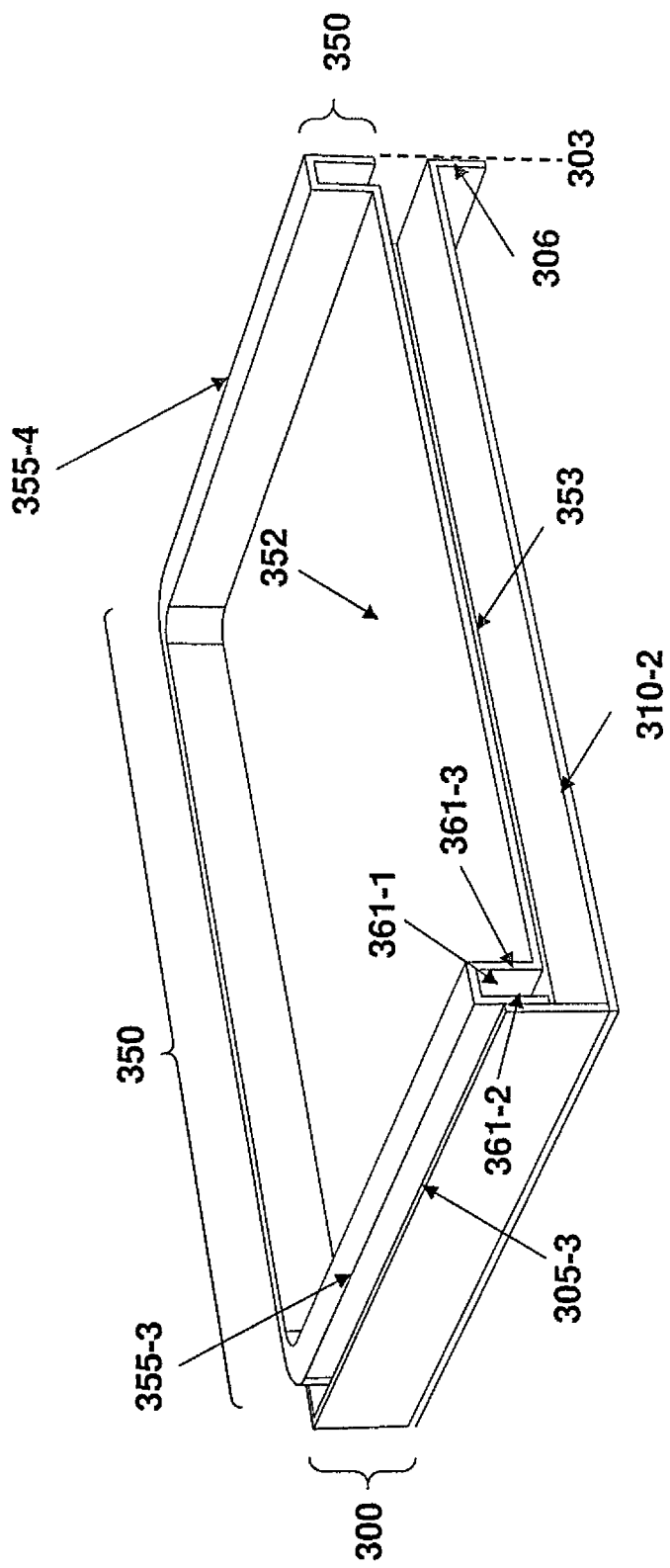
FIG. 3F is a cross-sectional view of a retrievable tray supported by a pallet according to one embodiment of the present disclosure.

FIG. 3F shows a cross-section of an embodiment of a retrievable tray 350 sitting on a pallet 300, where the defining edge of the cross section runs within the recessed channel 310-2 of the pallet. The receiving pockets 360-1, 361-1 are visible as vertical undercuts that extend upward from the underside surface 353 of the retrievable tray, and include internal receiving surfaces 360-2, 360-3, 361-2, 361-3 formed by the innermost and outermost walls of receiving pockets. The receiving surfaces 360-2, 360-3, 361-2, 361-3 are arranged perpendicular to the travel of the retrieval arms and parallel to the plane of rotation of the retrieval tips. In the embodiment shown in FIG. 3F, the receiving pockets 360-1, 361-1 are symmetrical and placed on both ends of the retrievable tray 350 so that the tray can be placed in either direction on a pallet.

Operation of the Item Retrieval Mechanisms

The configurations shown in FIG. 3G to FIG. 3N demonstrate steps in transferring a retrievable item with a mobile robot according to one embodiment, while providing minimal exposure of the item retrieval mechanisms. FIGS. 3G-3N show one retrieval arm 221-1 for the purposes of the description by showing a cross-section view of the retrievable tray 350, pallet 300, and upper deck 201. Another retrieval arm 220-1 is present in this embodiment, but is mostly hidden from view in FIG. 3G to FIG. 3N since the retrieval arms are mostly covered by the surfaces of the upper deck and the retrieval tray during operation by design to minimize their exposure. For the purposes of this description, the retrieval arm 220-1 can operate in parallel to the retrieval arm 221-1 during the transition of a retrievable tray between the pallet and the upper surface of the upper deck of the mobile robot. In certain embodiments, one or more retrieval arms can be utilized to transition retrievable items with various attachment features used to engage a receiving surface and/or receiving feature on a retrievable item.

Figure 3G:
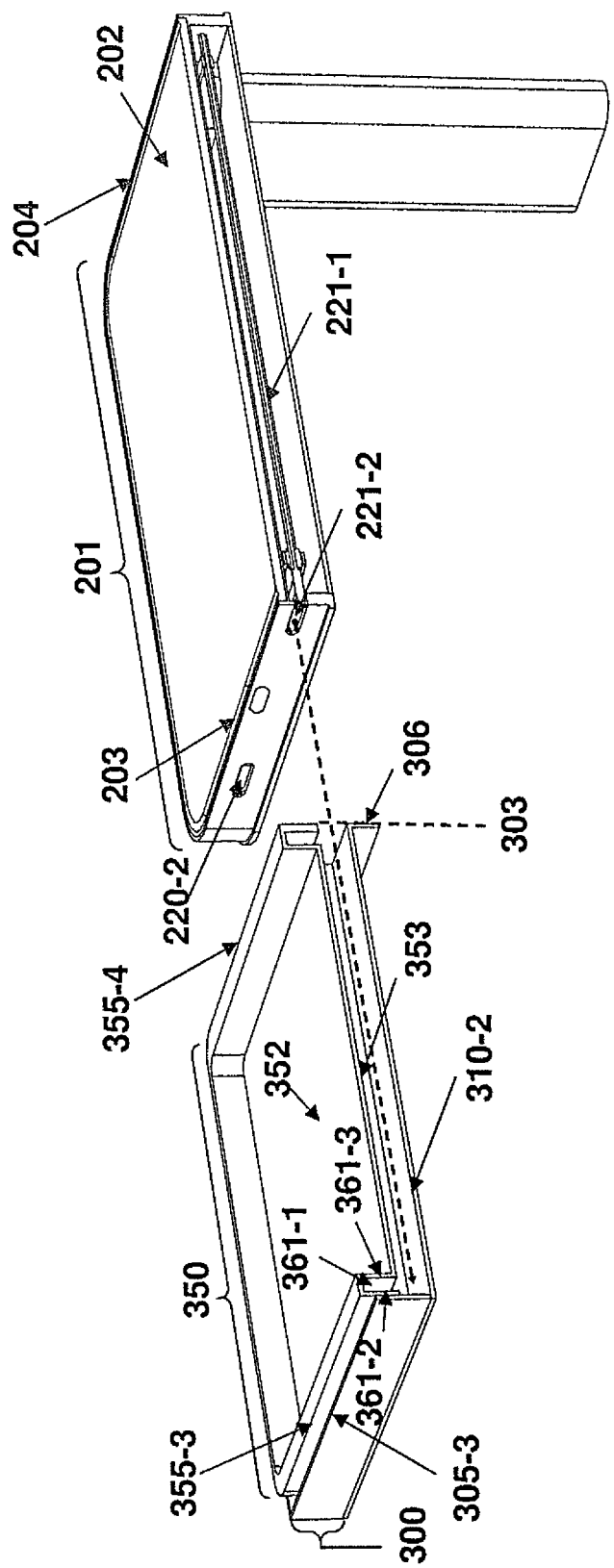
FIG. 3G is an upper perspective, partial cross-sectional view of a retrievable tray supported by a pallet arranged proximate to an upper deck assembly of a mobile robot according to one embodiment of the present disclosure.

FIG. 3G shows an embodiment of a retrievable tray 350 sitting on a pallet 300 along with the front edge 203 of the upper deck 201 of the mobile robot approaching the pallet from the front edge 303 of the pallet and at the same height as the pallet. The upper surface 202 of the upper deck is empty, the retrieval arms 220-1, 221-1 are retracted with the upper deck, and the retrieval tips 220-2, 221-2 are stored in a horizontal position.

Figure 3H:
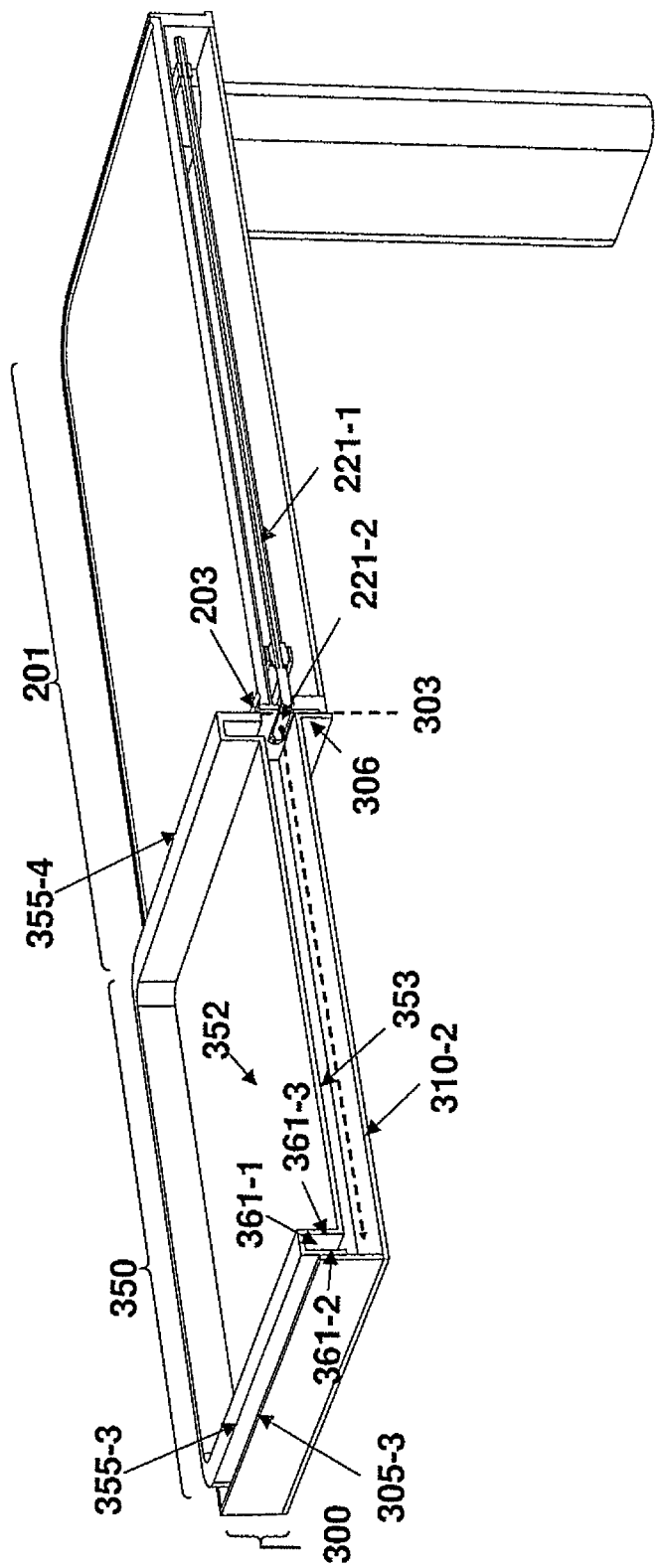
FIG. 3H shows the items of FIG. 3G, with the upper deck assembly in a docked position abutting the pallet, and with the item retrieval mechanism in a retracted (non-deployed state).
Figure 31:
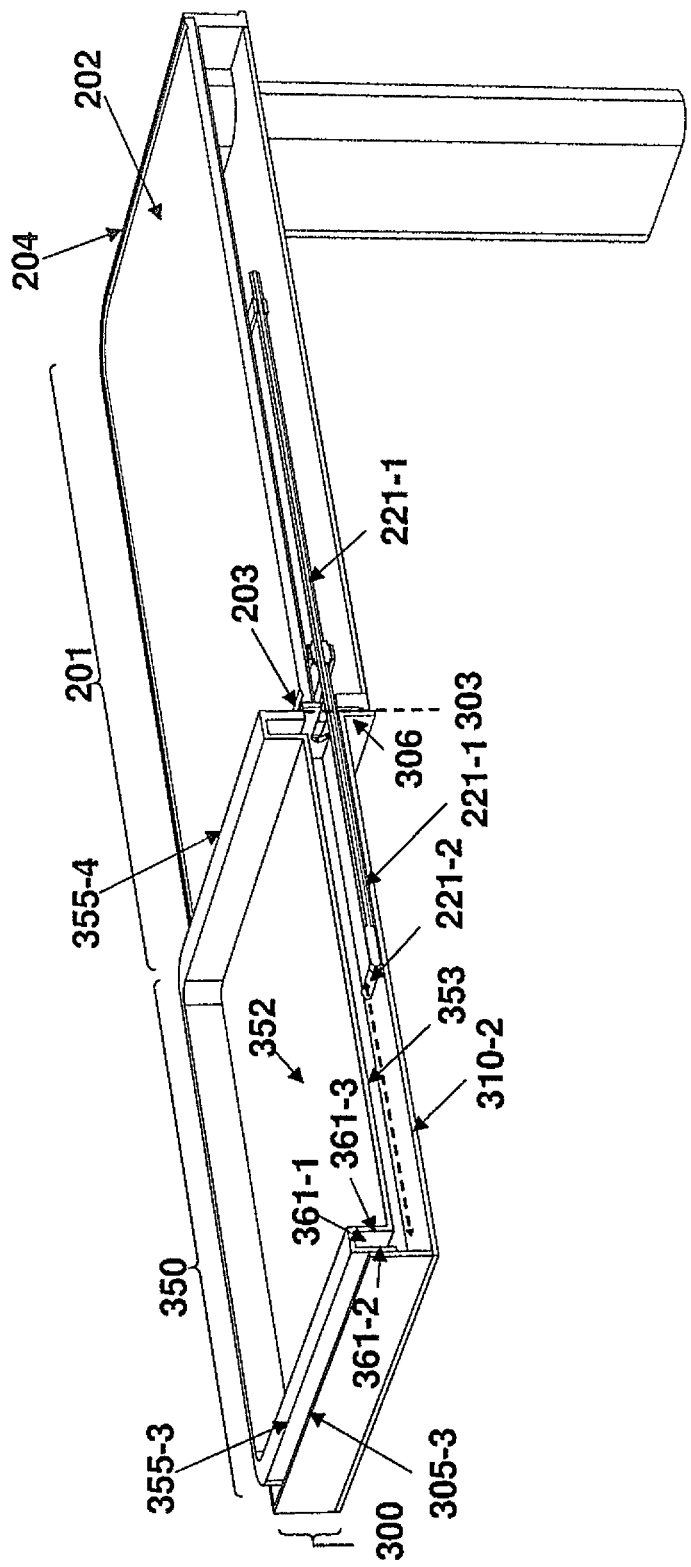

FIG. 3H shows a cross-section of an embodiment of a retrievable tray 350 sitting on a pallet 300 along with a cross-section of the upper deck 201 of the mobile robot, where the defining edge of the cross section runs within the recessed channel 310-2 of the pallet and along the area of the of the retrieval arm 221-1 of the upper deck of the mobile robot. In the embodiment shown in FIG. 3H, the upper deck 201 is in a "docked" position relative to the pallet 300 and ready for the item transition process to begin. In such a state, the upper surface 202 of the upper deck 201 of the mobile robot is at roughly the same height as the upper horizontal surface 302-1, 302-2, 302-3 of the pallet 300, so that retrievable items can be slid from one surface to the other and always be supported by one or both surfaces. Likewise, the front edge 203 of the upper deck 201 of the mobile robot is in contact with (or at least close to) the front edge 303 of the pallet 300. In certain embodiments, the mobile robot may position itself where there may be a gap between the lateral front edges of the upper deck and the pallet, including (but not limited to) a position in which the mobile robot may be blocked from driving further forward by other obstacles. The retrieval arm 221-1 and the retrieval arm 220-1 (not visible) of the mobile robot in FIG. 3H are retracted in the stored position within the upper deck with the retrieval tip 221-2 and the retrieval tip 220-2 (not visible) in the horizontal position. In FIG. 3H, the retrieval arms are aligned with the recessed channels of the pallet, thereby allowing the retrieval arms to move forward and backward along the length of the recessed channels of the pallet during the item transition process. The retrieval tip 221-2 and the retrieval tip 220-2 (not visible) in FIG. 3H are rotated in the horizontal position to be able to fit under the underside surface of the bottom of the retrievable tray.

FIG. 3I shows the same cross section as FIG. 3H, but where the retrieval arm 221-1 of the mobile robot is partially extended below the bottom surface 353 of retrievable tray within the space of the recessed channel 310-2 of the pallet 300. (Although not shown, the retrieval arm 220-1 is similarly positioned.) The retrieval tips 221-2, 220-2 (not visible) are still in the horizontal position so that the retrieval tips also fit within the vertical space of the recessed channel 310-2 of the pallet 300.

Figure 3J:
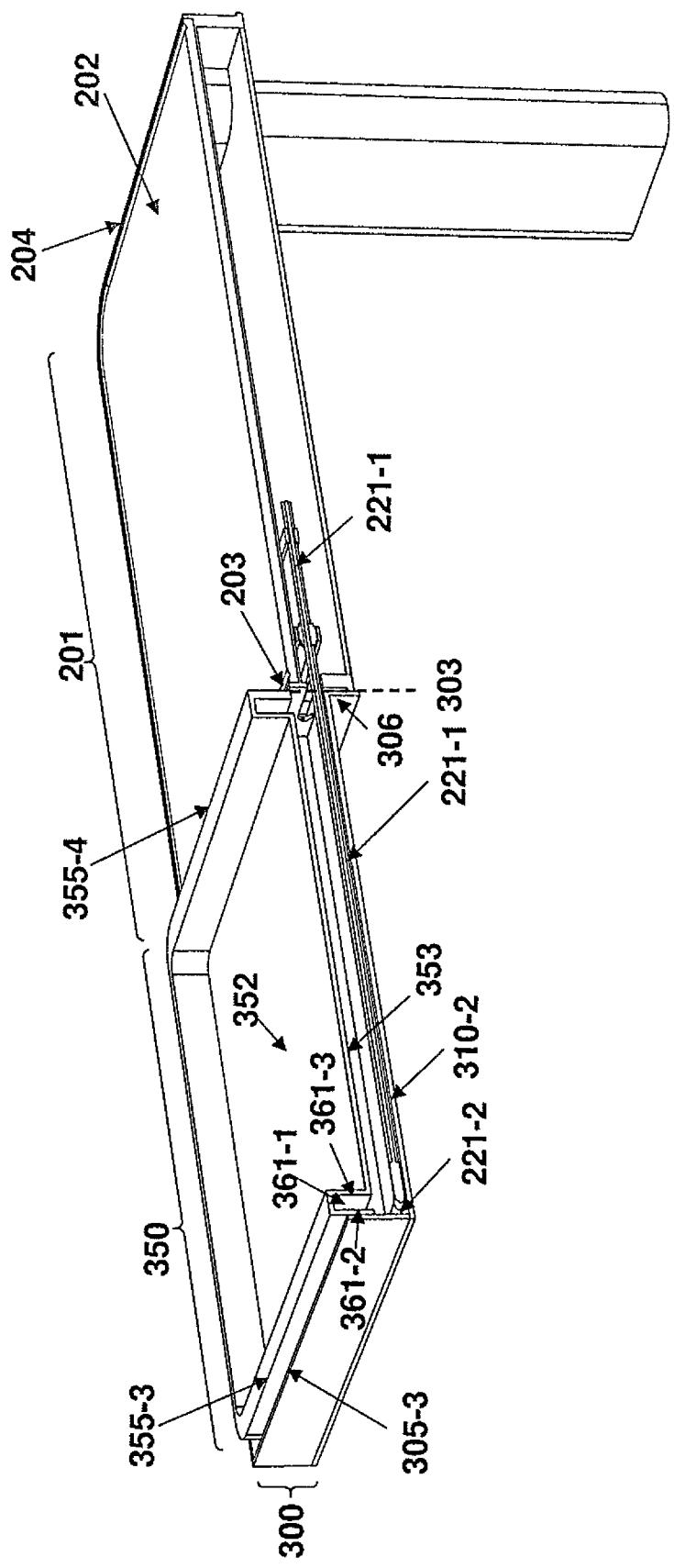
FIG. 3J shows the items of FIG. 3I with the item retrieval mechanism in a fully deployed (extended state), but with retrieval tips in a non-rotated state.

FIG. 3J shows the same cross-section as FIG. 3I, but where the retrieval arms 221-1, 220-1 (not visible) of the mobile robot have extended further under the retrieval tray 350, with the retrieval tips 221-2, 220-2 positioned under the receiving pocket 361-1 that sits closest to the distal end of the retrievable tray relative to the mobile robot.

Figure 3K:
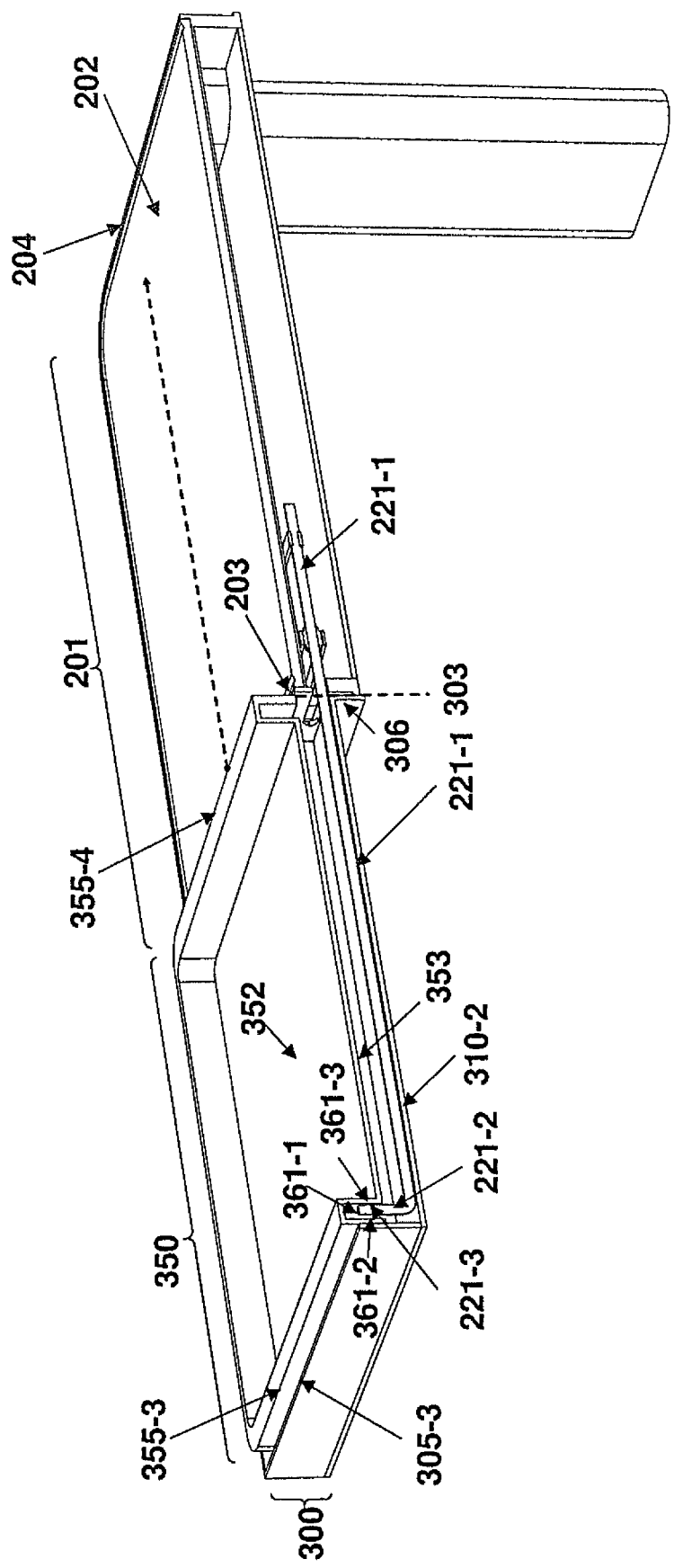
FIG. 3K shows the items of FIG. 3J with the item retrieval mechanism in a fully deployed state, with retrieval tips rotated upward and positioned under a receiving pocket of the retrievable tray.

FIG. 3K shows the same cross-section as 3J, but where the retrieval tip 221-2, 220-2 (not visible) has rotated up to a vertical position. Additionally, the upper portion of each retrieval tip is above the bottom surface 353 of the retrievable tray and is nested within the receiving pocket 361-1 that sits closest to the distal end of the retrievable tray 350 relative to the mobile robot. In this embodiment, the proximal side 221-3 of the retrieval tip 221-2 relative to the mobile robot is adjacent to the receiving surface 361-3 of the receiving pocket 361-1, and is positioned in such a way that if the retrieval arm is retracted laterally back into the upper deck, then the proximal side of the retrieval tip can engage the receiving surface 361-3 of the receiving pocket and begin pull the tray onto the upper surface of the upper deck of the mobile robot. The proximal side 220-3 of the retrieval tip 220-2 relative to the mobile robot is also adjacent to the receiving surface 361-3 of the receiving pocket 361-1, but not visible in FIG. 3K.

In certain embodiment, a receiving pocket can be separated into or replaced with multiple pockets. In certain embodiments, the receiving pocket of the retrievable item can be configured in alternative forms other than an undercut channel, provided the alternative forms still have at least one contact surface for either the distal or proximal sides of one or more retrieval tips to engage. Embodiments of alternative receiving structures may include, but are not limited to: a vertical opening in the retrievable item that is open at both the bottom and top; side rails, handles and/or other structures that connect at different points of the retrievable item to form the receiving surfaces; a variety of receiving surfaces distributed on the retrievable item where the retrieval tips and/or other structures of the retrieval arms need to travel to different locations of the retrievable item to push or pull the receivable item, and/or a variety of receiving surfaces distributed on the retrievable item where certain retrieval tips and/or other structures of the retrieval arms can only be used to push the retrievable item and/or only certain retrieval tips and/or other structures of retrieval arms can be used to push the retrievable item.

In certain embodiments, the bottom edges of the of the receiving surfaces at the opening the receiving pockets may include a chamfer, slope, and/or a rounded edge, in order to help the retrieval tips align into the receiving pockets when the retrieval tips are raised into the retrieval position.

In certain embodiments, a mobile robot can apply some degree of power to the second motor controlling the rotatable retrieval arms as the retrieval arms and retrieval tips are extending laterally toward the intended receiving pocket, so that the ends of the retrieval tips press up against the underside surface of the retrievable tray and/or retrievable item. In this embodiment, the mobile robot can use encoder position and/or motor current feedback from the second motor controlling the rotation of the retrieval arms to determine if the retrieval trips have begun rotating into a receiving pocket, and control the primary motor that is driving the extension of the retrieval arms and/or the secondary motor controlling the rotation of the retrieval arms to help position the retrieval tips correctly within the retrieval pockets.

Figure 3L:
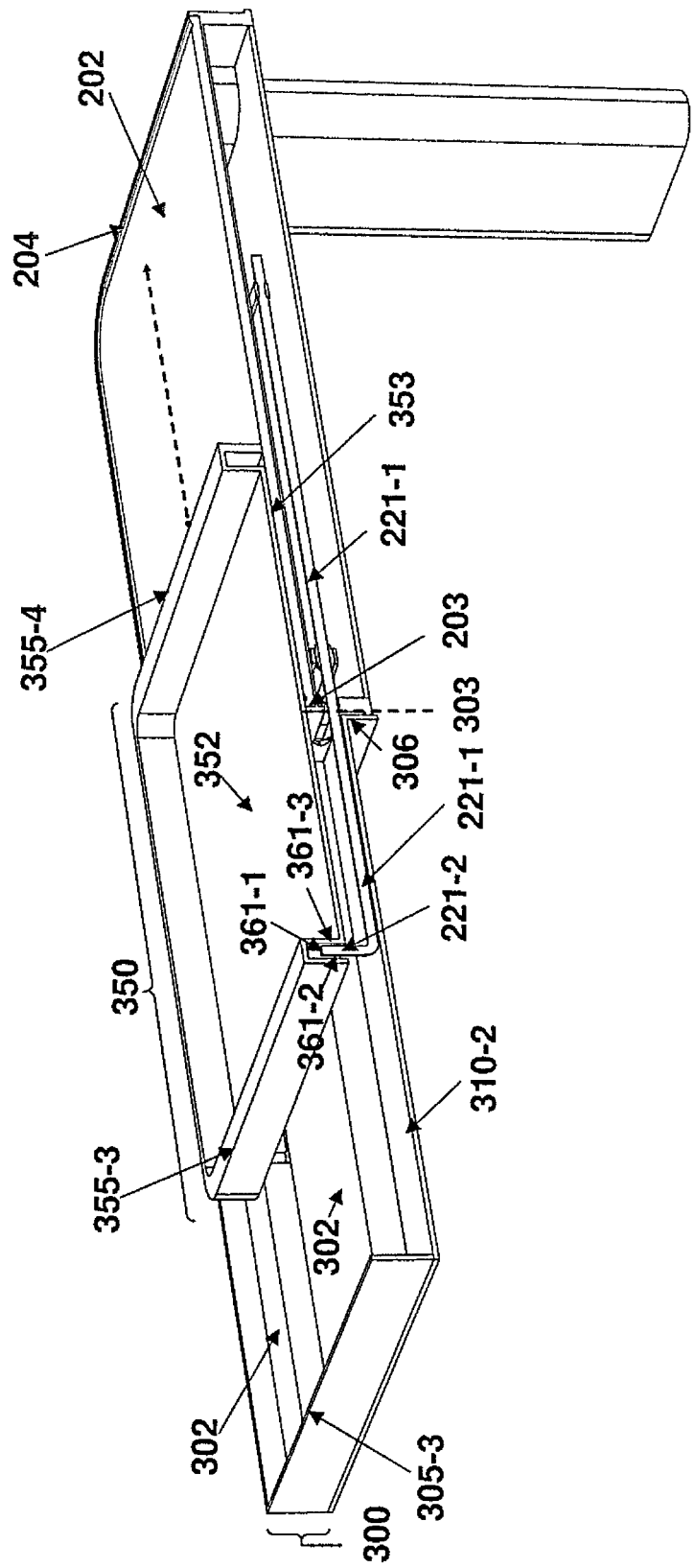
FIG. 3L shows the items of FIG. 3K with the item retrieval mechanism in a partially retracted state to pull the retrievable tray from the pallet onto an upper surface of the upper deck assembly, with one portion of the retrievable tray supported by the pallet and with another portion of the retrievable tray supported by the upper deck assembly.

FIG. 3L shows the same cross-section as FIG. 3K, but where the retrieval arms 221-1, 220-1 (not visible) have retracted partially back within the upper deck 201 of the mobile robot and where the retrieval tray 350 has been pulled back by the retrieval tips 221-2, 220-2 (not visible) so that the distal end of the tray has moved laterally toward the upper deck of the mobile robot and the proximal end of the retrievable tray has moved onto the upper surface 202 of the upper deck of the mobile robot.

Figure 3M:
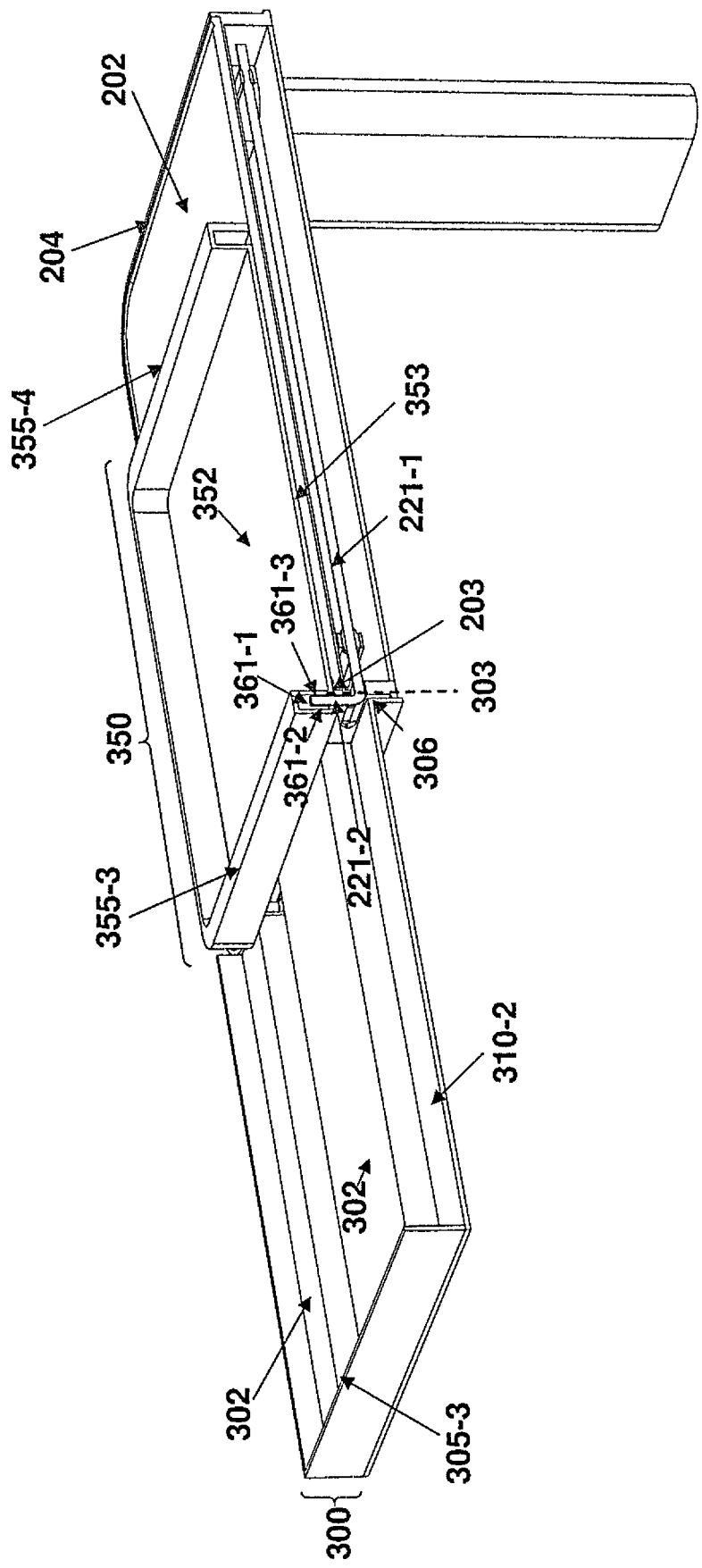
FIG. 3M shows the items of FIG. 3L in a fully retracted state, with an entirety of the retrievable tray supported by the upper deck assembly, and with the upper deck assembly abutting the pallet.

FIG. 3M shows the same cross-section as FIG. 3L, but where the retrieval arms 221-1, 220-1 (not visible) have retracted almost completely within the upper deck of the mobile robot, and the retrieval tips 221-2, 220-2 (not visible) and the retrieval pocket 361-1 have been pulled close to the front edge 203 of the upper deck 201 of the mobile robot, with the majority of the retrievable 350 tray resting on the upper surface 202 of the upper deck of the mobile robot.

Figure 3N:
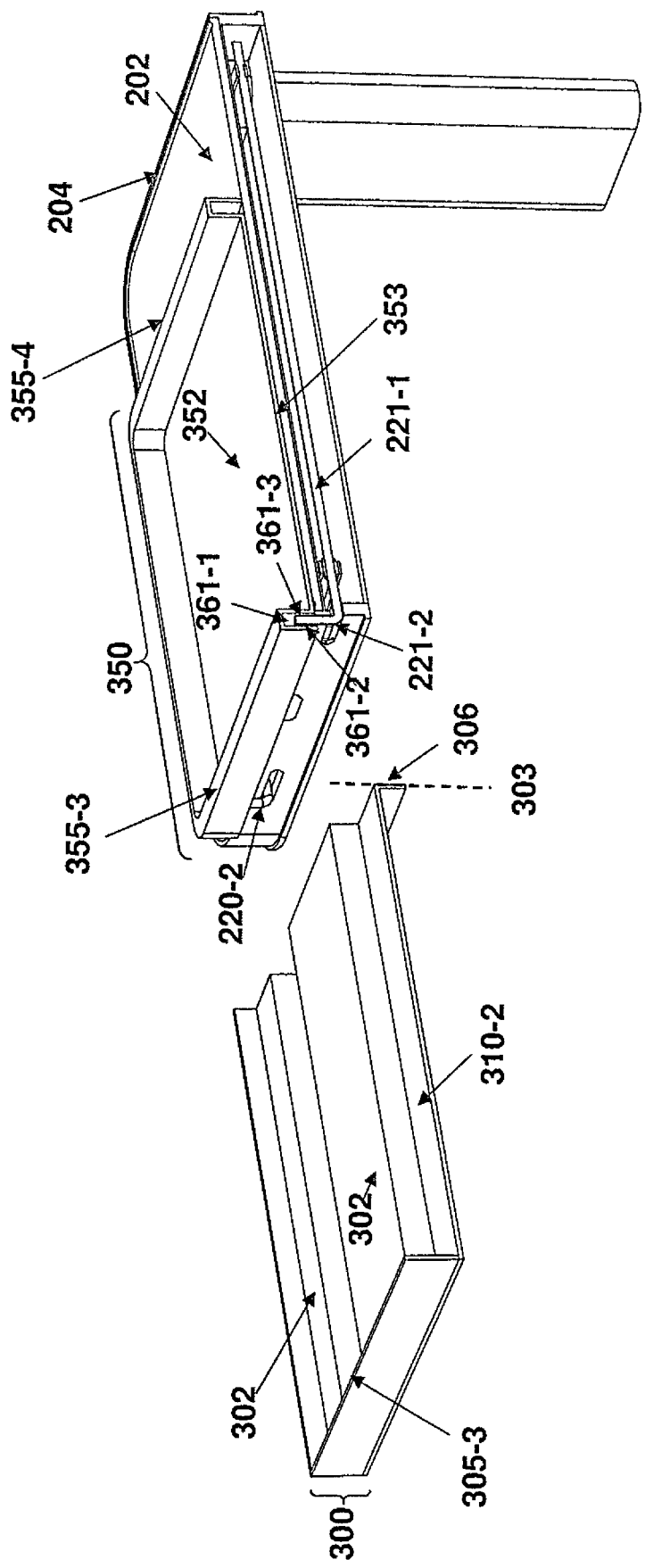
FIG. 3N shows the items of FIG. 3M, following movement of the mobile robot away from the pallet.

FIG. 3N shows a similar view as in FIG. 3G where the mobile robot has driven back away from the pallet 300 by a short distance, but the retrievable tray 350 is now resting on the upper surface 202 of the upper deck of the mobile robot and the pallet 300 is empty. Part of the retrieval tips 221-2, 220-2 are now visible under the area of the retrieval pocket 361-1 (not visible).

In certain embodiments, the mobile robot in the stage shown in FIG. 3N can proceed to travel to a new location, such as: to deliver the retrievable tray to an individual, to transfer the retrievable tray to another pallet, and/or to transfer the tray to another extrinsic surface having support features suitable for receiving the tray. In certain embodiments, the retrieval tips and retrieval arms may remain in their current position as shown in FIG. 3N. In certain embodiments, the retrievable tray can remain in its position on the upper surface of the upper deck of the mobile robot, but the retrieval tips may rotate out of the receiving pocket to the horizontal position and the retrieval arms could then retract further so that the retrieval tips are pulled into their stored location below the upper surface of the upper deck.

In certain embodiments, to transition a retrievable tray from the upper surface of the upper deck of a mobile robot and onto a pallet, the process shown in FIG. 3G to FIG. 3N would run in reverse. The retrievable tray 350 would start on the upper surface 202 of the mobile robot as shown in FIG. 3N, the robot would perform a final approach maneuver and align with the pallet 300 as shown in FIG. 3M. The retrieval arms would extend out, and the distal side 221-4, 220-4 (not shown) of the retrieval tips 221-2, 221-2 (not shown) relative to the mobile robot would push against the receiving surface 361-2 of the receiving pocket 361-1, and as a result push the retrievable tray 350 onto the pallet 300 as shown in FIG. 3L. The retrievable tray 350 would be pushed further onto the pallet by the retrieval mechanism of the mobile robot, with the retrievable tray ending up in the position shown in FIG. 3K in which it is fully resting on the surface of the pallet 300. For the mobile robot to start to disengage from the pallet, the mobile robot would rotate the retrieval tips down to a horizontal position so that retrieval tips 221-2, 220-2 (not visible) sit below the bottom surface 353 of the retrievable tray, as shown in FIG. 3J. The mobile robot would then begin to retract the retrieval arms 221-1, 220-1 (not visible) back into the upper deck, passing through the point shown on FIG. 3I. In the next position, the retrieval arms 221-1, 220-1 (not visible) would be fully retracted and the retrieval tips 221-2, 220-2 (not visible) would reside under the upper surface of the upper deck, as shown in FIG. 3H. In the final position, the mobile robot would back away and leave the retrievable tray 350 on the pallet 300 and leave the upper surface 202 of the upper deck 201 empty as shown in FIG. 3G.

Figure 2E:
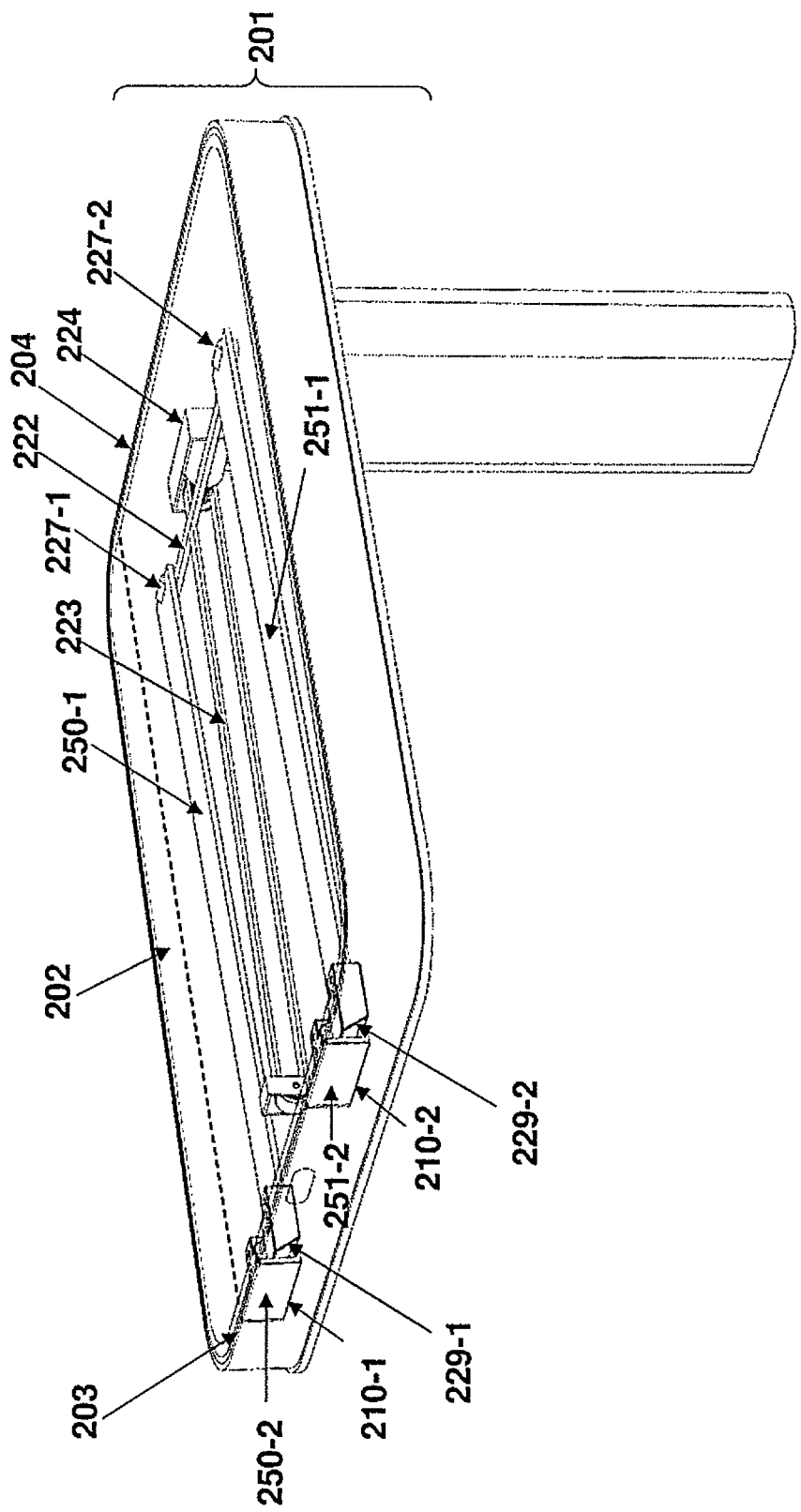
FIG. 2E is a partially transparent, upper perspective view of an upper deck assembly of a mobile robot according to one embodiment, showing components of an item retrieval mechanism in a retracted state, with vertically extending retrieval tips.

Variations: Support Surfaces, Retrieval Mechanisms, Pallets and Retrievable Items In certain embodiments, an item retrieval mechanism can perform a similar function as the mechanism shown in FIG. 2A, but have a different configuration for one or more elements of the mechanism. FIG. 2E shows an alternative embodiment of the item retrieval mechanism, which differs primarily in the configuration of the retrieval tips and the system for engaging the retrieval tips with the receiving surfaces of a retrievable object.

Alternative Retrieval Arms with Fixed Vertical Retrieval Tips

In the embodiment show in FIG. 2E, an item retrieval mechanism maintains two retrieval arms that laterally move out from under the upper deck of the mobile robot and retract back, similar in concept to the retrieval arms shown in FIG. 2A. In certain embodiments, one or more retrieval arms can be used, but each figure shows two retrieval arms for comparison purposes.

In the embodiment shown in FIG. 2E, the primary motor 224 with an encoder and the lateral drive belt 223 are substantially similar to corresponding elements of the mechanism shown in FIG. 2A and serve the same function of extending and retracting the retrieval arms out from and into the upper deck. However, the retrieval arms 250-1, 251-1 and the retrieval tips 250-2, 251-2 are configured differently than their counterparts in FIG. 2A. As one difference, the retrieval arms 250-1, 251-1 in FIG. 2E are mounted in a fixed horizontal position, and are not designed to rotate as was the case with the retrieval arms 220-1, 221-1 of FIG. 2A.

In the embodiment shown in FIG. 2E, the retrieval tips 250-2, 251-2 are still rigidly mounted to the retrieval arms 250-1, 251-1 at roughly a 90 degree angle, but the retrieval tips are always pointed up in a vertical direction since the retrieval arms do not rotate. The retrieval tips 250-2, 251-2 can still be stored below the upper surface 202 of the upper deck 201 as shown in FIG. 2E, but the maximum height of the 250-2, 251-2 (as measured along the vertical dimension of retrieval tips) is limited as the retrieval tips need to fit within the vertical space of the interior area of the upper deck while the retrieval tips remain in the vertical position. Being restricted in vertical height and having a possibly smaller portion of the tips able to reach a receiving surface of a retrievable item compared to the rotating tips 220-2, 221-2 shown in FIG. 2B, the retrieval tips 250-2, 251-2 in FIG. 2E are designed to be wider in order to have more surface area available for contact with the receiving surfaces of retrievable item.

Figure 2F:
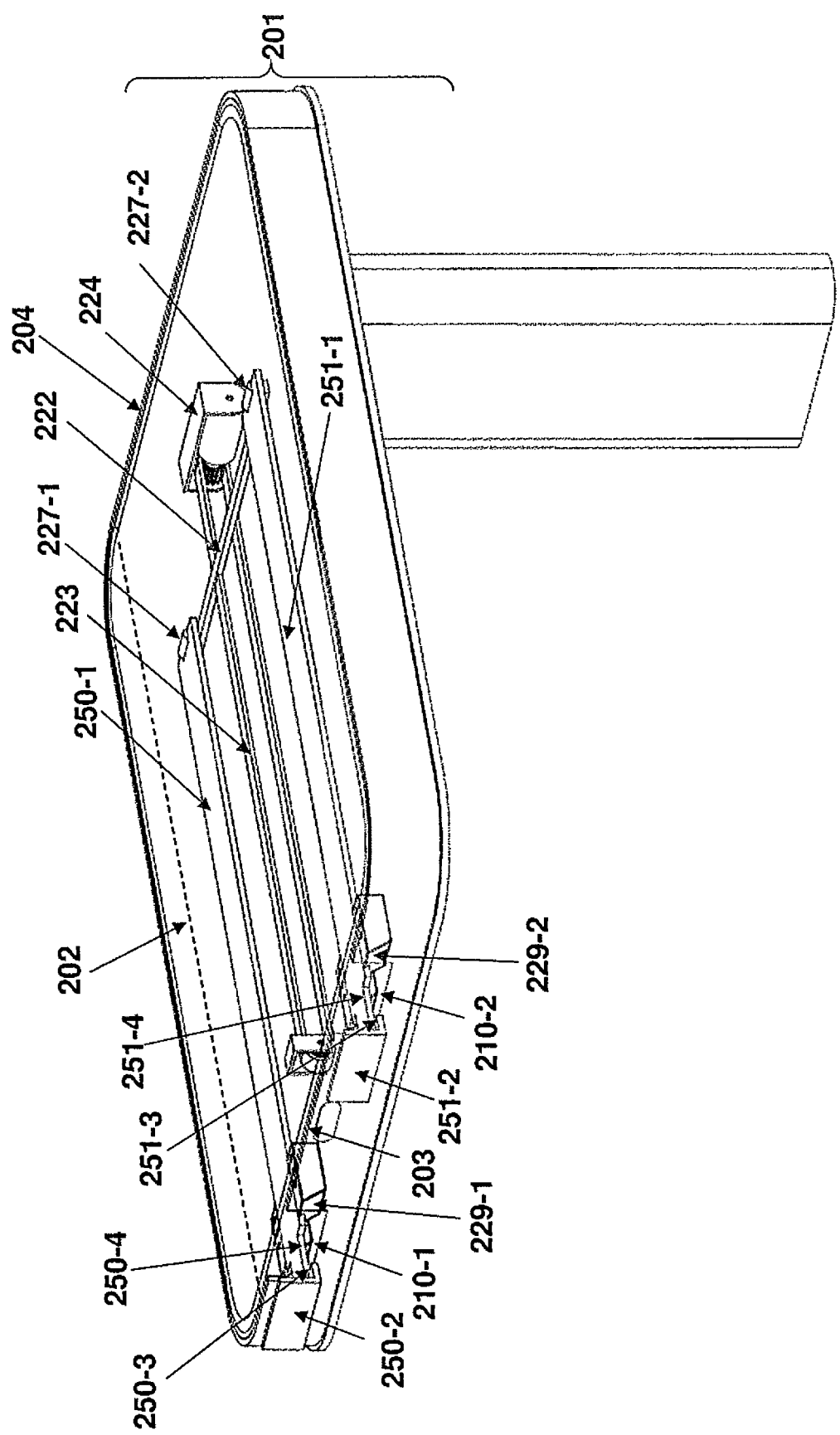
FIG. 2F is a partially transparent, upper perspective view of the upper deck assembly of FIG. 2F, with the item retrieval mechanism in a partially deployed state.

In the embodiment shown in FIG. 2F the forward ends of the retrieval arms 250-1, 251-1 and retrieval tips 250-2, 251-2 can raise vertically together when they extend out of the upper deck, where the tops of the retrieval tips can extend above the upper surface 202 of the top deck 201. In this position, the retrieval tips 250-2, 251-2 are in position to engage a receiving surface of a retrieval item that can reside on top of the upper surface 202 of the upper deck 201, similar to the embodiment shown for the rotating retrieval tips shown in FIG. 2B.

In the position shown in FIG. 2F, the retrieval arms 250-1, 251-1 and retrieval tips 250-2, 251-2 can also extend into the recessed channels of a pallet while travelling under a retrieval item, similar to operation of the retrieval mechanism with rotating retrieval tips according to FIG. 3I. However, the recessed channels 310-1, 310-2 of the pallet 300 would need to be taller in the vertical dimension to provide enough space for the height of the fixed vertical retrieval tips.

Once the retrieval arms retrieval arms 250-1, 251-1 are extended and the retrieval tips 250-2, 251-2 are arranged under the receiving pocket 361-1 of the retrievable tray 350, the lifting mechanism of the mobile robot can raise and lift the upper deck 201 along with retrieval mechanism to raise the retrieval tips 250-2, 251-2 into the receiving pocket of the retrieval item. This approach means that the retrieval mechanism shown in FIGS. 2E and 2F does not require a second motor to adjust the height of the retrieval tips 250-2, 251-2, compared to the second motor 228 in FIG. 2A that is used to control the orientation of the rotating retrieval tips 220-2, 221-2.

Figure 2G:
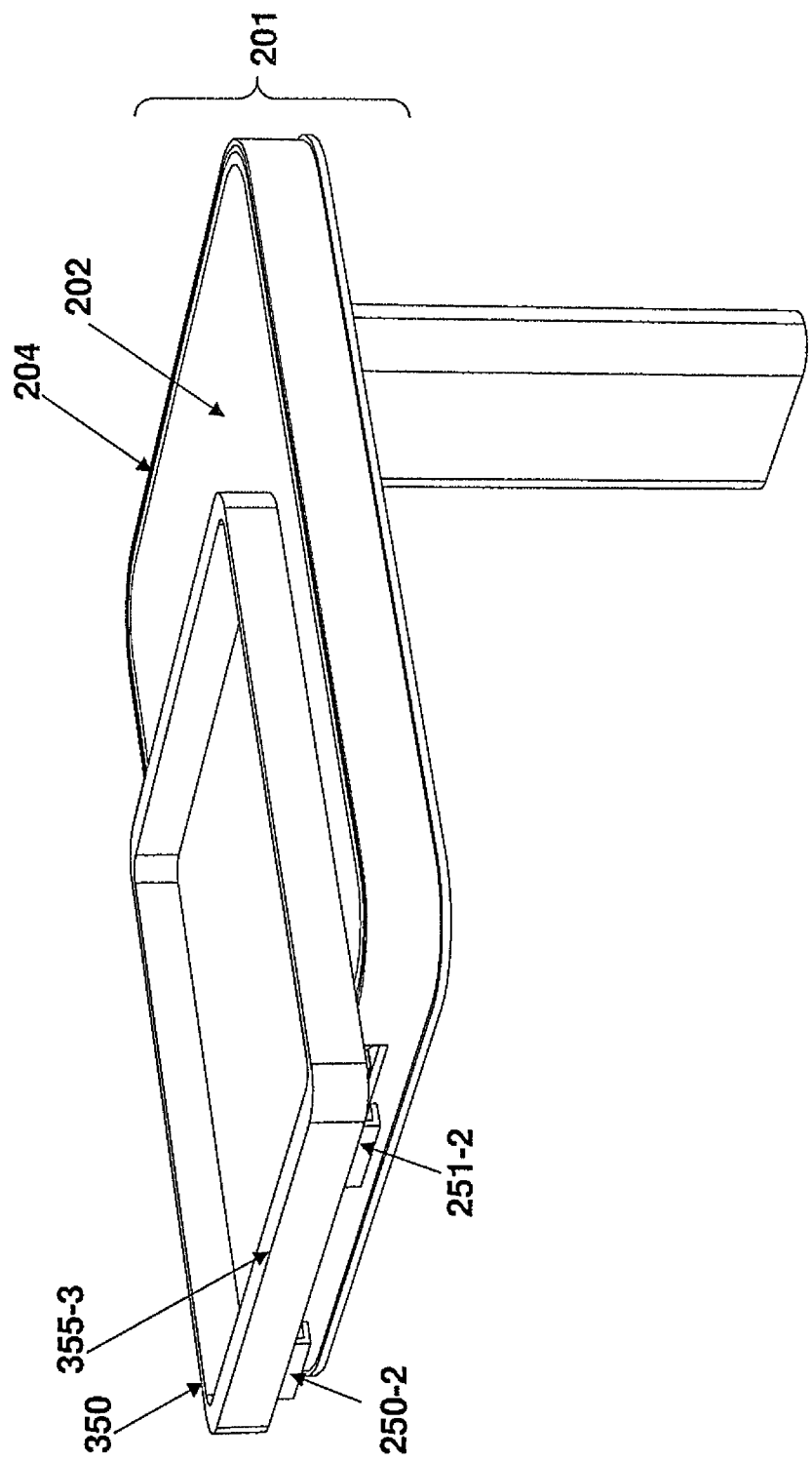
FIG. 2G is an upper perspective view of the upper deck assembly of FIG. 2F with a retrievable tray positioned atop an upper surface thereof.

In a certain embodiment, the raised retrieval arms 250-1, 251-1 and retrieval tips 250-2, 251-2 can retract and bring the retrievable item on the upper surface 202 of the upper deck 201, as shown in FIG. 2G.

The forward ends of the retrieval arms 250-1, 251-1 and the retrieval tips 250-2, 251-2 can also lower down below the upper surface of the top deck when they retract back into the top deck, but they employ a different mechanism than the rotating retrieval tips shown in FIG. 2A. In the embodiment shown in FIG. 2E, the ends of the retrieval arms 250-1, 251-1 near the retrieval tips 250-2, 251-2 can flex downward when pressure is applied from the top of the retrieval arms near the ends by the retrieval tips. In certain embodiments, this flexing can be a natural property of the material used in the retrieval arms 250-1, 251-1 and/or can be enabled by a spring mounted support under the retrieval arm and a hinge connecting the retrieval arm with the support bracket 252 at the back end of the mechanism.

In the embodiment shown in FIG. 2F, the forward ends of the retrieval arms 250-1, 251-1 include shoulders 250-3, 251-3 at the base of the retrieval tips 250-2, 251-2 that are wider than the rest of the retrieval arms. When the retrieval tips are close to being retracted into the upper deck 201, each shoulder 250-3, 251-3 will contact an inverted ramp 229-1, 229-2 under the surface 202 of the upper deck 201, thereby causing the end of the retrieval arm to lower as each shoulder rides along the inverted slope of the ramp. In FIG. 2F, notches 250-4, 251-4 are provided in each of the retrieval arms just behind the shoulders 250-3, 251-3, where the notch is placed over a support point under the arm that normally holds the arm level as the arm extends, but as the shoulder engages the ramp, the notch opens up over the support point to allow the retrieval arm to be pushed down by the ramp.

Variations in Support Surfaces

In certain embodiments, one or more support surfaces of a mobile robot may include a recessed area into which the retrievable item can be pulled by the retrieval mechanism, where the footprint of the recessed area is at least the size of the footprint of the retrievable item, and where the bottom surface of the retrievable item sits depressed into the recessed area of the support surface relative to the level of the surrounding area of the support surface.

In certain embodiments, the upper surface of one or more of the support surfaces of the mobile robot may include depressions, notches and/or other features that provide aligning surfaces for matching features on the bottom side of one or more of the retrievable items.

In certain embodiments, the upper surface of one or more of the support surfaces of the mobile robot can be curved and/or have some other nonplanar shape, wherein the bottom surface of the retrievable item has a shape that matches the surface of the upper surface of the nonplanar support surface of the mobile robot. In certain embodiments, the pallet may include a similar curved and/or no planar support surface to match the bottom surface of the retrievable item.
Variations of the Retrieval Mechanism (Dealing with Tilted Elements)

In certain embodiments, an item retrieval mechanism and/or other elements of a mobile robot may include adjustable features to adapt to situations where the plane of a pallet is not level with the plane of the item support surface and/or with the plane of the retrieval arms of the retrieval mechanism of the mobile robot. This situation may occur due to environmental factors in residential settings and/or other unstructured environments where the floor surface upon which the mobile robot resides and/or the underlying support surface upon which a pallet resides are not level. In certain embodiments, the item retrieval arm 221-1 may extend at an upward or downward angle relative to the underside surface 353 of the retrievable item 350 and/or the surface 310-2 at the bottom of the recessed channel of the pallet 300 compared to the parallel configuration of those three elements as shown in FIG. 3I. Examples of this situation may include, but are not limited to, cases where the wheels along the front edge of drive base of the mobile robot rest upon a raised surface such as an area rug and the wheels along the opposite end of the mobile robot rest upon a lower uncovered section of the floor, causing the body of the mobile robot to tilt at an upwards angle and set the front edge of the upper deck at a higher level than the rear lateral edge of the mobile robot.

In certain embodiments, the retrieval arms of the retrieval mechanism of a mobile robot may include a flexible section along part of the length of the retrieval arms, with the flexible section allowing the retrieval arms to enter the recessed channels of the pallet under the retrievable tray or item and flex upward or downward to adjust to a change in the angle of the plane of the pallet and/or retrievable item relative to the plane of the support surface of the mobile robot.

In certain embodiments, a mobile robot can include additional powered mechanisms to adjust the angle of the plane of the deck, other support surface, retrieval mechanism, and/or the upper body of the mobile robot to the plane of the pallet.

In certain embodiments where the mobile robot determines a pallet is tilted downward relative the level of the upper deck or other support surface of the mobile robot, the pallet and upper deck (and/or other support surface) of the mobile robot can include connecting features that enable the upper deck to dock with the front lip of the pallet, and once docked, have a lifting mechanism raise the upper deck and the front end of the pallet until the support surfaces of the pallet and the upper deck are aligned.
Telescoping Retrieval Arms In certain embodiments, the retrieval arms such as shown in FIGS. 2A and/or 2E can be designed to include a telescoping mechanism to enable each retrieval arm to compress to a shorter length compared to the a fully extended position of the retrieval arm. In certain embodiments, the retrieval arms are stored in a compressed position to reduce internal space and/or the external length of the deck and/or other support surface of the mobile robot in which that the retrieval arms reside. In certain embodiments, the telescoping mechanism can be the sole mechanism for extending the retrieval arms out and retracting them back into the deck and/or support surface of the mobile robot. In certain embodiments, the telescoping mechanism can be combined with other mechanisms such as shown in FIG. 2A and/or FIG. 2E for extending the retrieval arms out and retracting them back into the deck and/or support surface of the mobile robot. In certain embodiments, the telescoping mechanism can be used to extend the retrieval arms further to reach a retrievable item that is further away from the closest position the mobile robot can position itself.
Independent Retrieval Arms In certain embodiments, the extension of the retrieval arms can be independently controlled by separate drive mechanisms to allow one or more retrieval arms to extend to a different position than at least one other retrieval arm. In certain embodiments, the position of the retrieval tips, including but not limited to the rotation of the retrieval tips, can be controlled by separate drive mechanisms to allow one or more retrieval tips on different retrieval arms to be in a different position and/or orientation than at least one other retrieval arm.
Variations in Interfacing with Retrievable Items In certain embodiments, retrieval tips and/or retrieval arms of a mobile robot can be used for additional functions, including but not limited to pushing, pulling, sliding and/or lifting against a surface of a retrievable item and/or another object, instead of and/or in addition to pushing and/or pulling a receiving surface within a receiving pocket.

In certain embodiments, if a retrievable tray and/or other retrievable item becomes misaligned and/or is extended off the forward edge of the pallet and/or other extrinsic support surface upon which it rests, the mobile robot can push against the front lip and/or other front surface of the retrievable tray and/or other retrievable item to push the retrievable tray and/or other retrievable item back into a correct position on the pallet. In certain embodiments, the mobile robot can use the front surface of the upper deck and/or other support surface of the mobile robot, one or more protruding elements of the upper deck and/or other support surface of the mobile robot, and/or the retrieval tips of the retrieval arms in an extended position to make contact with the front lip and/or other front surface of the retrievable tray and/or retrievable item to push the retrievable tray and/or retrievable item back into the correct position on the pallet. In certain embodiments, the retrieval tips and/or retrieval arms can be used to correct the alignment and/or position of a retrievable item and/or move the retrievable item by making contact and applying force to one or more surfaces of the retrievable item outside of the receiving surfaces within the receiving pockets of the retrievable item.

In certain embodiments, if the mobile robot detects that the retrievable item is not correctly aligned and/or positioned on the pallet and/or lateral edge of an extrinsic surface to such a degree that the retrieval arms cannot reach and/or engage the intended receiving surfaces of the retrievable item, then the mobile robot can raise the retrieval arms to a point above the level of the pallet and/or extrinsic surface and extend the arms to make contact with the retrievable item on a different surface. So positioned, the retrieval arms may push and/or pull on that surface to help bring the retrievable item into a correct position for retrieval. In certain embodiments, one or more of the retrieval tips of the retrieval arms can push on one or more forward facing surfaces of the retrievable item to change the angle of the retrievable item relative to the retrieval arms.

Figure 8B:
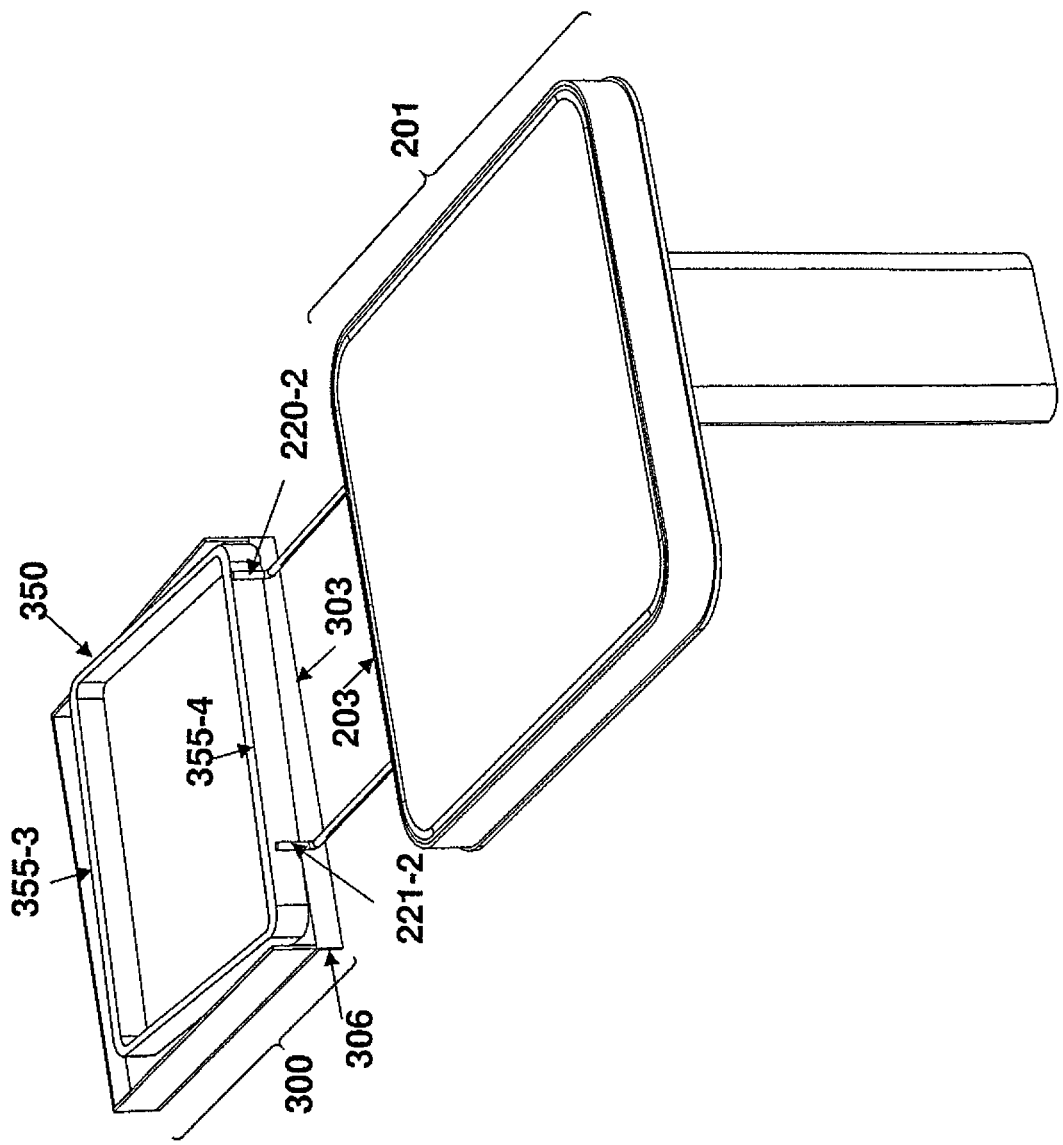
FIG. 8B is an upper perspective view of an upper deck assembly of a mobile robot according to one embodiment, with retrieval tips extended from the upper deck assembly and protruding upward to engage with a portion of a retrievable tray supported by a pallet.

In an embodiment shown in FIG. 8B, the front side 203 of the upper deck 201 is aligned with the front side 303 of the pallet 300, but the retrievable tray 350 sitting on the pallet 300 is out of alignment with both the pallet 300 and the upper deck 201 of the mobile robot. In FIG. 8B, the retrieval tips 220-2, 221-2 are extended out ahead of the front side 203 of the mobile robot at the same distance, and rotated in a vertical position so that as the mobile robot travels forward, the retrieval tip 220-2 will make first contact at a point along the right half of the front side 355-4 of the retrievable tray 350, and cause the right side of the retrievable tray to push back and come into better alignment with the front side 203 of the upper deck 201 of the mobile robot.

Figure 8C:
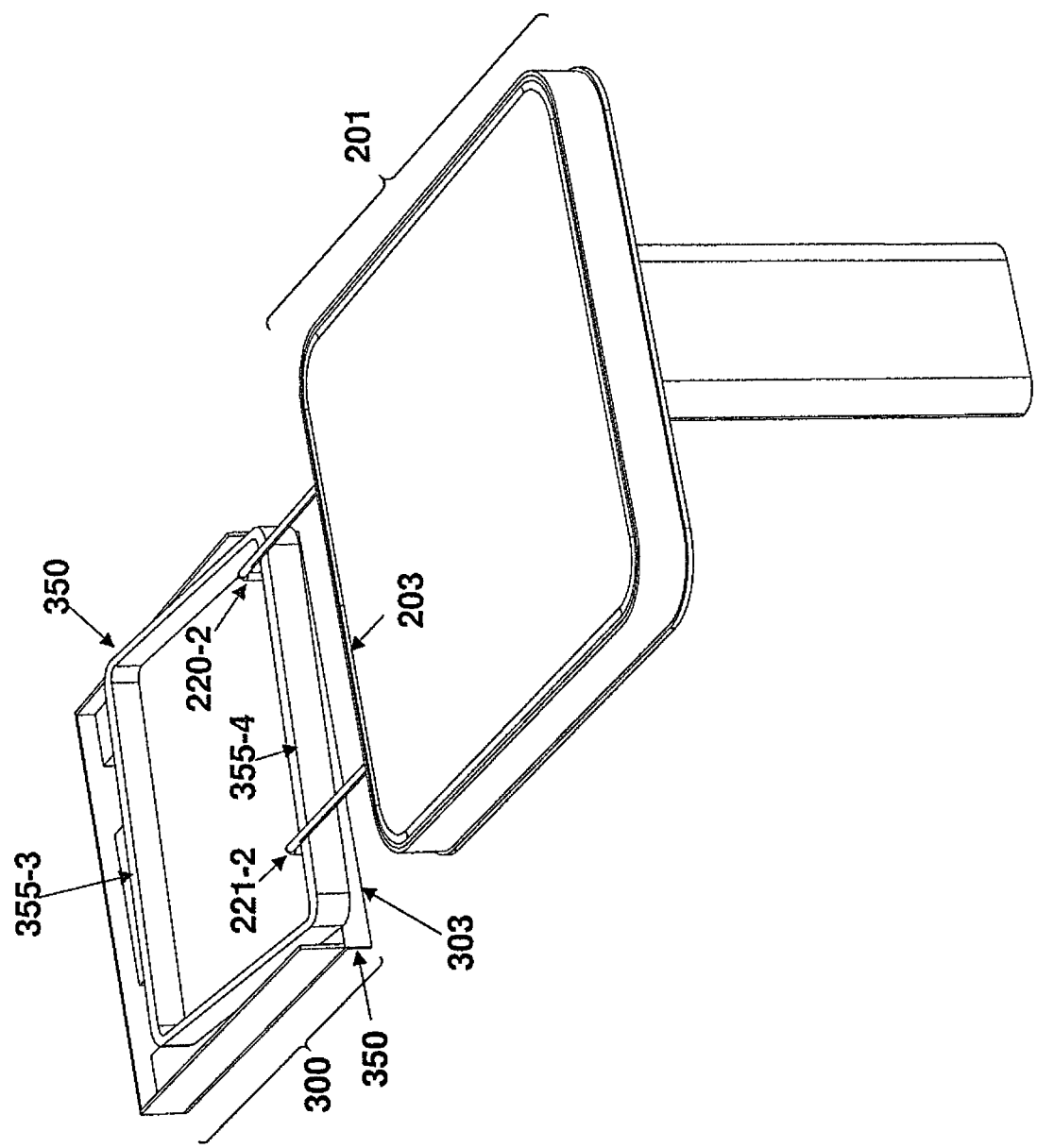
FIG. 8C is an upper perspective view of an upper deck assembly of a mobile robot according to one embodiment, with retrieval tips extended from the upper deck assembly and protruding downward to engage with a portion of a retrievable tray supported by a pallet.

In certain embodiments, the mobile robot can extend the retrieval arms out and rotate the retrieval arms downward to catch a vertical receiving surface of the retrieval item and pull, wherein if the retrievable item is not correctly aligned and/or in position for retrieval by the mobile robot, the pulling action of the two retrieval arms can cause one retrieval tips to engage a receiving surface of the retrievable item first and pull the side forward until both sides of the retrievable item are aligned. In certain embodiments where the retrievable item is aligned but possibly too far back for the standard item retrieval process to work, the mobile robot could use the pulling motion of the retrieval arms to pull the retrievable item in range and then switch to perform a standard item retrieval process. In an embodiment shown in FIG. 8C, the front side 203 of the upper deck 201 is in alignment with the front side 303 of the pallet 300, but the retrievable tray 350 sitting on the pallet 300 is out of alignment with both the pallet 300 and the upper deck 201 of the mobile robot. In FIG. 8C, the retrieval tips 220-2, 221-2 are extended out in front of the front side 203 of the mobile robot at the same distance, and rotated in a vertical but downward position. The level of the upper deck 201 is raised so that retrieval arms can clear above the top front edge of the front side 355-4 of the retrievable tray 350. To get into this position, the mobile robot would first approach the retrievable tray 350 with the retrieval arms above the top level of the front side 355-4 of the retrievable tray with the retrieval tips 220-2, 221-2 in a horizontal to vertical position to clear the front side of the retrievable tray. Once in position where each of the retrieval tips extend past the interior wall of the front side of the retrievable tray, the retrieval tips would rotate to the downward vertical position. The robot can check the distance between front side 355-4 of the retrievable tray 350 and the front side 203 of the upper deck 201, and decide to drive closer to the retrievable tray in order to close some or the entire gap with the retrievable tray. When ready, the mobile robot can retract the retrieval arms and the retrieval tip 221-2 will make first contact at a point along the left half of the interior wall of the front side 355-4 of the retrievable tray 350, and cause the left side of the retrievable tray to pull back and come into better alignment with the front side 203 of the upper deck 201 of the mobile robot.

Alternative Methods of Retrieval

In certain embodiments, the mobile robot can include mounting features that can hold one or more removable containers and/or other removable items. In certain embodiments, the mounting features can be located along or near one or more of the outer sides of the mobile robot and can be attached to the mobile robot at a point above the lifting mechanism. In certain embodiments, the removable containers and/or other removable items can include one or more connecting features which can descend vertically into the mounting from the top down to attach the removable container and/or other removable object to the mobile robot. The removable container and/or other removable item may include additional connecting features on another side that allow it to also connect to one or more mounting features of an extrinsic structure. This configuration can allow the mobile robot to carry a removable container and/or other removable item along one side of the mobile robot, drive to a point where the connecting features located along the other side of the removable container and/or other removable item, align above the mounting features of the extrinsic structure, and lower the lifting mechanism to engage the connecting features of the removable container and/or other removable item with the mounting features of the extrinsic structure, and then continue to lower to disengage the removable container and/or removable item from the mobile robot. The same process can work in reverse to start the mobile robot below the connecting features of a removable container and/or other object and lift part of the mobile robot with the mounting features up, so that one or more of the mounting features captures the one or more of the connectors of the removable container and/or removable item and lifts the removable container and/or other removable item off from the extrinsic structure.

In certain embodiments, the mounting features on the mobile robot can be on the rear side of the mobile robot, to avoid interference with the item retrieval system on the front of the mobile robot and/or sensors in the area and/or be more optimal to maintain a center of gravity of the mobile robot. In certain embodiments, one or more rear portions of the mobile robot can include additional sensors to support loading and unloading functions along the rear side of the mobile robot. In certain embodiments, these sensors can interact with visual patterns and/or other components near the location of the mounting brackets or connectors on the extrinsic surface, following a system of markings to control the mobile robot's system for item detection, alignment, and retrieval similar to the system used for the pallets and retrieval trays in FIG. 4A.

In certain embodiments, the rotating retrieval tips of the retrieval arms can be extended out from the front of the of the upper deck and/or other support surface by a small distance and positioned vertically to act as mounting features for removable containers and/or removable items, as described above.

In certain embodiments, the rotating retrieving tips of the retrieval arms and/or the fixed mounting features as described above can be used to retrieve other objects including, but not limited to: clothes, towels and/or other fabric material hanging on hook-like extrinsic connecting feature; rings with keys and/or other items; items that may hang on straps and/or hooked handles, such as a cane and/or manual grabber arm.

Variations of Pallets and Extrinsic Support Surfaces

In certain embodiments, the system of extrinsic support surfaces, retrievable items, retrieval mechanisms, support surfaces on the mobile robot and/or other elements of the mobile robot can perform the same core function of transporting retrievable items with minimal exposure of the item retrieval mechanism as shown in FIG. 3G through FIG. 3N, but with elements of the system embodied in different configurations.

In certain embodiments, a multitude of pallets and/or items with pallet features may be provided within a single environment and be utilized by one or more mobile robots for storage and/or retrieval of retrievable items. In certain embodiments, one or more robots may transition a multitude of retrievable items of varying types between one or more support surfaces on a mobile robot and one or more pallets and/or items with pallet features. In certain embodiments, a variety of different forms of retrievable items can be used with a single type of pallet. In certain embodiments, certain retrievable items or types thereof may be matched for use with certain pallets.

In certain embodiments, one or more pallets can be placed on one or more surfaces within an environment which may include, but are not limited to, a table top, a countertop, a single shelf, a shelf within a set of shelves, a rack that is partially open in the middle but has support surfaces that connect to the sides of the rack, a surface within an appliance such as a refrigerator, microwave, dishware and/or other household appliances in and/or on which items are placed, and/or a surface on or within another mobile robot. In this embodiment, the pallet can provide a storage location for the retrievable item when the retrievable item is not on the mobile robot, and can be used to support the retrievable item while the retrievable item is transitioned between the mobile robot and the pallet.

In certain embodiments, the retrievable item support features of the pallet may be integrated into another structure, such as a shelf or surface that is part of a piece of furniture, storage system, appliance and/or fixture, where the shelf or other surface acts as the pallet without the need for a separate pallet. In certain embodiments where the retrievable item support surfaces are provided by another structure, certain elements of the pallet such as the recessed channels can be replaced by providing support surfaces in specific locations and leaving other areas of the retrievable item storage area open underneath. In certain embodiments, these structures can include, but are not limited to, an open storage rack with support surfaces on the sides of the rack and open space in the middle for one or more retrieval arms to travel, a shelf that has open areas for one or more retrieval arms to travel, a shelf that extends from the back and supports the retrievable items from the center and leaves space to the sides open for one or more retrieval arms to travel, two or more support rods or brackets that extend from the back and provide openings for one or more retrieval arms to travel, and/or other configurations that provide a combination of support surface for the retrievable item to rest upon, together with open space permitting travel of one or more retrieval arms.

Variations of Retrievable Items

In certain embodiments, retrievable items can be configured in a variety of sizes and form factors, such as, but not limited to: open top service trays with low sides for carrying and serving meals; open top trays, bins, boxes and/or baskets with raised walls to help contain objects within the walls wherein part of the height of the object may still extend past the height of the wall for visibility and/or access; open top trays, bins, boxes and/or baskets with taller side walls that extend above the objects placed within the tray, box, bin and/or basket; and/or trays, bins, boxes and/or baskets with removable and/or moveable lids that cover the top of the tray, bin, box and/or basket. In certain embodiments, a retrievable item may be a single object, such as an everyday household object, that has been designed and/or adapted to include the receiving surfaces needed by the mobile robot's item retrieval mechanism to push and/or pull the object off from and/or on to a support surface of the mobile robot and/or an extrinsic support surface.

Variations in Receiving Surfaces

In certain embodiments, a retrievable item can include one or more receiving surfaces wherein retrieval tips and/or other features of the retrieval arms can engage the receiving surfaces to push and/or pull the retrievable item. In certain embodiments, one or more receiving surfaces can be located in or on one or more sides of the retrievable item to allow for different orientations of placement of the retrievable item relative to the pallet, wherein the retrieval tips and/or other features of the retrieval arms can engage whichever receiving surfaces are positioned for use in transitioning the retrievable item.

In certain embodiments, the item retrieval mechanism of the mobile robot can engage receiving surfaces of a retrievable item that are located on the distal end of the retrievable item relative to the mobile robot as shown in FIG. 3H through FIG. 3M to transition the retrievable item between an extrinsic item support surface and the item support surface of the mobile robot.

In certain embodiments, the item retrieval mechanism can engage receiving surfaces arranged in other locations on the retrievable item besides and/or in addition to the distal end of the retrievable item relative to the mobile robot, where the locations of the receiving surfaces may include, but are not limited to, the proximal end of the retrievable item, the sides of the retrievable item perpendicular to the proximal and distal ends, and/or locations inside of the boundaries of the perimeter of the retrievable item. As an example of one embodiment, one or more receiving surfaces can be along the sides of a retrievable item where the side are perpendicular to the distal and proximal ends of the retrievable item relative the mobile robot, wherein open channels and/or other open spaces along the sides of the retrievable item allow for the lateral travel of the retrieval arms, and wherein vertical receiving walls are placed at one or more locations along the sides so that the vertical receiving walls are perpendicular to the sides of retrievable item, and so that the retrieval tips of the retrieval arms can rotate into position and engage the vertical receiving walls to push and/or pull the retrievable item.

In certain embodiments, an item retrieval mechanism may engage one or more receiving surfaces in a combination of steps to transition the retrievable item between an extrinsic item support surface and the item support surface of the mobile robot. In such an instance, the item retrieval mechanism may use one or more receiving surfaces to push and/or pull the retrievable item a certain distance, and then engage a different set of receiving surfaces to push and/or pull the retrievable item and additional distance. In certain embodiments, a multi-step transition process can be used to reduce the distance the item retrieval mechanism is required to travel out from the front edge of the item support surface of the mobile robot to reach a receiving surface on a retrievable item, thereby enabling the item retrieval mechanism to transition retrievable items that are located at a further distance from the front edge of the item support surface of the mobile robot, and/or enabling the item retrieval mechanism to transition retrievable items that are greater in length than the distance the item retrieval arms and/or item retrieval mechanism can span in one step, and/or reduce the length or the retrieval arms and/or internal space required to house the item retrieval mechanism within the mobile robot. In certain embodiments, the item retrieval mechanism may extend out to reach a point 50% of the distance to the distal end of the retrievable item relative to the front edge of the item support surface of the mobile robot, engage one or more receiving surfaces of the retrievable item, retract to pull the item partially onto the item support surface of the mobile robot, then disengage and extend out to reach the distal end of the retrievable item, engage one or more receiving surfaces on the distal end of the retrievable item, and retract a second time and pull the remaining part of the retrievable item onto the item support surface of the mobile robot. In certain embodiments, the receiving surface of a retrievable item and/or the engaging surface of a retrieval arm may take on a wide variety of form factors, as long as the two elements can engage to enable the push and/or pull functions of the retrieval arm and disengage to allow the retrieval arms to move independently of the retrievable item. In certain embodiments, the connection between the retrievable item and the retrieval arm may include, but is not limited to: a hole or other type of opening integrated into the design of the retrievable arm allows a hook or a post-like feature connected to the retrievable item to enter and connect with the hole or other type of opening; a spring-loaded latch mechanism on the retrieval arm that engages and disengages the retrievable item based on the motion of the retrieval arm; and/or a connector that fastens into a connecting point when first positioned into place, and disengages based on the motion and/or level of power of the retrieval arm. In certain embodiments the engagement can utilize magnetic systems, suction systems, cabled enabled systems powered by one or more additional actuators, friction systems, hook and loop attachment systems, adhesive surfaces, rotating screw and thread assemblies, hydraulic systems, pneumatic systems and/or air inflation/deflation systems.

Additional Elements of Retrievable Items

In certain embodiments, the bottom surface 353 of the retrievable tray shown in FIG. 3E and/or bottom surface a different retrievable item may have additional features for interfacing with the pallet, item retrieval arms, and/or a support surface of the mobile robot.

In certain embodiments, the bottom surface of the retrievable tray or another retrievable item may have one or more lower structures below the primary bottom surface of the retrievable tray or retrievable item. These lower structures may include, but are not limited to, rails, walls, skis, feet and/or wheels that are orientated along the lateral direction of travel of the retrievable tray during the transition between surfaces. These lower structures may have matching features integrated into the support surface of the mobile robot, so that when the retrievable item is pulled onto the support surface of the mobile robot, all or part of the lower structures sits within depressed features of the support surface. This configuration can provide for physical guides for a number of functions, including but not limited to: helping the retrievable item stay aligned to the support surface and/or retrieval mechanism of the mobile robot during transition on to and/or off from the support surface of the mobile robot; helping the retrievable item stay in place on the support surface of the mobile robot while the mobile robot is in motion; helping individuals place the retrievable item in the position on the support surface of the mobile robot required for the retrieval mechanism to engage with it; and/or enabling the upper horizontal support surface of pallet to be lower relative to the recessed channels of the pallet. In an embodiment of the last example, lower structures under the retrievable item can reduce the height of the upper horizontal support surface of the pallet by the amount of vertical distance that the lower structures sit below the upper surface of the deck and/or other support surface of the mobile robot, where the mobile robot can align the bottom of the recessed features of the deck or support surface of the mobile robot upon which the lower structures rest with the upper horizontal support surfaces of the pallet. In certain embodiments, the upper horizontal support surfaces of the pallet may include depressed features that match the lower structures of the retrievable item to provide similar benefits as noted above in regard to the use of depressed features with the surface of the deck and/or other support surface of the mobile robot.

In certain embodiments, the bottom of the retrievable tray and/or other retrievable item may include upwardly recessed channels and/or inverted depressions that allow the retrievable tray and/or other retrievable item to align with and/or be pushed and/or pulled along matching raised ridges and/or rails on the upper surface of the upper deck of the mobile robot, another support surface of the mobile robot, and/or the upper horizontal support surface of the pallet.

Detection of Pallets and Retrievable Items

In certain embodiments, the pallet can include one or more elements that enable a sensor or sensors on the mobile robot to detect the presence of the pallet, determine the identification of the pallet and/or determine the position of the pallet relative to the position of the mobile robot and/or the position of one or more of the support surfaces of the mobile robot.

In the embodiment of the mobile robot shown in FIG. 1A, a visual sensor 109 is placed near the front side 104 of the upper deck 101 of the mobile robot 100, where the visual sensor 109 is positioned near the front edge 103 of the upper deck 101 and below the upper surface 102 of the upper deck 101.

Figure 4A:
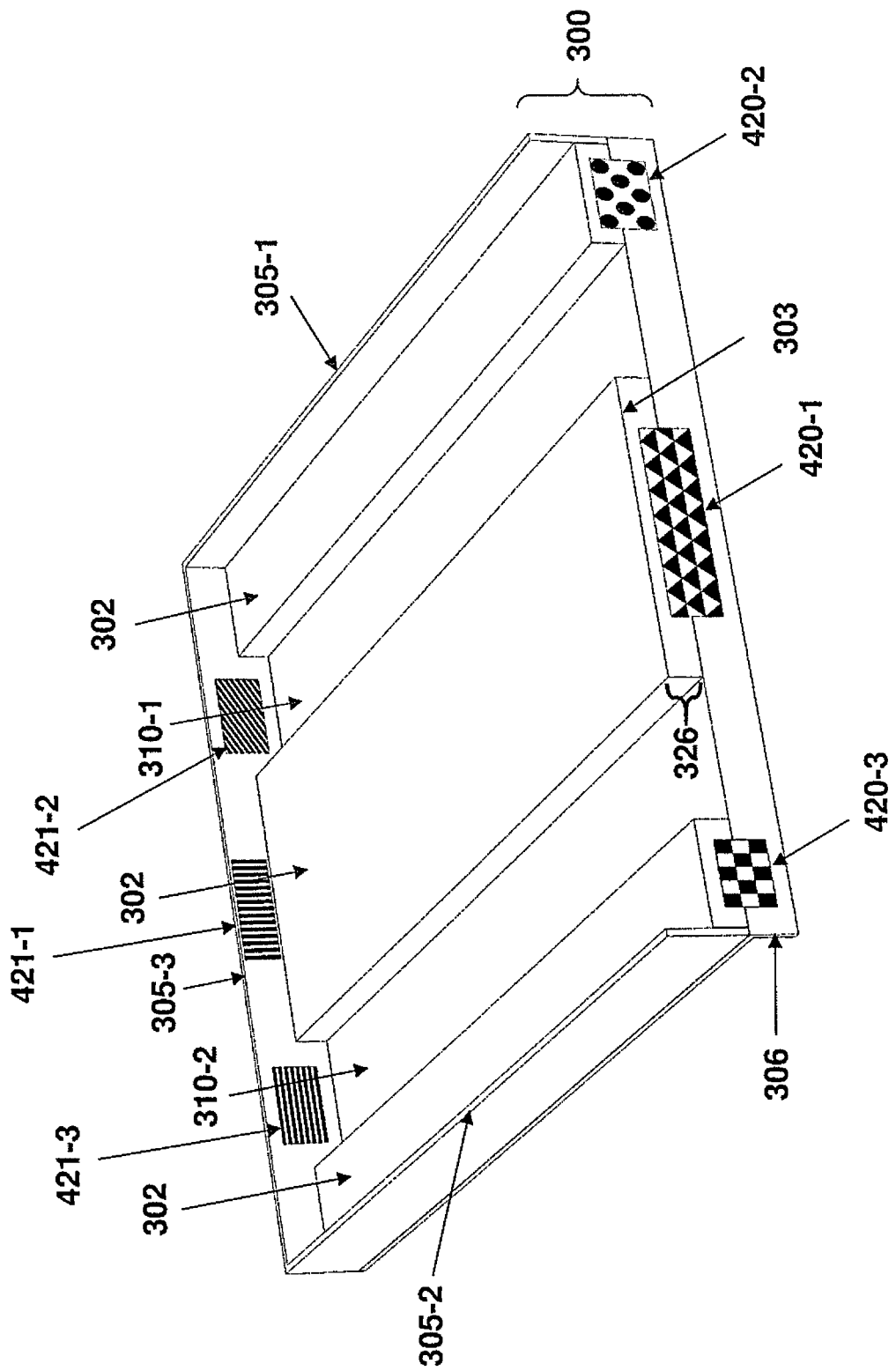
FIG. 4A is an upper perspective view of a pallet for supporting a retrievable tray according to one embodiment of the present disclosure, the pallet including multiple visual elements displayed on different surfaces thereof.

FIG. 4A shows an embodiment of the pallet 300 that includes multiple visual elements displayed on different surfaces of the pallet. In an embodiment of the pallet shown in FIG. 4A, a visual pattern 420-1 is placed on the front side 304 of the pallet 300 the along the front edge 303 of the pallet so that pattern 420-1 is visible to the visual sensor 109 located on the front side 104 of the upper deck 101 of the mobile robot 100 in FIG. 1 when the mobile robot faces toward the front side 304 of the pallet 300 within a certain degree and when the mobile robot is within a certain minimal distance of the pallet. In this embodiment, the visual sensor 109 on the mobile robot 100 in FIG. 1 can determine the relative position of pallet 300 in FIG. 4A based the detection of the visual pattern 420-1 located on the front side 304 the pallet 300, where the position information may include the distance from the mobile robot to the pallet, the horizontal angle and/or horizontal displacement of the front edge 103 of the upper deck 101 of the mobile robot 100 relative to the front edge 303 of the pallet 300, the vertical angle and/or vertical displacement of the upper surface 102 of the upper deck 101 of the mobile robot 100 relative to the upper horizontal surface 302-1, 302-2, 302-3 of the pallet 300, and/or the orientation of the plane of the upper surface 102 of the upper deck 101 of the mobile robot relative the orientation of the plane of the upper horizontal surface 302-1, 302-2, 302-3 of the pallet. Using this position information, the mobile robot can navigate toward the pallet to a position where the front edge 103 of the mobile robot 100 is aligned with the front edge 303 of the pallet 300, the two lateral edges are at a minimal distance relative to one another, and/or the upper surface 102 of the upper deck 101 of the mobile robot is level with and parallel to the horizontal surface 302-1, 302-2, 302-3 of the pallet so that the retrieval arms of the mobile robot can be used to transition a retrievable item between the pallet and the upper deck of the mobile robot.

In certain embodiments, other decks and/or support surfaces can include one or more sensors for use in detection and/or alignment with a pallet, other extrinsic support surface and/or retrievable item. In certain embodiment, one or more sensors may be placed on different elements of the mobile robot in addition to or instead of the support surface for use in detection and/or alignment with a pallet, other extrinsic support surface and/or retrievable item.

In certain embodiments, multiple elements and/or patterns may be placed on the front side 304 of the pallet 300 and/or other surfaces of the pallet that can be detected by one or more sensors on the mobile robot.

In the embodiment shown in FIG. 4A, visual patterns 420-1, 420-2, 420-3 in the center, right and left areas of the front side 304 of the pallet 300 to provide more points of possible detection within the sensor's field of view on the mobile robot. In certain embodiments, visual patterns placed on other surfaces other than or in addition to the front side of the pallet for detection and/or alignment. After initial detection of one or more visual patterns of the mobile robot, certain patterns in certain locations may be used to aid in different stages of the approach and alignment procedure of the mobile robot. In certain embodiments, the visual pattern 420-1 located in the center lower area of the front side 304 of the pallet 300 is placed so that the visual pattern 420-1 stays within the field of view of the visual sensor 109 located in the center of the front side 104 of the upper deck 101 of the mobile robot 100 in FIG. 1A as the mobile robot closes the final distance between the upper deck and the pallet.

The pallet can also include one or more elements that enable a sensor or sensors on the mobile robot to detect the presence of objects on surface of the pallet.

In an embodiment shown in FIG. 4A, the pallet includes a secondary set of visual patterns 421-1, 421-2, 421-3 in the center, right and left areas of the rear interior wall 305-3 of the pallet 300 opposite to the forward side 304 of the pallet. The visual elements 421-1, 421-2, 421-3 of the pallet 300 in FIG. 4A can enable the visual sensor 109 on the mobile robot 100 in FIG. 1A to determine if the area within the pallet 300 is empty and/or if a retrievable tray, another retrievable item and/or a foreign object may be located on the pallet and is blocking the view of the visual sensor 109 to one or more of the visual patterns on the interior of the rear wall 305-3 of the pallet 300. In other embodiments, the secondary set of visual elements may be placed along one or more interior sides of the pallet, along one or more interior horizontal surfaces, and/or placed along a combination of a rear interior wall, one or more interior side walls, and/or one or more interior horizontal support surfaces.

In certain embodiments, the visual sensor may be positioned in a different location than the center of the front side of the upper deck provided the sensor still can see the visual patterns of a pallet for the pallet detection, alignment and/or approach functions of the mobile robot. In certain embodiments, each deck and/or other support surface of the mobile robot can include a visual sensor to enable the respective deck and/or other support surface of the mobile robot to align with pallets.

In certain embodiments, one or more sensors on the mobile robot can determine the presence and/or absence of an object on a pallet with and/or without the presence of visual patterns. In certain embodiments, these sensors may include, but are not limited to, one or more depth cameras and/or proximity sensors positioned to detect one or more known surfaces of the pallet relative to the mobile robot to confirm if an object is obstructing that surface.

Figure 4B:
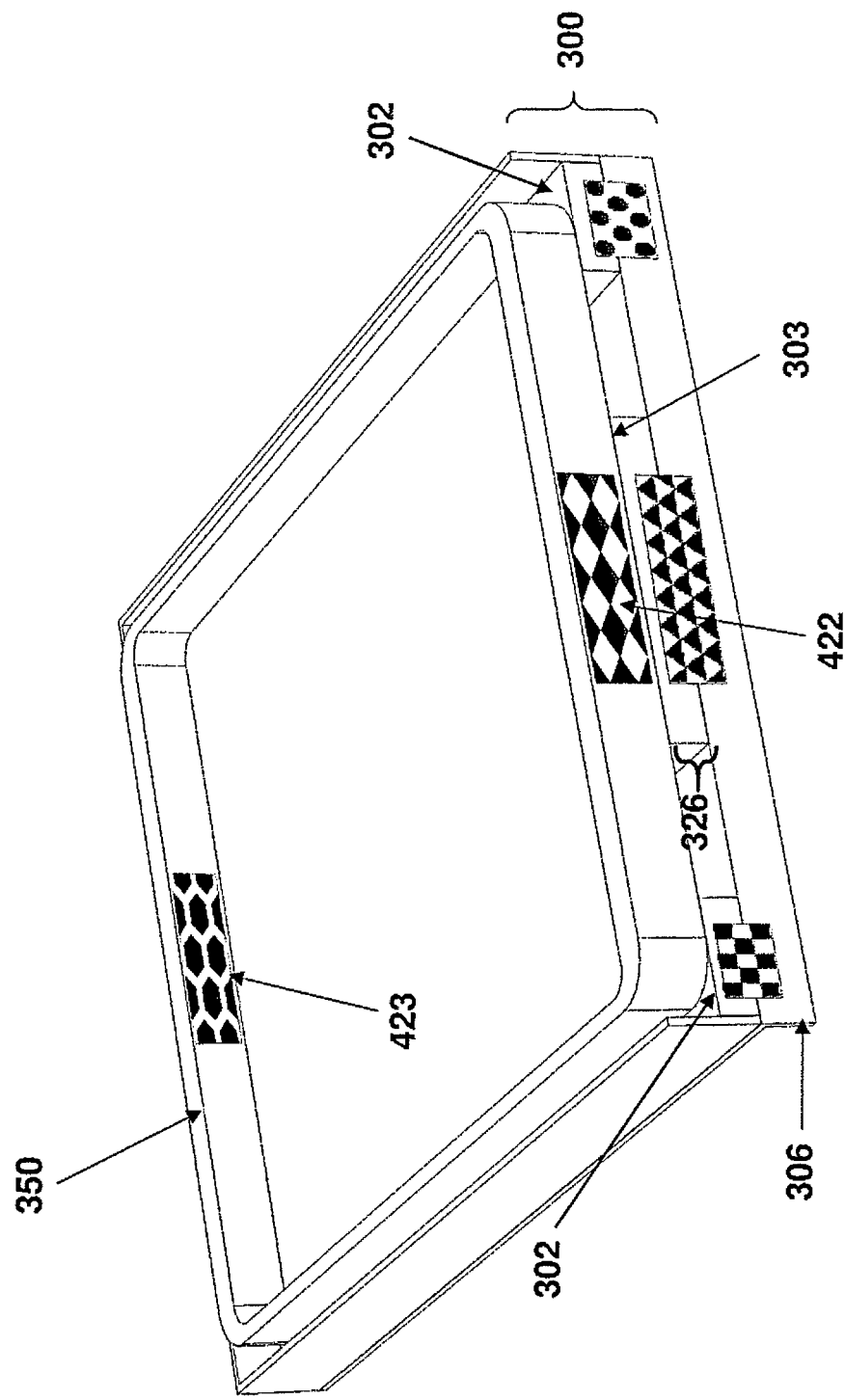
FIG. 4B is an upper perspective view of a retrievable tray including interior and exterior visual patterns supported by the pallet of FIG. 4A.

In certain embodiments, the retrievable tray and/or retrievable item may include features on a variety of exterior and interior surfaces of the retrievable tray and/or retrievable item, and that are detectable by one or more sensors of a mobile robot. In an embodiment shown in FIG. 4B, the retrievable tray includes an exterior visual pattern 422 on the front exterior side, and an interior visual pattern 423 on the rear interior side of the retrievable tray, with both patterns 422, 423 being detectable by an optical and/or visual sensor on the upper deck of the mobile robot. In certain embodiments, the mobile robot with a visual sensor can use one or more visual patterns located on a retrievable item to perform one or more functions, which may include, but are not limited to: confirming the presence of the retrievable item on a specific pallet; determining the identification of the retrievable item; confirming the position of the retrievable item relative to the pallet, such as whether the retrievable item is aligned within the pallet and/or seated full into the pallet; and/or confirming the position of the retrievable item relative to the upper deck and/or support surface of the mobile robot prior to the retrievable item being loaded onto the robot. In certain embodiments, one or more visual patterns on a retrievable item can provide dimensional information to the mobile robot on the relative location of receiving surfaces on the retrievable item for controlling item retrieval mechanism, such as but not limited to the amount of distance a retrieval arm of the retrieval mechanism of the mobile robot need to travel past the front edge and/or other landmark of the retrievable item in order to position a retrieval tip of a retrieval arm in the correct position for engaging the a receiving surface of the retrievable item.

In other embodiments, a retrievable tray and/or retrievable item can include features that are placed within the interior surfaces of the retrievable tray and/or retrievable item and that are detectable by one or more sensors on the mobile robot to determine the presence and/or absence of objects within the retrievable tray and/or retrievable item. In certain embodiments, the mobile robot can use a visual camera and/or other sensors to capture information at two or more points of time of the interior area of the retrievable tray and/or retrievable item to compare the information to identify possible changes in the items and/or other objects contained on the retrievable tray and/or other retrievable item. In certain embodiments, the mobile robot can include a visual camera and/or other sensors to directly detect one or more items and/or objects within the interior of a retrievable tray and/or other retrievable item.

In certain embodiments, a mobile robot can combine information from a number of systems to estimate use and/or consumption over time of one or more items and/or objects within a retrievable tray and/or other retrievable items. These systems can include a visual camera and/or other sensor to detect changes in which interior features of a retrievable tray and/or retrievable item have become visible and/or directly detectable, a visual camera and/or other sensor to detect changes in which items and/or objects within a retrievable tray and/or retrievable item are visible and/or directly detectable, one or more sensors than can detect changes in the weight of the retrievable tray and/or retrievable item; and/or one or more sensors detecting part of a person and/or other object crossing one or more planes around the edge of a support surface monitored by one or more sensors to indicate that one or more items may have been removed from or moved onto a retrievable tray and/or other retrievable item.

In certain embodiments, a system of visual patterns used on the pallet, retrievable tray and/or retrievable item may be placed on other objects to help the mobile robot detect, align and/or potentially retrieve the object or at least indicate to an individual where the object is located and/or was last observed by the mobile robot.

In certain embodiments, a pallet and/or retrievable item may have other elements that can be used for the detection, alignment and/or approach functions of the mobile robot. These embodiments may include, but are not limited to: visual features integrated into the structure of the pallet and/or retrievable item; visual features on the pallet and/or retrievable item that have reflective elements in reaction to active illumination; visual features on the pallet and/or retrievable that are visible in the IR spectrum; visual signals emitted by one or more powered LEDs on the pallet and/or retrievable item such as a beacon element; and/or non-visual features integrated into the pallet and/or retrievable item such as electronic components such as RFID tags, WiFi modules, Bluetooth modules and/or other components that emit radio signals, magnetic fields, sound waves and/or other detectable signals. In certain embodiments, one or more of these detection elements may be used in other locations of the environment besides and/or in additional the pallet and/or retrievable item to aid in the detection, alignment and/or approach functions of the mobile robot.

In certain embodiments, detection elements as outlined above may be integrated into and/or placed onto a shelf, countertop, piece of furniture, wall, door, doorway, electronic device and/or the floor in into to enable the mobile robot to navigate to the area of the pallet and/or retrievable item. In certain embodiments, the mobile robot may first utilize and/or approach one or more detection elements positioned apart from the pallet or retrievable item in order to travel closer to the pallet and/or retrievable item and the search the for a detection element of the pallet and/or retrievable item once the mobile robot is in a certain position.

In certain embodiments, these detection elements may be integrated into and/or placed onto other objects for the mobile robot to locate, including but not limited to a charging dock for the mobile robot, household and/or personal objects that an individual may want to track, other mobile robots and/or other devices the mobile robot can interact with, and/or other container and/or objects that the mobile can retrieve with the item retrieval mechanisms shown in FIG. 2A and FIG. 2E and/or other types of retrieval mechanisms.

In certain embodiments, at least one retrievable item may include at least one detection and/or identification feature, and a robotic item retrieval and/or transport apparatus comprises at least one sensor configured to detect the at least one detection and/or identification feature to permit the robotic item retrieval and/or transport apparatus to perform at least one of the following functions (a) or (b): (a) detect presence of the at least one retrievable item, or (b) position at least a portion of the robotic item retrieval and/or transport apparatus relative to the at least one retrievable item.

System Level Summary of the Item Retrieval Process

Figure 5:
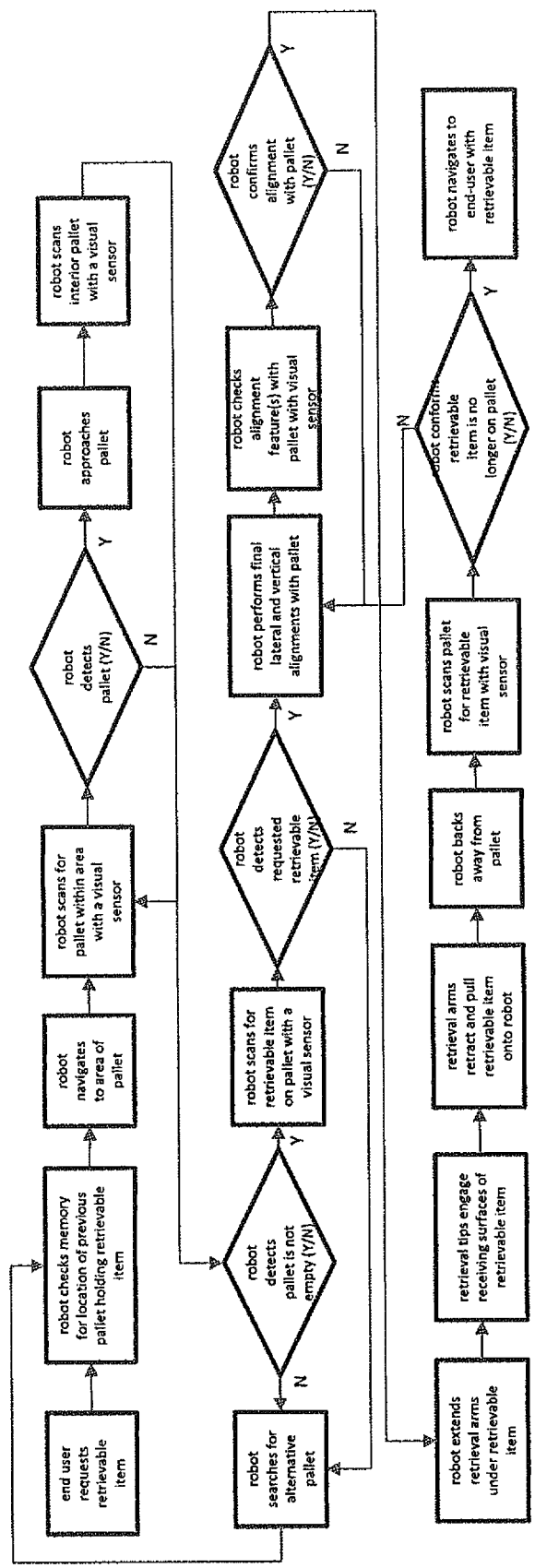
FIG. 5 is a flowchart showing steps of a process for a mobile robot to retrieve a retrievable item from a pallet and load the retrievable item onto a support surface of the mobile robot.

FIG. 5 shows a summary of an embodiment of the process for a mobile robot to retrieve a retrievable item from a pallet and load the retrievable item onto a support surface of the mobile robot. For the initial position, the retrievable item is resting on the pallet, and the pallet is resting on a shelf and the mobile robot is at another location. An end user initiates the retrieval process by requesting a certain retrievable item.

In certain embodiments, the end user's request can by input through a variety of methods and/or devices, such as but not limited to; providing a voice command to the mobile robot and/or to a device enabled with speech recognition networked in communication with the mobile robot; using an application running on smart device that interfaces with the mobile robot; using an user interface on the mobile robot that relays commands to an application that interfaces with the mobile robot; and/or pressing one or more buttons and/or controls on a remote device that interface with the mobile robot.

Continuing with the item retrieval process shown in FIG. 5, the mobile robot navigates to the general location of the pallet based on knowledge of the pallet's previous location within a map of the local environment under the guidance of a software program running on a computer module on the mobile robot and/or running on a computer module that is in communication with the mobile robot. Once at the general location associated with the pallet, the mobile robot uses a visual sensor to scan that area for the pallet and confirms the presence and location of the pallet through detection of one or more visual features on the pallet. If the pallet cannot be detected, the mobile robot can enter a search mode for finding the desired pallet and/or notify an end-user that the pallet is not present if the software program reaches a specified time limit on the search process. Once the pallet has been detected, the mobile robot aligns itself for approach to the pallet and, if needed, moves closer to get a better view of the pallet, visual features that may be on the pallet, and/or any items that may be present on the pallet. The mobile robot then confirms that the pallet is not empty by using the visual sensor to check for the presence for visual features within the interior of pallet and confirming one or more of those features are not visible. The mobile robot then uses the visual sensor to check for the presence and the identification of the retrievable item through visual features on the retrievable item. If the presence of the retrievable item cannot be confirmed, the mobile robot can switch to a different search mode for finding the desired retrievable item and/or notify an end-user that the retrievable item is not present if the software program reaches a specified time limit on the search process.

Continuing with the item retrieval process shown in FIG. 5, once the pallet and retrievable item are confirmed to be present by the visual sensor and in range of the mobile robot, the mobile robot engages in a docking procedure and drives toward the pallet, adjusting its direction and/or position to align the front side of the support surface of the mobile robot with the front edge of the upper horizontal support surface of the pallet. Using the same or similar sensors and visual features, the mobile robot may also activate the powered scissor lift to adjust the height of the support surface of the mobile robot relative to the height of the upper horizontal surface of the pallet.

In certain embodiments, the mobile robot stops driving and/or adjusting the height of support surface once the visual sensor detects a set of visual features on the pallet and/or retrievable item are in the correct position and distance relative to the visual sensor on the robot. In another embodiment, the mobile robot may reach a target reference position relative to the position of the pallet as determined by the visual sensor on the mobile robot, and then drive and/or adjust the height of the upper deck of the mobile robot a final distance based on projection of the pallet's position to the target reference position in order to function when the visual sensor of the mobile robot may not be able to maintain the visual elements located on the pallet within the sensors field of view.

Continuing with the item retrieval process shown in FIG. 5, in certain embodiments, if the mobile robot cannot achieve a docked position with the pallet on an attempt to dock, the docking software routine may reset, back the mobile robot off and retry the docking procedure for a certain number of tries and/or certain amount time before the mobile robot quits the process.

In certain embodiments, additional sensors may assist in determining the upper deck and/or other support surface of the mobile robot is docked correctly with the pallet. In one embodiment, one or more contact sensors can be connected to panels and/or a bumper located along an area of the front side of the upper deck and/or other support surface of the mobile robot.

In certain embodiments, the front side of the upper deck and/or other support surface of the mobile robot can include a bumper and/or set of contact sensors that can detect contact with an obstacle and/or object in front of the upper deck and/or other support surface of the mobile robot. In certain embodiments, the bumper and/or set of contact sensors can include at least one detection point on each of the left and right halves of the front side of the upper deck and/or other support surface. In certain embodiments, when the mobile robot is approaching the front edge of the pallet and/or other extrinsic surface, the mobile robot can use contact detection from at least one half of the bumper and/or at least one contact sensor on the front side of the upper deck and/or other support surface to determine and/or confirm that the upper deck and/or other support surface is positioned against the pallet. If needed, the mobile robot can adjust its position until both the left and right half of the bumper and/or contact sensors on the left and right halves of the front side of the upper deck and/or support surface of the mobile robot are detecting contact to determine and/or confirm that the front side of the upper deck and/or other support surface of the mobile robot is aligned with the front edge of the pallet.

In certain embodiments, if the mobile robot has at least one left retrieval arm and one right retrieval arm within the upper deck and/or other support surface of the mobile robot, the retrieval arms and/or retrieval tips can include contact sensors and/or other motion feedback sensors to use the retrieval tips of the retrieval arms to detect and/or confirm contact and/or alignment with the front edge of the pallet and/or other extrinsic support surface.

Continuing with the item retrieval process shown in FIG. 5, once the mobile robot and the upper deck and/or support surface of the mobile robot are in the correct position for transfer, the retrieval arms extend out from the front side of the upper deck and/or support surface of the mobile robot and travel under the retrievable item within the recessed channels of the pallet, wherein the retrieval tips of the retrieval arms remain rotated in the horizontal position. Based on the identification of the pallet and/or retrievable item by the visual sensor and/or by data stored in the robot's memory, the retrieval arms extend out a set distance and stop at a point where the retrieval tips of the retrieval arms are located under the receiving surfaces of the retrievable item. The retrieval tips of the retrieval arms then rotate upward into a vertical position, with the retrieval tips positioned next to one or more receiving surfaces of the retrievable item. The retrieval arms then begin to move in reverse causing the inward surface of the retrieval tips to press against an inward receiving surface of the retrievable item, and begin pulling the retrievable item from the pallet and onto the upper deck and/or support surface of the mobile robot. The retrieval arms stop once they have retracted to a position where the retrieval tips are within a minimum distance from the front side of the upper deck of the robot, so only a small portion of the retrievable item is resting off the edge of the upper deck and/or support surface of the mobile robot. The mobile robot then backs away from the pallet, leaving the retrievable item supported only by the upper surface of the deck. The mobile robot can use the visual sensor to check that the retrievable item is no longer on the pallet and/or that the pallet is empty, and if the robot can still detect the retrievable item on the pallet, it can restart the alignment and retrieval process. If the mobile robot confirms that the retrievable item is no longer on the pallet, the mobile robot can then turn and navigate toward its next destination, which may be to the location of the end user based on the end user's request.

Extrinsic Mechanisms for Item Retrieval

In certain embodiments, part of the retrieval mechanism for retrievable items can be incorporated into the pallet, other extrinsic surface, and/or other device. In certain embodiments, a mechanism extrinsic to the mobile robot can help align and/or position a retrievable item for retrieval by the retrieval mechanism of the mobile robot. In certain embodiments, a mechanism extrinsic to the mobile robot can transition a retrievable item part of the distance or the entire distance between the extrinsic support surface and a support surface of the mobile robot.

In certain embodiments, one or more secondary mobile robots external to the primary mobile robot such as shown in FIG. 1A, can provide support and/or expanded functionality for item retrieval. In certain embodiments, a smaller external mobile robot can drive between an extrinsic surface and a support surface of the primary mobile robot to transition items from one surface to the other. In certain embodiments, the smaller external mobile robot can be configured in a number of ways, including, but not limited to: a mobile cargo holder that carries items within and/or on the body of the mobile robot; a mobile tug robot that pushes and/or pulls retrievable items between an extrinsic surface and a support surface of the primary mobile robot; a mobile robot with a gripping and/or lifting mechanism can lift items and position the items to transfer the items between an extrinsic surface and a support surface of the primary mobile robot; and/or an electronic device, service robot, appliance and/or other object that includes a drive system can move itself between an extrinsic surface and a support surface of the primary mobile robot.

Sensor Configurations

In certain embodiments, a mobile robot can include one or more sensors that monitor one or more areas surrounding the mobile robot and/or within the volume of the mobile robot. These sensors can perform a number of functions including, but not limited to, helping the mobile robot to: recognize locations and/or navigate through environments; detect obstacles that may block the mobile robot's path and/or interfere with its operation; detect cliffs, drop-offs and/or other hazards; detect retrievable items and/or other objects on one or more surfaces of the mobile robot, a pallet, and/or other extrinsic support surface; detect retrievable items and/or other objects extending past one or more edges of surfaces of the mobile robot, a pallet, and/or other extrinsic support surface; detect and/or recognize individuals, animals, objects, and/or devices that may be encountered by the mobile robot and/or may be subject to interaction with the mobile robot; detect motion; detect and/or recognize gestures; capture images; stream and/or record video; and/or assist in a retrievable item transition process. In certain embodiments, these sensors can include, but are not limited to: one or more depth cameras; one or more single beam, multi-beam, and/or scanning beam proximity sensors; one or more image cameras, video cameras and/or visual sensors; one or more sonar sensors; one or more radar sensors; one or more lasers, scanning lasers and/or laser range finder; one or more structured light sensors and/or projected light sensors; one or more infrared-based and/or infrared augmented sensors; one or more physical contact sensors; and/or one or more other reflective signal detection sensors. In certain embodiments, these sensors can be positioned to monitor all or part of the areas surrounding the mobile robot, including, but not limited to: the area in the mobile robot's path; the floor surface around and/or below the mobile robot; the areas to the sides of and/or adjacent to the mobile robot's path; the areas along the sides of the body of the mobile robot and/or along the sides of the support surfaces of the mobile robot, pallet and/or extrinsic support surface; the areas above and/or below the body of the mobile robot; the areas above and/or below the support surfaces of the mobile robot, pallet and/or extrinsic support surface.

In certain embodiments, one or more depth cameras may be placed near a forward surface of the mobile robot to monitor for obstacles, objects, people, animals, surfaces and/or hazards in a travel path of the mobile robot. In certain embodiments, one or more depth cameras may be positioned near the top of the mobile robot pointing downward toward a floor to monitor the area in front of the of mobile robot at its base, extending across the width of the mobile robot at its base as well as extending forward and upward. In certain embodiments, one or more depth cameras may be positioned near the base of the mobile robot and point upward toward the upper sections of the mobile robot to monitor the area in front of the mobile robot, extending across the width of the mobile robot, across its middle deck and/or other support surface along the front of the mobile robot, and forward and upward including the top surfaces of the mobile robot and/or the items on the support surfaces of the mobile robot.

In certain embodiments, the mobile robot can include two or more depth cameras to provide overlapping areas of coverage, which can include, but are not limited to, one or more depth cameras near the top of the mobile robot looking downward and one or more depth cameras at the base of the mobile robot looking upward.

In the embodiment shown in FIG. 1A, a depth camera 169 is shown at the base of the mobile robot near the front edge 162, where the depth camera has an upward and forward orientation. In the embodiment shown in FIG. 1D, another depth camera 119 is shown along the underside of the upper deck 102 near the front edge 113, with the depth camera having a downward and forward orientation. In certain embodiments, depth cameras can be placed in additional or alternative locations to provide coverage along the front area of the mobile robot.

Figure 1D:
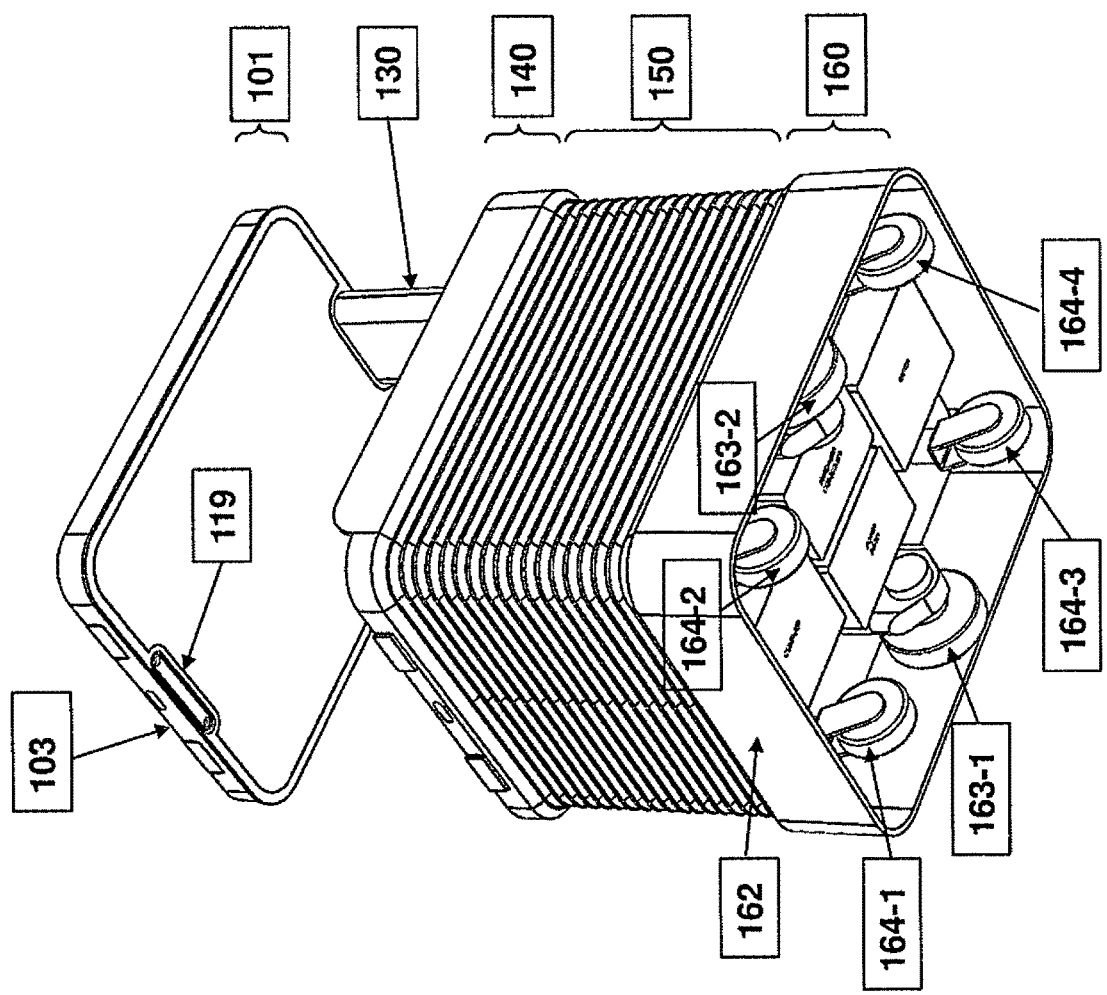
FIG. 1D is a lower perspective view of the mobile robot of FIG. 1A.

In certain embodiments, other sensors besides depth cameras can be used in the either or both locations marked 169 in FIG. 1A and/or in 119 in FIG. 1D.

In certain embodiments, a mobile robot may include one or more forward-facing depth cameras and/or other sensors to support one or more above mentioned sensory functions.

In certain embodiments, one or more depth cameras and/or the above-mentioned other sensors can be placed near the left, right and/or rear sides of the mobile robot and/or near, on or under the support surfaces of the mobile robot. Such cameras and/or sensors may provide additional areas of coverage for the same, similar, or a subset of functions provided by the forward sensors.

In certain embodiments, a mobile robot may include one or more sensors that can change their angle of orientation to expand the field of view of one or more sensors and cover one or more sides of the mobile robot at one or more upward, downward, horizontal and/or vertical planes relative to the mobile robot.

In certain embodiments, one or more depth cameras and/or one or more other sensors may be situated on a movable ring and/or lateral track extending around a portion or an entirety of a perimeter of the mobile robot, a vertical track arranged along one or more sides of the mobile robot, and/or a horizontal track arranged above and/or below a support surface of the mobile robot to position the depth camera and/or other sensors to have expanded fields of view.

In certain embodiments, a mobile robot can include a depth camera, visual camera, and/or other sensor mounted on a telescoping or otherwise movable post that can raise and/or lower relative to the position of one or more support surfaces of the mobile robot. Such arrangement may be used to position the field of view of the depth camera, visual camera, and/or other sensor to be able to determine if support surfaces are empty or if they are occupied by a retrievable item and/or other object. In certain embodiments, this depth camera, visual camera and/or other sensor can be mounted on a fixed post and/or structure positioned above one or more of the support surfaces of the mobile robot. In certain embodiments, the depth camera, visual camera, and/or other sensor can be used to scan the surface of a pallet, extrinsic support surface, and/or surface of a retrievable item that can hold one or more objects. In certain embodiments, a depth camera, visual camera and/or other sensor can be to confirm that objects on a retrievable item do not exceed a maximum height and/or other dimension that can be accepted by a support surface, by pallet, and/or by an extrinsic support surface.

In certain embodiments, a depth camera, visual camera, and/or other sensor external to the body of a mobile robot can be mounted to an external surface and positioned so that the sensor can measure one or more dimensions of a retrievable item and/or other objects carried by the mobile robot to confirm that retrievable item and/or other objects do not exceed one or more maximum dimensions that can be accepted by a support surface of the mobile robot, of a pallet, and/or an extrinsic support surface. These external sensors may be connected to the mobile robot wirelessly through a direct connection and/or through a network connection to provide readings or other signals to the mobile robot.

In certain embodiments, a mobile robot may include sensors to help monitor, manage, and/or protect one or more open areas along the sides of the decks or item support surfaces of the mobile robot. These sensors may support a number of functions, which may include, but are not limited to: detecting if the volume of space and/or adjacent to a side of a deck on the mobile robot, another support surface of the mobile robot, a pallet and/or other extrinsic support surface is adequately vacant and/or clear of obstacles so that there is a clear path for the retrieval arms and/or retrievable items to traverse with that space; confirming the presence and/or position of one or more retrieval arms and/or retrievable items; confirming the presence and/or position of one or more pallets, other extrinsic support surfaces and/or retrievable items; detecting if a retrievable item and/or other foreign object is extending past the outer boundaries of a deck and/or other item support surface of the mobile robot; detecting if a retrievable item and/or other foreign object is extending past the outer boundaries of a pallet, other extrinsic item support surface, and/or the sides of a retrievable item that carries other objects; and/or detecting if any obstacle and/or foreign object external to the mobile robot is approaching/or at risk of making contact with part of the robot and/or crossing over one or more open sides of the mobile robot.

In certain embodiments, the one or more sensors used for obstacle detection, object detection, other detection and/or recognition can also be used in support of the item transition functions and/or item transport functions of the mobile robot.

In certain embodiments, one or more sensors can detect if a retrievable item or other item on one or more support surfaces of one of the mobile robot extends past one or more side of those support surfaces and/or outside a defined boundary for items to be placed. In cases where an extension of an item poses a risk to the operation of the mobile robot, the mobile robot can respond in one or more ways, including, but not limited to: alerting the user and/or another individual of the issue and possibly the location of the item; pausing operation or travel the mobile robot and/or placing the mobile robot in a safe mode of limited functions until the item is cleared; expanding the distance required to keep clear of external obstacles along the side of the extended item; slowing the motion of the mobile robot; lowering or raising the height of the mobile robot and/or support surfaces to help avoid contact with external obstacles, and/or actively raising and/or lowering a guard wall along the side where the item is crossing a boundary in an attempt to push the item back into the defined boundary for operation of the mobile robot.

In certain embodiments, a mobile robot can dynamically adjust a virtual boundary and/or threshold for monitoring for external obstacles and/or items extending past the boundaries of a support surface, based on the function the mobile robot is performing, or the amount of distance to the obstacle, and/or the amount of space the item extends past a side of the decks and/or other support surfaces.

In certain embodiments, higher fidelity sensors (e.g., higher resolution, higher speed, and/or higher complexity sensors) can be placed on a front side of the mobile robot, wherein the mobile robot may spend a greater percent of its time driving forward, scanning for forward obstacles and/or engaged in item retrieval functions.

In certain embodiments, less complex, lower resolution and/or slower speed sensors can be used on the left, right and/or back sides of the mobile robot and/or above and/or below the surfaces of the mobile robot to provide a similar type of monitoring that forward depth camera or cameras provide, but at a diminished level of capability and/or level of performance.

In certain embodiments, a mobile robot can employ different behaviors that are matched to the lower level of performance of the scanning sensor assembly or similar sensor module, including, but not limited to: driving slower when the mobile robot is turning and/or backing up; setting a different and/or great distance for staying away from obstacles along the sides; and/or reacting more conservatively when interior items extend past the sides of the support surfaces of the mobile robot.

Drive Base

In certain embodiments, elements of a mobile robot may include a base with one or more powered wheels that move the robot over a variety of floor surfaces. The base may include one or more passive wheels that provide additional support for the stability of the mobile robot as it moves and/or when the mobile robot is stationary.

In the embodiment shown in FIG. 1D, the base of the mobile robot 160 may include two powered wheels 163-1, 163-2 located near right and left sides of the mobile robot along an area near the center axis of the robot body. These two powered wheels can be operated independently, each with their own motor, encoder, and set of wires that connect to a drive control unit. The two powered wheels can be used in combination to provide a differential drive that is capable of driving the mobile robot forward, driving the mobile robot in reverse, rotating the mobile robot to the right or left, arcing the mobile robot forward to the right or left, and/or arcing in reverse to the right or left.

In the embodiment shown in FIG. 1D, the base of the mobile robot may include four caster wheels 164-1, 164-2, 164-3, 164-4 to provide additional support for the mobile robot towards its outer corners.

In certain embodiments, caster wheels may be mounted to roll freely with the motion of a mobile robot, where the heading and/or lateral orientation can also be turn freely with the motion of the mobile robot. The two powered wheels and the four caster wheels can be connected to a suspension to enable the mobile robot to travel over small obstacles and/or stay engaged with the floor on uneven floor surfaces.

Alternative Drive Systems

In certain embodiments, the mobile robot can include alternative drive systems, including but not limited to drive systems that utilize one or more of the following mechanisms: powered and/or unpowered wheels that can turn laterally to change their orientation relative to the body of the mobile robot; powered and/or unpowered holonomic wheels; powered treads; powered suspension and/or powered lifting mechanisms that adjust the distribution of weight among the different elements of the drive system; and/or powered support posts and/or feet for stabilizing the mobile robot.

Power Assisted Casters

In certain embodiments, a drive system may include additional components to help deal with the greater range of challenges often found on and/in the floor surfaces of residential settings and/or other unstructured environments, such as floor transitions between flooring and/or rooms, transition strips mounted on the floor surface, deep pile carpeting, heavily padded carpeting, area rugs, depressions and/or troughs in the floor surface, HVAC floor registers and/or floor grates, power cords and/or other common household obstacles on the floor. Some or all of the foregoing obstacles which can be particularly difficult for passive caster wheels to roll over. An example of these challenges can include, but is not limited to, when a caster wheel may encounter the edge of an area rug, a power cord, and/or similar obstacle while driving on a hard surface area of the floor, wherein the mobile robot may be unable to pull the caster wheel up and over the edge of area rug or similar obstacle solely by turning of the main drive wheels.

In certain embodiments, to enable the mobile robot to traverse over more floor surfaces and/or obstacles, one or more of the caster wheels can be powered by one or more motors that provide a rotational assist function for the caster wheels to help the caster wheels traverse over floor surfaces and/or obstacles. These rotational assist functions may not provide enough power and/or control to move the mobile robot as desired from just the action of the caster wheels, but can work in conjunction with the main drive wheels to help limit instances in which the caster wheels may impede the mobility of the overall drive system and/or mobile robot.

In certain embodiments, one or more motors may be configured to apply power to one or more caster wheels whenever the main drive wheels are active and the robot is moving and/or attempting to move.

In certain embodiments, one or more motors attached (or otherwise operatively coupled) to one or more caster wheels can apply power to the caster wheels whenever the main drive wheels are moving and/or attempting to move. In such an instance a motor connected to the caster wheel may always apply power to the caster wheel in the same direction of rotation, where the direction of powered rotation is matched to the direction the caster wheel would normally rotate when passively being pulled along by the robot.

In certain embodiments, when one or more powered caster wheels are not aligned with the intended direction of motion of the mobile robot (such as in cases where the robot is starting from a stopped position and/or when the robot significantly changes direction in its course), the main drive wheels may apply more power in order to force the powered caster wheels into alignment with the new direction of travel.

In certain embodiments, the motor connected to a caster wheel can apply power in one or more directions of wheel rotation, at different levels of power, in response to motor current feedback from one or more of the main drive wheels and/or the powered casters wheels, in response to other sensor inputs, and/or at different times.

In certain embodiments, a mobile robot can temporarily apply power to a caster wheel in a direction of rotation opposite to the dominant direction of rotation for a caster wheel if the motor connected to the caster wheel detects resistance in attempting to rotate the caster wheel in the dominant direction, particularly in certain instances when the robot is initially starting to move and/or the mobile robot is significantly changing direction.

In certain embodiments, a mobile robot can temporarily apply an increased level of power to the motor connected to a caster wheel in the dominant direction of rotation of the caster wheel if the motor connected to the caster wheel detects elevated current indicating that the caster wheel may be encountering a low obstacle and/or an area higher resistance in the floor surface and may need more power to traverse through that location of the floor. In certain embodiments, the mobile robot may discontinue and/or decrease the current to the motor or motors attached to the caster wheels based on the degree to which the resistance to movement of the mobile robot reduces.

In certain embodiments, a mobile robot can periodically apply power to the motor connected to a caster wheel in one or more directions to measure the measure the feedback current of the motor and determine the current approximate state of motion of the caster wheel and/or if the caster wheel may need additional power applied in one or more directions.

Certain embodiments may include one or more motors that can control and/or adjust the heading of one or more of caster wheels in order to optimize the ability of the caster wheel to traverse over a certain area of the floor surface.

In certain embodiment, a system for controlling motors connected to caster wheels may integrate feedback from other sensors on the mobile robot, including, but not limited to: feedback from the motors attached to the main drive wheels, feedback from the motors attached to other caster wheel on the mobile robot, rotational encoders attached to the caster wheels; encoders and/or other sensors that provide the direction and/or heading the caster wheel; ground facing sensors that can detect changes in the floor surface and may enable the control system of the mobile robot to project when a caster wheel will make contact with the change in the floor surface and modify the control of the caster wheel in response to that change; sensors that monitor overall motion of the mobile robot such as accelerometers, sensors that track the motion of the mobile robot relative to the floor, walls, and/or other objects in the environment; sensors connected to a movable joint that allows the caster to move laterally relative to another part of the mobile robot; sensors that monitor objects that may be blocking motion of the mobile robot and may enable the control system of the mobile robot to coordinate the motion of one or more of the main drive wheels and powered caster wheels to help the mobile robot disengage and/or move around the obstacles; and/or mapped information recorded from prior sensor readings that may enable the control system of the mobile robot to coordinate the motion of one or more of the main drive wheels and powered caster wheels to navigate around and/or through an area more effectively on subsequent passes.

In certain embodiments, a mobile robot may include at least two primary drive wheels located at one end of the mobile robot, providing both motion and support for two corners at one end of the robot, and the mobile robot may include at least two caster wheels with assistive motors connected thereto, with the two caster wheels being located at corners at the opposite end of the mobile robot. In certain embodiments, the total number of wheels may be reduced to four, including one at each of four corners of the mobile robot, thus simplifying the drive base of the mobile robot and the suspension system, as well as possibly increasing the stability of the mobile robot as the drive wheels can be placed closer to one end of the mobile robot.

Suspension Locking System

In certain embodiments, a drive base of a mobile robot may include mechanisms that provide greater and/or more rigid stability of the mobile robot by reducing the range of motion of the suspension system, particularly when the mobile robot is stationary and/or being manually moved by an individual. These mechanisms may include, but are not limited to: mechanisms that rigidly lock one or more of the drive wheels and/or caster wheels to the core frame of the mobile robot, bypassing the suspension system that normally resides in between the drive wheels and/or caster wheels and the core frame of the mobile robot; and/or extendable struts that extend from the core frame of the mobile robot to directly make contact with the floor and bypass one or more of the drive wheels and/or caster wheels as support points for the mobile robot. An example of a locking system may include one or more motors connected to one or more rotating notched wheels and/or notched rods, wherein a notch provides a neutral position with space for the elements of the suspension system to move, but wherein the active position closes off that space when the section of the wheel and/or rod at full diameter rotates into place and locks members of the suspension system to the core frame of the mobile robot. An example of the latter locking system may include one or more motors connected to one or more descending struts that lower from the drive deck at points near the four outermost corners of the mobile robot to provide weight bearing support posts between the floor and the core frame of the mobile robot.

Support Surface Detection Sensors

In certain embodiments, one or more of the support surfaces of a mobile robot can include sensors configured to detect if a retrievable item and/or other object is resting on and/or in contact with the support surface. In certain embodiments, one or more pressure sensors or pressure-responsive sensors may be connected to one or more support surfaces of the mobile robot and/or to structures that connect to one or more support surfaces. In certain embodiments, the pressure sensors or pressure-responsive sensors may provide the weight of the retrievable item and/or other objects that are resting on the support surface, and/or the pressure of one or more other objects, such as an overhanging obstacle or a the hand of an individual who is using the mobile robot for support, is exerting on the support surface. In certain embodiments, these sensors can detect weight and/or pressure in one or more specific areas of one or more support surfaces. In certain embodiments, these sensors can be used for a number of functions including, but not limited to:

determining the load from a retrievable item and/or other object; enabling the robot to stop, provide feedback to the user and/or enter a safety mode if the load on the support surface exceeds a specified operating limit; provide input to cause the control system of the mobile robot to check other sensors to confirm if an overhanding obstacle and/or other object is interfering with the operation of the support surface; provide information on the change of weight of a retrievable item and/or other object on the support surface to estimate usage and/or consumption of items stored on the retrievable item and/or other objects on the support surface; and/or wait for the weight and/or pressure read from the support surface to change to indicate an end user action and/or event. In certain embodiments, other surfaces of the mobile robot may include weight, pressure and/or other occupancy sensors, including underside surfaces of decks and/or other support surfaces of the mobile robot that may come into contact with other obstacle during raising, lowering and/or other movements of surface of the mobile robot relative to other surfaces intrinsic and/or extrinsic to the mobile robot.

In certain embodiments, these weight, pressure, and/or other occupancy sensors can be used alone and/or in combination with other sensor to determine application or change in application of weight of an individual on the mobile robot. For example, it may be determined that an individual is resting a significant portion of the individual's weight on the mobile robot, or that weight of an individual applied to a mobile robot has suddenly changed (decreased or increased) in magnitude or direction. In such an instance, the mobile robot may enter one or more safety modes, which may include locking and/or modifying the suspension system, wheels and/or support surface stabilization functions of the mobile robot to brace the mobile robot in the case an individual is using a support surface or other part of a mobile robot for support of the individual. In these cases, the mobile robot may respond with feedback and/or questions to the individual, may use other sensors to scan for the position and orientation of individuals around the mobile robot, and/or issue other alert messages.

Lighting and User Interface

In certain embodiments, a mobile robot can include lighting to illuminate one or more support surfaces on the mobile robot and/or other areas around and/or within the mobile robot. In certain embodiments, lighting elements may be provided above and/or to the sides of the decks and/or support surface of the mobile robot to illuminate the support surfaces and/or the retrievable items and/or other objects resting on the support surfaces. In certain embodiments, a mobile robot can include lighting on a telescoping post that rises above the upper surface of the mobile robot and can act as a reading light for an individual.

In certain embodiments, the lighting can activate in response to motion, in response to gestures detected by sensors monitoring the area around the mobile robot and/or the sides of the support surfaces, and/or in response to sensors monitoring pressure applied to the support surfaces and/or other elements of the mobile robot.

In certain embodiments, sensors monitoring one or more sides of the mobile robot and/or of the support surfaces of the mobile robot can detect gestures, wherein the mobile robot can use detected gestures as inputs to control the height of the mobile robot, the height of one or more of the support surfaces, and/or position of the mobile robot.

In certain embodiments, the mobile robot can include a screen or other user-perceptible element (e.g., visible indicator element, auditory indicator element, and/or vibratory or haptic indicator element) to indicate information and/or states of the mobile robot during its operation.

In certain embodiments, a mobile robot can include one or more buttons to provide control over certain functions of the mobile robot, including but not limited to: raising and/or lowering the height of the mobile robot and/or one or more of its support surfaces; immediately stopping operation of the mobile robot; sending a message for help and/or assistance to another individual and/or monitoring service; sending the mobile robot to one or more locations; requesting the mobile robot to retrieve one or more retrievable items; and/or commanding the mobile robot to move in one or more directions.

In certain embodiments, the mobile robot can include one or more microphones and/or speakers to respond to voice commands and/or provide audible feedback. In certain embodiments, the mobile robot can interface with external devices connected to a network, with such external devices optionally including one or more microphones and/speakers to respond to voice commands and/or provide audible feedback.

Other Form Factors

In certain embodiments, the overall form of the mobile robot can be in different shapes, including but not limited to robot bodies with a round footprint, an oval footprint, a square footprint, and/or a rectangular footprint with sides of varying dimensions.

In certain embodiments, part of the retrieval mechanism for retrievable items can be incorporated into the pallet, other extrinsic surface, and/or other device. In certain embodiments, a mechanism extrinsic to the mobile robot can help align and/or position a retrievable item for retrieval by the retrieval mechanism on the mobile robot. In certain embodiments, a mechanism extrinsic to the mobile robot can transition a retrievable item part of the way between the extrinsic support surface and a support surface of the mobile robot.

In certain embodiments, different mobile robots can transfer retrievable items between one another, to transport items across different stages of a journey. In certain embodiments, a system of at least two mobile robots can operate with adjacent areas, but at different floor levels, where the change between one floor level and the other floor level is too great for either mobile robot to transition, but where at least one mobile robot has a variable height adjustment system and can raise and/or lower one or more of its decks and/or item support surfaces to align with the height of a deck and/or item support surface of the other mobile robot.

Those skilled in the art will recognize improvements and modifications to the preferred embodiments of the present disclosure. All such improvements and modifications are considered within the scope of the concepts disclosed herein and the claims that follow.

What is claimed is:

1. A robotic item retrieval and/or transport system comprising:
   a robotic item retrieval and/or transport apparatus and a pallet element;
   wherein the pallet element comprises:
   a base configured to be supported from below by at least one underlying support surface separate from the pallet element and that is bounded in part by a support surface lateral edge;
   an item support surface arranged generally above the base; and
   a downwardly extending wall arranged along a proximal edge of the pallet element, wherein the base is configured to be positioned on the at least one underlying support surface with the downwardly extending wall arranged proximate to the support surface lateral edge;

wherein the robotic item retrieval and/or transport apparatus comprises:
- a mobile drive base configured to promote autonomous movement of the robotic item retrieval and/or transport apparatus within a substantially unstructured environment;
- a deck arranged above the mobile drive base, the deck being configured to support at least one retrievable item; and
- an item retrieval mechanism comprising at least one actuator and at least one movable implement configured for lateral transport of the at least one retrievable item between the deck and the item support surface; and wherein the downwardly extending wall is configured to be restrained between (i) the support surface lateral edge and (ii) the robotic item retrieval and/or transport apparatus, to inhibit movement of the pallet element during lateral transport of the at least one retrievable item between the deck and the item support surface.

2. The robotic item retrieval and/or transport system of claim 1, wherein the pallet element is devoid of attachment to the at least one underlying support surface.

3. The robotic item retrieval and/or transport system of claim 1, wherein:
the at least one retrievable item comprises at least one first receiving surface and at least one second receiving surface;
the item retrieval mechanism is configured to cause the at least one movable implement to engage the at least one first receiving surface to (i) slide the at least one retrievable item while the at least one retrievable item is supported by at least one of the item support surface or the deck and (ii) pull the at least one retrievable item toward the deck; and
the item retrieval mechanism is configured to cause the at least one movable implement to engage the at least one second receiving surface to (i) slide the at least one retrievable item while the at least one retrievable item is supported by at least one of the item support surface or the deck and (ii) push the at least one retrievable item toward the item support surface.

4. The robotic item retrieval and/or transport system of claim 3, wherein the at least one movable implement is configured to travel under a surface of the at least one retrievable item to permit engagement of the at least one movable implement with at least one of (i) the at least one first receiving surface or (ii) the at least one second receiving surface.

5. The robotic item retrieval and/or transport system of claim 1, wherein the robotic item retrieval and/or transport apparatus further comprises a height adjustment mechanism configured to substantially level the deck to the item support surface or to the at least one retrievable item.

6. The robotic item retrieval and/or transport system of claim 1, wherein:
the pallet element comprises at least one detectable feature; and
the robotic item retrieval and/or transport apparatus comprises at least one sensor configured to detect the at least one detectable feature to permit the robotic item retrieval and/or transport apparatus to perform at least one of the following functions (a) or (b): (a) detect presence of the pallet element, or (b) position at least a portion of the robotic item retrieval and/or transport apparatus relative to the pallet element.

7. The robotic item retrieval and/or transport system of claim 1, wherein:
the pallet element comprises at least one retrievable item presence detection feature; and
the robotic item retrieval and/or transport apparatus comprises at least one sensor configured to generate at least one signal indicative of detection of at least a portion of the at least one retrievable item presence detection feature; and
the robotic item retrieval and/or transport apparatus is configured to utilize the at least one signal to detect presence or absence of the at least one retrievable item presence detection feature.

8. The robotic item retrieval and/or transport system of claim 7, wherein the at least one retrievable item presence detection feature is arranged in or on one or more surfaces of the pallet element.

9. The robotic item retrieval and/or transport apparatus of claim 1, wherein:
the at least one retrievable item comprises at least one detection and/or identification feature; and
the robotic item retrieval and/or transport apparatus comprises at least one sensor configured to detect the at least one detection and/or identification feature to permit the robotic item retrieval and/or transport apparatus to perform at least one of the following functions (a) or (b): (a) detect presence of the at least one retrievable item, or (b) position at least a portion of the robotic item retrieval and/or transport apparatus relative to the at least one retrievable item.

10. The robotic item retrieval and/or transport system of claim 1, wherein the at least one actuator is arranged below an upper surface of the deck.

11. The robotic item retrieval and/or transport system of claim 1, wherein the at least one movable implement is configured to rotate in a direction orthogonal to a direction of lateral transport of the at least one retrievable item between the deck and the item support surface.

12. The robotic item retrieval and/or transport system of claim 1, wherein an entirety of the item retrieval mechanism is configured to be stored below an upper surface of the deck between periods of operation of the item retrieval mechanism.

13. The robotic item retrieval and/or transport apparatus of claim 1, wherein at least a portion of the at least one movable implement is configured to travel below the deck.

14. The robotic item retrieval and/or transport system of claim 1, wherein:
the pallet element further comprises an upwardly extending wall along a distal edge of the pallet element that generally opposes the proximal edge;
the upwardly extending wall comprises at least one retrievable item presence detection feature;
the robotic item retrieval and/or transport apparatus comprises at least one sensor configured to generate at least one signal indicative of detection of at least a portion of the at least one retrievable item presence detection feature; and
the robotic item retrieval and/or transport apparatus is configured to utilize the at least one signal to detect presence or absence of the at least one retrievable item presence detection feature.

15. The robotic item retrieval and/or transport system of claim 1, wherein an upper surface of the deck is arranged within a perimeter bounded by one or more peripheral edges of the deck, and the upper surface is devoid of any upper surface opening configured to accommodate passage of any portion of the item retrieval mechanism that is subject to move relative to the deck.

16. A pallet element configured for use with a robotic item retrieval and/or transport apparatus, the pallet element comprising:
- a base configured to be supported from below by an underlying support surface that is separate from the pallet element, is predominantly horizontal, and is bounded in part by a support surface lateral edge;
- an item support surface arranged generally above the base and configured to support at least one retrievable item; and
- a downwardly extending wall arranged along a proximal edge of the pallet element, wherein the base of the pallet element is configured to be positioned on the underlying support surface and the downwardly extending wall is configured to be positioned against the support surface lateral edge and proximate to a deck of the robotic item retrieval and/or transport apparatus to inhibit movement of the pallet element during lateral transport by the robotic item retrieval and/or transport apparatus of the at least one retrievable item between the item support surface and the deck.

17. The pallet element of claim 16, further comprising an optically detectable feature configured to be detected by a sensor of the robotic item retrieval and/or transport apparatus.

18. The pallet element of claim 17, wherein the optically detectable feature comprises a label.

19. The pallet element of claim 17, wherein the optically detectable feature is configured to permit the robotic item retrieval and/or transport apparatus to perform at least one of the following functions (a) or (b): (a) detect presence of the at least one retrievable item, or (b) position at least a portion of the robotic item retrieval and/or transport apparatus relative to the at least one retrievable item.

20. The pallet element of claim 16, wherein the item support surface defines at least one topside recess configured to accommodate transit of at least one movable implement of the robotic item retrieval and/or transport apparatus under at least a portion of the at least one retrievable item.

21. The pallet element of claim 16, further comprising an upwardly extending wall arranged along a distal edge of the pallet element that generally opposes the proximal edge.

22. The pallet element of claim 16, further comprising at least one retrievable item presence detection feature that is arranged in or on one or more surfaces of the pallet element, and is configured to be detected by a sensor of the robotic item retrieval and/or transport apparatus.

23. The pallet element of claim 22, wherein the at least one retrievable item presence detection feature comprises encoded information.

* * * * *